US012222421B2

(12) United States Patent
Kato et al.

(10) Patent No.: US 12,222,421 B2
(45) Date of Patent: Feb. 11, 2025

(54) OBJECT RECOGNITION APPARATUS, OBJECT RECOGNITION METHOD, AND NON-TRANSITORY COMPUTER READABLE MEDIUM

(71) Applicant: Panasonic Intellectual Property Management Co., Ltd., Osaka (JP)

(72) Inventors: Yumiko Kato, Osaka (JP); Satoshi Sato, Kyoto (JP); Yoshihide Sawada, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 850 days.

(21) Appl. No.: 17/163,662

(22) Filed: Feb. 1, 2021

(65) Prior Publication Data

US 2021/0181341 A1 Jun. 17, 2021

Related U.S. Application Data

(63) Continuation of application No. PCT/JP2019/040823, filed on Oct. 17, 2019.

(30) Foreign Application Priority Data

Dec. 6, 2018 (JP) .................................. 2018-229251

(51) Int. Cl.
*G01S 17/89* (2020.01)
*G01S 7/481* (2006.01)
(Continued)

(52) U.S. Cl.
CPC ............ *G01S 17/89* (2013.01); *G01S 7/4816* (2013.01); *G01S 17/10* (2013.01);
(Continued)

(58) Field of Classification Search
CPC ........ G01S 17/89; G01S 7/4816; G01S 17/10; G01S 7/4802; G05B 13/0265;
(Continued)

(56) References Cited

U.S. PATENT DOCUMENTS

| 6,246,502 B1 | 6/2001 | Okada et al. |
| 2008/0043218 A1 | 2/2008 | Murayama |

(Continued)

FOREIGN PATENT DOCUMENTS

| JP | 8-152320 A | 6/1996 |
| JP | 2004-028602 A | 1/2004 |

(Continued)

OTHER PUBLICATIONS

International Search Report of PCT application No. PCT/JP2019/040823 dated Jan. 21, 2020.

(Continued)

*Primary Examiner* — Yoshihisa Ishizuka
*Assistant Examiner* — Carter W Ferrell
(74) *Attorney, Agent, or Firm* — Rimon P.C.

(57) ABSTRACT

An object recognition apparatus includes a light source, an image sensor, a control circuit, and a signal processing circuit. The control circuit causes the light source to emit first light toward a scene and subsequently emit second light toward the scene, the first light having a first spatial distribution, the second light having a second spatial distribution. The control circuit causes the image sensor to detect first reflected light and second reflected light in the same exposure period, the first reflected light being caused by reflection of the first light from the scene, the second reflected light being caused by reflection of the second light from the scene. The signal processing circuit recognizes an object included in a scene based on photodetection data output (Continued)

from the image sensor, and based on an object recognition model pre-trained by a machine learning algorithm.

19 Claims, 29 Drawing Sheets

(51) Int. Cl.
| | |
|---|---|
| G01S 17/10 | (2020.01) |
| G05B 13/02 | (2006.01) |
| G06F 3/14 | (2006.01) |
| G06F 18/214 | (2023.01) |
| G06T 7/521 | (2017.01) |
| G06V 10/141 | (2022.01) |
| G06V 10/147 | (2022.01) |
| G06V 10/60 | (2022.01) |
| G06V 10/764 | (2022.01) |
| G06V 10/774 | (2022.01) |
| G06V 10/82 | (2022.01) |
| G06V 20/00 | (2022.01) |

(52) U.S. Cl.
CPC ........... *G05B 13/0265* (2013.01); *G06F 3/14* (2013.01); *G06F 18/214* (2023.01); *G06T 7/521* (2017.01); *G06V 10/141* (2022.01); *G06V 10/147* (2022.01); *G06V 10/60* (2022.01); *G06V 10/764* (2022.01); *G06V 10/774* (2022.01); *G06V 10/82* (2022.01); *G06V 20/00* (2022.01); *G06T 2207/10028* (2013.01); *G06T 2207/10152* (2013.01); *G06T 2207/20081* (2013.01)

(58) Field of Classification Search
CPC ...... G06F 18/214; G06F 3/14; G06F 18/2413; G06F 3/147; G06T 7/521; G06T 2207/10028; G06T 2207/10152; G06T 2207/20081; G06V 10/141; G06V 10/147; G06V 10/60; G06V 10/764; G06V 10/774; G06V 10/82; G06V 20/00
See application file for complete search history.

(56) References Cited

U.S. PATENT DOCUMENTS

| | | |
|---|---|---|
| 2011/0157354 A1 | 6/2011 | Kawahito |
| 2013/0088726 A1 | 4/2013 | Goyal et al. |
| 2015/0378011 A1 | 12/2015 | Owechko |
| 2016/0146595 A1 | 5/2016 | Boufounos et al. |
| 2017/0074976 A1* | 3/2017 | Takahashi ............... G01C 3/085 |
| 2018/0224709 A1 | 8/2018 | Inada et al. |
| 2018/0284241 A1* | 10/2018 | Campbell ............. G01S 7/4868 |
| 2018/0327699 A1 | 11/2018 | Ota et al. |
| 2018/0329063 A1 | 11/2018 | Takemoto et al. |
| 2019/0025432 A1 | 1/2019 | Mano |
| 2019/0120942 A1* | 4/2019 | Zhang ..................... G01S 7/499 |
| 2019/0178988 A1* | 6/2019 | England ................. G01S 13/42 |
| 2019/0235080 A1* | 8/2019 | Yatskan ................. H04N 25/46 |
| 2020/0025882 A1* | 1/2020 | Watanabe ............... G01S 17/10 |
| 2020/0097702 A1 | 3/2020 | Saitou et al. |
| 2020/0132847 A1* | 4/2020 | Hillard .................. G01S 7/4865 |

FOREIGN PATENT DOCUMENTS

| | | |
|---|---|---|
| JP | 2005-140685 A | 6/2005 |
| JP | 2008-046047 A | 2/2008 |
| JP | 2010-032425 A | 2/2010 |
| JP | 2010-107448 | 5/2010 |
| JP | 2010-256291 A | 11/2010 |
| JP | 2011-133271 A | 7/2011 |
| JP | 2013-016591 | 1/2013 |
| JP | 2013-156138 A | 8/2013 |
| JP | 2016-508235 | 3/2016 |
| JP | 2016-099346 | 5/2016 |
| JP | 2018-160049 | 10/2018 |
| WO | 2014/110017 | 7/2014 |
| WO | 2017/073737 | 5/2017 |
| WO | 2017/110414 | 6/2017 |
| WO | 2017/141957 | 8/2017 |

OTHER PUBLICATIONS

International Search Report of PCT application No. PCT/JP2019/040822 dated Jan. 21, 2020.
Norio Matsumoto, Nikkei xTECH/NIKKEI ELECTRONICS, News Commentary, "A New Technology for Non-mechanical LiDAR with Discrete Selection of the Ranging Points", Nikkei XTECH, Feb. 23, 2018 (Partial Translation).
English Translation of Chinese Search Report dated Mar. 14, 2024 for the related Chinese Patent Application No. 201980048155.3.
Non-Final Office Action dated Mar. 19, 2024 issued in U.S. Appl. No. 17/171,934.

* cited by examiner

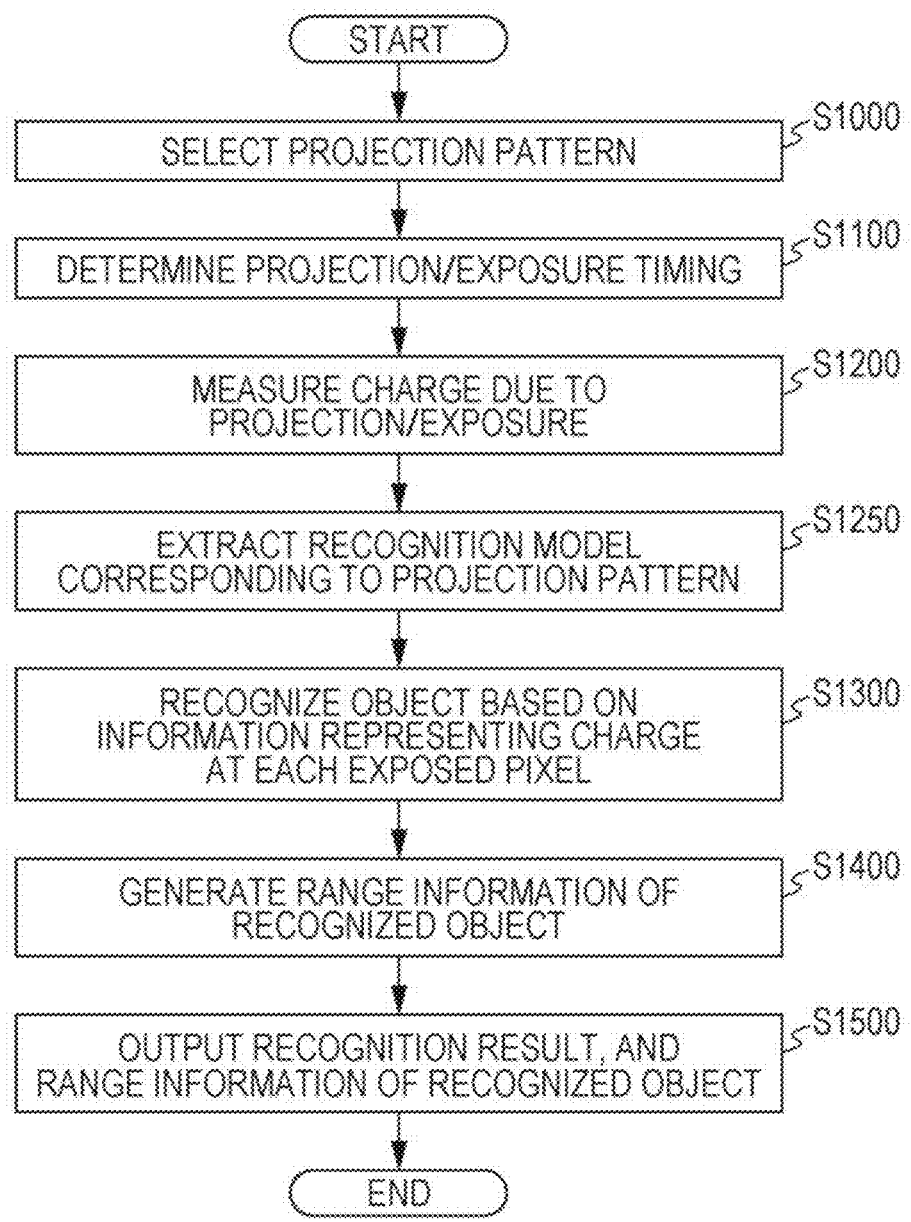

OBJECT RECOGNITION APPARATUS, OBJECT RECOGNITION METHOD, AND NON-TRANSITORY COMPUTER READABLE MEDIUM

BACKGROUND

1. Technical Field

The present disclosure relates to an object recognition apparatus, an object recognition method, and a non-transitory computer-readable medium.

2. Description of the Related Art

Various devices capable of scanning a space with light have been proposed in related art.

Japanese Unexamined Patent Application Publication (Translation of PCT Application) No. 2016-508235 discloses an optical phased array with plural two-dimensionally arranged nano-photonic antenna elements. Each antenna element is optically coupled to a phase shifter. In the optical phased array, a coherent light beam is guided by a waveguide to each antenna element, and the phase of the light beam is shifted by the phase shifter. This configuration makes it possible to change the amplitude distribution of a far-field radiation pattern.

Japanese Unexamined Patent Application Publication No. 2013-016591 discloses an optical deflection element. The optical deflection element includes an optical waveguide layer in which light is guided, a first distribution Bragg reflection mirror provided on the upper and lower surfaces of the optical waveguide layer, a light incidence port for allowing light to enter the waveguide, and a light emission port provided on the surface of the waveguide to allow emission of light entering through the light incidence port and guided within the waveguide.

Japanese Unexamined Patent Application Publication No. 2016-099346, U.S. Patent Application Publication No. 2013/0088726, and U.S. Patent Application Publication No. 2015/0378011 each disclose an apparatus that emits light spatially modulated in a random fashion, receives the reflection of the emitted light to obtain a signal, and applies analytical signal processing to the signal to thereby generate a range image.

International Publication No. 2017/073737 discloses a method for, based on a signal representing light from an object being observed, optimizing determination of the object by use of machine learning.

U.S. Patent Application Publication No. 2018/224709 discloses a light-emitting device capable of emitting light in any given direction by use of an optical waveguide called a slow-light waveguide.

SUMMARY

One non-limiting and exemplary embodiment provides a novel technique for recognizing an object in a scene of interest with relatively low energy usage.

In one general aspect, the techniques disclosed here feature an object recognition apparatus including a light source, a photodetector device, a control circuit that controls the light source and the photodetector device, and a signal processing circuit. The photodetector device includes plural photodetector elements, and outputs photodetection data responsive to the amount of light that is incident on each of the photodetector elements during a specified exposure period. The control circuit causes the light source to emit first light toward a scene and subsequently emit second light toward the scene, the first light having a first spatial distribution, the second light having a second spatial distribution. The control circuit causes at least a portion of the photodetector elements of the photodetector device to detect first reflected light and second reflected light in the same exposure period, the first reflected light being caused by reflection of the first light from the scene, the second reflected light being caused by reflection of the second light from the scene. The signal processing circuit recognizes an object included in the scene based on the photodetection data output by the photodetector device and based on an object recognition model pre-trained by a machine learning algorithm, derives the distance to the object based on the photodetection data, and outputs information representing the object, and range information representing the distance.

According to an aspect of the present disclosure, an object in a scene of interest can be recognized with relatively low energy usage.

It should be noted that general or specific embodiments may be implemented as a system, an apparatus or device, a method, an integrated circuit, a computer program, a computer-readable storage medium or other such storage medium, or any selective combination thereof. Examples of computer-readable storage media may include non-volatile storage media such as a Compact Disc-Read Only Memory (CD-ROM). The apparatus or device may be made up of one or more apparatuses or devices. If the apparatus or device is made up of two or more apparatuses or devices, the two or more apparatuses or devices may be disposed in a single piece of equipment or disposed separately in two or more discrete pieces of equipment. As used in the specification and the claims, the term "apparatus" or "device" can mean not only a single apparatus or device but also a system including plural apparatuses or devices.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 29 is a flowchart illustrating an overview of operation of the object recognition apparatus according to Embodiment 3.

DETAILED DESCRIPTION

Figure 1:
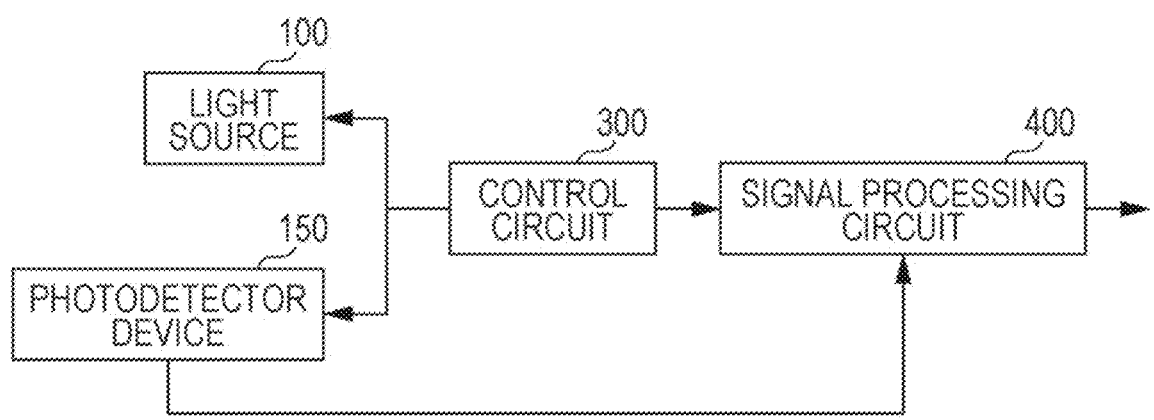
FIG. 1 is a block diagram illustrating a schematic configuration of an object recognition apparatus according to Embodiment 1.

Embodiments of the present disclosure will be described below in specific detail with reference to the drawings. Embodiments described below each represent a generic or specific example. Specific details set forth in the following description of embodiments, such as numerical values, shapes, components, the placement and connection of components, steps, and the order of steps, are for illustrative purposes only and not intended to limit the scope of the present disclosure. Those components in the following description of embodiments which are not cited in the independent claim representing the most generic concept of the present disclosure will be described as optional components. It is to be understood that the drawings are schematic and not necessarily to exact scale. Further, in the drawings, the same reference signs are sometimes used to designate substantially the same or similar components to avoid or simplify repeated descriptions.

According to the present disclosure, each circuit, unit, apparatus or device, component, or part, or each functional block in block diagrams may, in whole or in part, be implemented as one or more electronic circuits including, for example, a semiconductor device, a semiconductor integrated circuit (IC), or a large scale integration (LSI). An LSI or an IC may be integrated in a single chip or may be a combination of plural chips. For example, functional blocks other than a storage element may be integrated in a single chip. Although herein called an LSI or IC, each such electronic circuit is called differently depending on the degree of integration, such as a system LSI, a very large scale integration (VLSI), or ultra large scale integration (ULSI). A field programmable gate array (FPGA) that is programmed after manufacture of an LSI, or a reconfigurable logic device that allows reconfiguration of connections inside an LSI or allows set-up of circuit segments inside an LSI may be used for the same purpose.

Further, the function or operation of each circuit, unit, apparatus or device, component, or part may, in whole or in part, be implemented by software processing. In this case, the software is stored on one or more non-transitory storage media such as ROMs, optical discs, or hard disk drives, and when the software is executed by a processor, a function specified by the software is executed by the processor and peripheral devices. A system, or an apparatus or device may include one or more non-transitory storage media on which the software is stored, the processor, and a required hardware device, which is, for example, an interface.

Embodiment 1

FIG. 1 is a block diagram illustrating a schematic configuration of an object recognition apparatus according to Embodiment 1. The object recognition apparatus includes a light source 100, a photodetector device 150, a control circuit 300, and a signal processing circuit 400.

The light source 100 may be, for example, capable of simultaneously emitting plural light beams in different directions. The photodetector device 150 includes plural photodetector elements. The plural photodetector elements correspond one-to-one to plural pixels. A photodetector element will be herein sometimes referred to as pixel. The photodetector device 150 outputs photodetection data responsive to the amount of light received by each photodetector element during a specified exposure period. The photodetector device 150 may be, for example, an image sensor including plural one- or two-dimensionally arranged photodetector elements. The control circuit 300 controls the light source 100 and the photodetector device 150. The signal processing circuit 400 recognizes an object in a scene based on photodetection data output from the photodetector device 150, and generates and outputs range information representing the distance to the recognized object.

The following provides an overview of operations executed by the control circuit 300 according to Embodiment 1.

(1) The control circuit 300 causes the light source 100 to emit first light having a first spatial distribution toward a scene. The first light may include plural first light beams, or may be a single light beam having a single continuous pattern.

(2) The control circuit 300 causes the light source 100 to emit second light having a second spatial distribution toward the scene. The second light may include plural second light beams, or may be a single light beam having a single continuous pattern.

The first light may have a maximum range different from the maximum range of the second light. For example, the second light may have a lower energy than the first beam per unit area on an irradiated surface located at a predetermined distance from the light source. Another exemplary method for making the first light and the second light differ in maximum range may be to make the first light and the second light differ in wavelength. For example, a wavelength with a higher atmospheric absorption coefficient than the wavelength of the first light may be selected as the wavelength of the second light. As will be described later, the first light and the second light may have the same maximum range.

In Embodiment 1, the second spatial distribution differs from the first spatial distribution. As used herein, the term "spatial distribution" of a light beam means a spatial range in three dimensions (i.e., distance, direction, and angular range) that the light beam can reach. Even if the first light and the second light are emitted in the same direction and in the same angular range, if the first light and the second light differ in their maximum range, then it can be said that the first spatial distribution and the second spatial distribution differ from each other. The term "two-dimensional spatial distribution" means a spatial distribution with the direction and angular range of light, which represent two of the three dimensions of the "spatial distribution" excluding the dimension representing the distance that the light beam can reach. As will be described later, the first spatial distribution and the second spatial distribution may be the same. As used herein, the term "radiant intensity" refers to radiant energy radiated from a point-like radiation source in a "given direction" per unit time, which is obtained by differentiating the radiant flux of radiated light with respect to a solid angle as viewed from the radiation source, that is, the magnitude of the angular range of divergence of light. As used herein, the term "maximum range of light" refers to the farthest distance that light with a predetermined photosynthetic photon flux density can reach from the location of the light source, provided that there is no obstacle.

(3) The control circuit 300 causes at least a portion of the photodetector elements of the photodetector device 150 to receive first reflected light and second reflected light in the same exposure period, the first reflected light being caused by reflection of the first light from a scene, the second reflected light being caused by reflection of the second light from the scene.

The signal processing circuit 400 recognizes one or more objects included in a scene, based on photodetection data output from the photodetector device, and based on an object recognition model pre-trained by a machine learning algorithm. Further, based on the photodetection data, the signal processing circuit 400 derives the distance to the object, and outputs information representing the object and the distance to the object.

According to the above-mentioned configuration, the first light and the second light do not need to cover the entire scene. The above-mentioned configuration thus makes it possible to reduce the energy of emitted light. Further, the above-mentioned configuration allows for simultaneous recognition and ranging of an object at each of a relatively short distance range and a relatively long distance range. This allows for reduced overall processing time in comparison to when recognition and ranging of an object at short range and recognition and ranging of an object at long range are performed individually.

The exposure period may be set as follows: the exposure period does not include a time at which a portion of the first reflected light arrives at the photodetector device, the portion of the first reflected light being caused by reflection at a position in the scene located at a first distance from the photodetector device; the exposure period includes a time at which another portion of the first reflected light arrives at the photodetector device, the other portion of the first reflected light being caused by reflection at a position located at a second distance from the photodetector device, the second distance being greater than the first distance; and the exposure period includes a time at which a portion of the second reflected light arrives at the photodetector device, the portion of the second reflected light being caused by reflection at a position located at the first distance from the photodetector device. This configuration makes it possible to ensure that: the first reflected light from an object located at the first distance relatively close to the photodetector device is not detected; the second reflected light from the object at the second distance is detected; and the first reflected light from an object located at a second distance relatively far from the photodetector device is detected. This makes it possible to simultaneously perform ranging of an object located at a short distance and ranging of an object located at a long distance.

Figure 2:
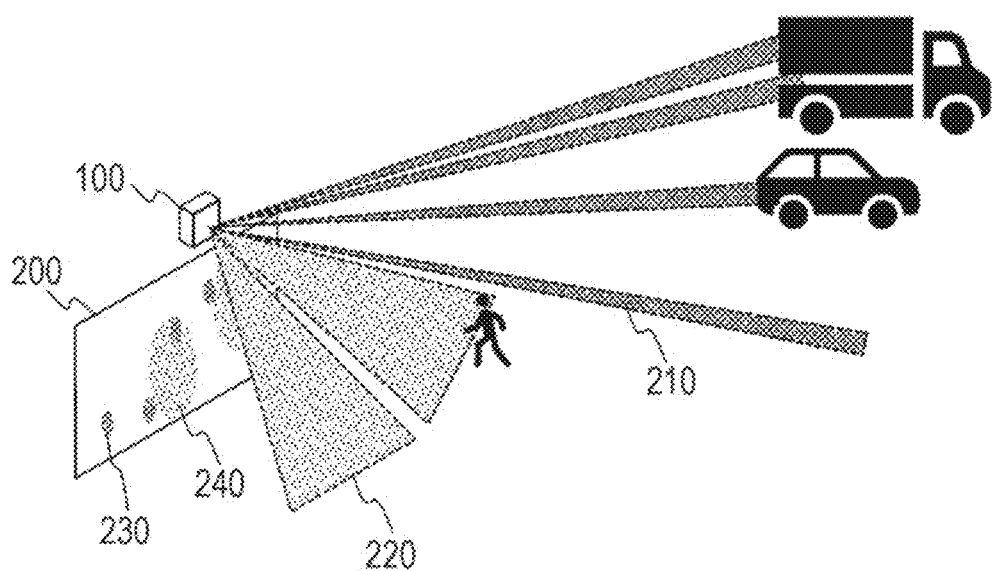
FIG. 2 schematically illustrates an exemplary scene for which an object recognition apparatus is used.

FIG. 2 schematically illustrates an exemplary usage scene according to Embodiment 1. In the present example, the photodetector device 150 is implemented by an image sensor 200 that acquires a two-dimensional image. The light source 100 sequentially emits the first light including plural first light beams 210, and the second light including plural second light beams 220. Each first light beam 210 has a relatively high energy per unit area on an irradiated surface located at a predetermined distance from the light source, and reaches far. By contrast, each second light beam 220 has a relatively low energy per unit area on the irradiated surface, and does not reach very far. In the following description, each first light beam 210 will be sometimes referred to as "long-range beam", and each second light beam 220 will be sometimes referred to as "short-range beam". In the example illustrated in FIG. 2, both light beams have substantially the same energy as a whole. Consequently, each second light beam 220 has a divergence angle greater than the divergence angle of each first light beam 210.

Although FIG. 2 depicts an example with four first light beams 210 and two second light beams 220, in actuality, more first light beams 210 and more second light beams 220 may be emitted.

The image sensor 200 receives first reflected light 230 and second reflected light 240 in the same exposure period, the first reflected light 230 being caused by reflection of the first light from a scene, the second reflected light being caused by reflection of the second light from the scene. The signal processing circuit 400 applies an object recognition model, which is a learned model pre-trained by a machine learning algorithm, to photodetection data output from the image sensor 200 to thereby recognize at least one object within a scene. The signal processing circuit 400 further derives, based on the photodetection data, the distance between the recognized object and the object recognition apparatus, and outputs information representing the object and the distance. In Embodiment 1, the distance is derived by calculation based on an indirect time-of-flight (ToF) method. As will be described later, alternatively, the distance to an object may be derived from photodetection data by using a range-image generation model, which is a pre-trained learned model.

An object recognition model is pre-trained with plural training data sets. Each training data set includes learning photodetection data, which is photodetection data used for learning, and label data that identifies an object in a scene represented by the learning photodetection data.

The number of the first light beams 210 is less than the number of light beams required for covering the entire scene to be captured. Likewise, the number of the second light beams 220 is less than the number of light beams required for covering the entire scene to be captured. In other words, the first light beams 210 and the second light beams 220 are both "sparse light beams". The photodetector elements of the image sensor 200 may include the following photodetector elements: plural first photodetector elements that receive the first reflected light and do not receive the second reflected light; plural second photodetector elements that receive the second reflected light and do not receive the first reflected light; and plural third photodetector elements that receive neither the first reflected light nor the second reflected light. The object recognition apparatus according to Embodiment 1 uses spare light beams to recognize an object and estimate the distance to the object. This makes it possible to recognize an object with reduced power consumption in comparison to use of light beams that cover the entire scene to be captured.

The configuration and operation according to Embodiment 1 will be described more specifically below.

1-1. Configuration of Object Recognition Apparatus

Figure 3:
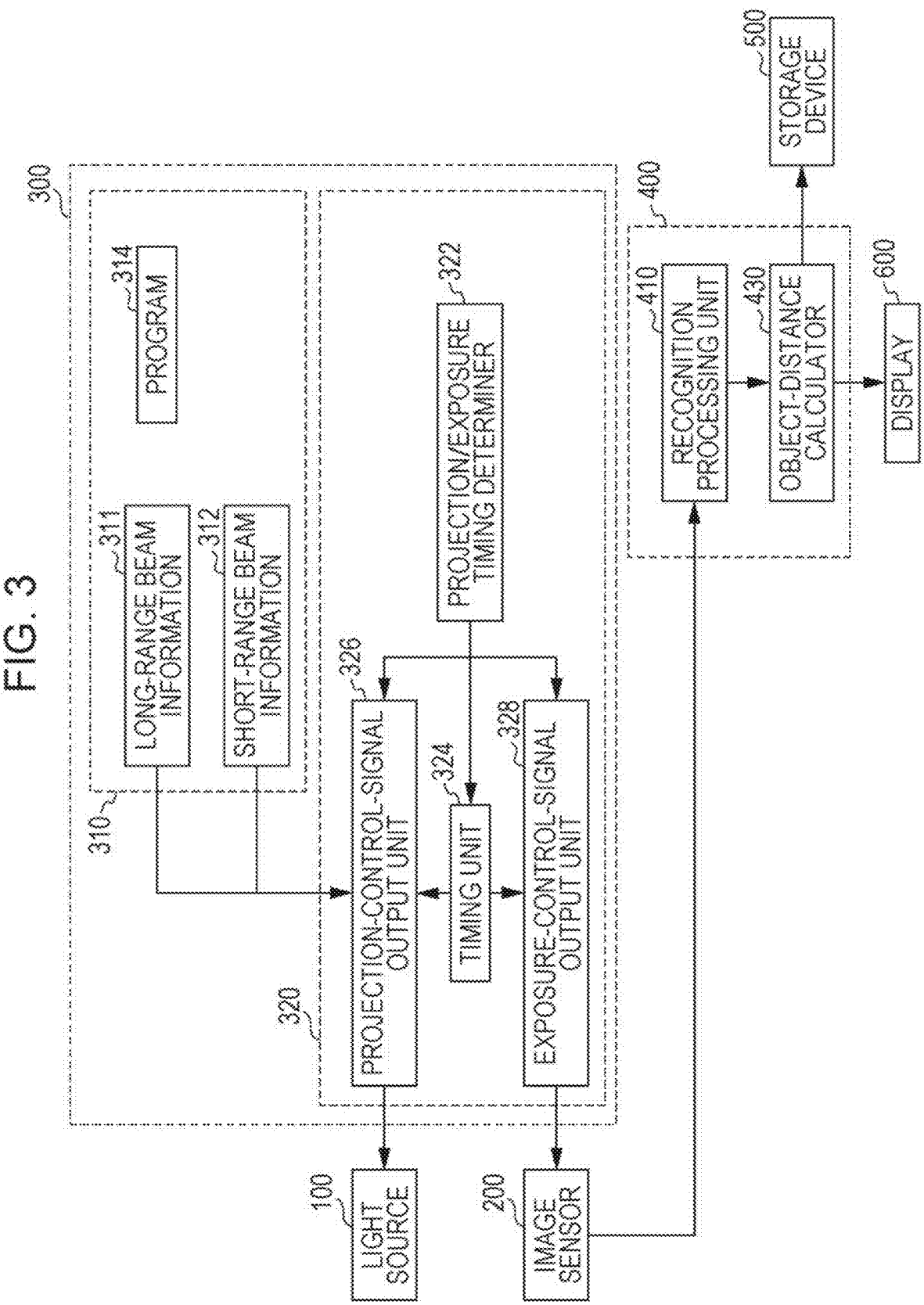
FIG. 3 is a block diagram illustrating an exemplary configuration of the object recognition apparatus according to Embodiment 1.

FIG. 3 is a block diagram illustrating an exemplary configuration of the object recognition apparatus according to Embodiment 1. The object recognition apparatus illustrated in FIG. 3 includes the light source 100, the image sensor 200, the control circuit 300, the signal processing circuit 400, a storage device 500, and a display 600. The control circuit 300 includes a storage medium 310, and a processor 320.

The light source 100 may be, for example, a light-emitting device that emits laser light. The light source 100 emits plural long-range beams that reach farther, and plural short-range beams with a maximum range shorter than the maximum range of the long-range beams. The light source 100 emits the long-range beams and the short-range beams in, for example, random directions. Each long-range beam may have a maximum range of, for example, 100 m to 200 m. Each short-range beam may have a maximum range of, for example, 0 m to 100 m. The maximum ranges of these light beams are not limited to the above-mentioned exemplary values but may be set to any given values.

The image sensor 200 includes plural two-dimensionally arranged photodetector elements. Each photodetector element may include a photoelectric conversion element such as a photodiode. Each photodetector element performs photoelectric conversion upon receiving light, and outputs an electrical signal responsive to the amount of received light.

The control circuit 300 controls the respective operations of the light source 100, the image sensor 200, and the signal processing circuit 400. The control circuit 300 may be implemented as an electronic circuit such as a microcontroller unit (MCU). The control circuit 300 illustrated in FIG. 3 includes the processor 320, and the storage medium 310. The processor 320 may be implemented as, for example, a central processing unit (CPU). Examples of the storage medium 310 may include a non-volatile memory such as a read only memory (ROM), and a volatile memory such as a random access memory (RAM). The storage medium 310 stores a computer program 314 that is executed by the processor 320. The processor 320 may execute the program 314 to thereby execute operations described later.

The control circuit 300 determines the timing of light beam projection by the light source 100, and the timing of exposure of the image sensor 200. In accordance with the determined timings, the control circuit 300 outputs a projection control signal and an exposure control signal. The projection control signal is generated in accordance with projection pattern information pre-stored on the storage medium 310. The projection pattern information is data representative of the spatial distribution of each light beam. The projection pattern information includes long-range beam information 311 and short-range beam information 312. The long-range beam information 311 may include information related to the direction of emission and shape of each long-range beam. The short-range beam information 312 may include information related to the direction of emission and shape of each short-range beam.

The signal processing circuit 400 acquires photodetection data that is output from the image sensor 200 for each exposure period. The signal processing circuit 400 recognizes an object in a scene based on information about the electric charge at each pixel represented by the photodetection data, in accordance with an object recognition model pre-trained through machine learning. The signal processing circuit 400 further extracts, from the photodetection data, information about a pixel region corresponding to the region of the recognized object, and calculates distance from the extracted information. The method for calculating distance will be described later in detail. The signal processing circuit 400 outputs information representing the recognized object and the distance to the object. The output results may be stored in the storage device 500, and displayed on a display device such as the display 600.

1-1-1. Configuration of Control Circuit 300

Reference is now made to a more specific exemplary configuration of the control circuit 300. The control circuit 300 includes the processor 320, and the storage medium 310. The processor 320 includes a projection/exposure timing determiner 322, a timing unit 324, a projection-control-signal output unit 326, and an exposure-control-signal output unit 328. The storage medium 310 stores the long-range beam information 311, the short-range beam information 312, and the computer program 314 executed by the processor 320.

The object recognition apparatus performs ranging based on an indirect time-of-flight (ToF) method. The object recognition apparatus recognizes an object in a scene based on an object recognition model generated in advance through machine learning. The object recognition model is generated by using the technique of compressed sensing. Using the technique of compressed sensing makes it possible to generate an appropriate object recognition model even if short-range beams and long-range beams are both spatially sparse. In other words, the number of short-range beams, and the number of long-range beams may be each less than the number of beams required to cover the entire scene to be ranged.

Figure 4A:
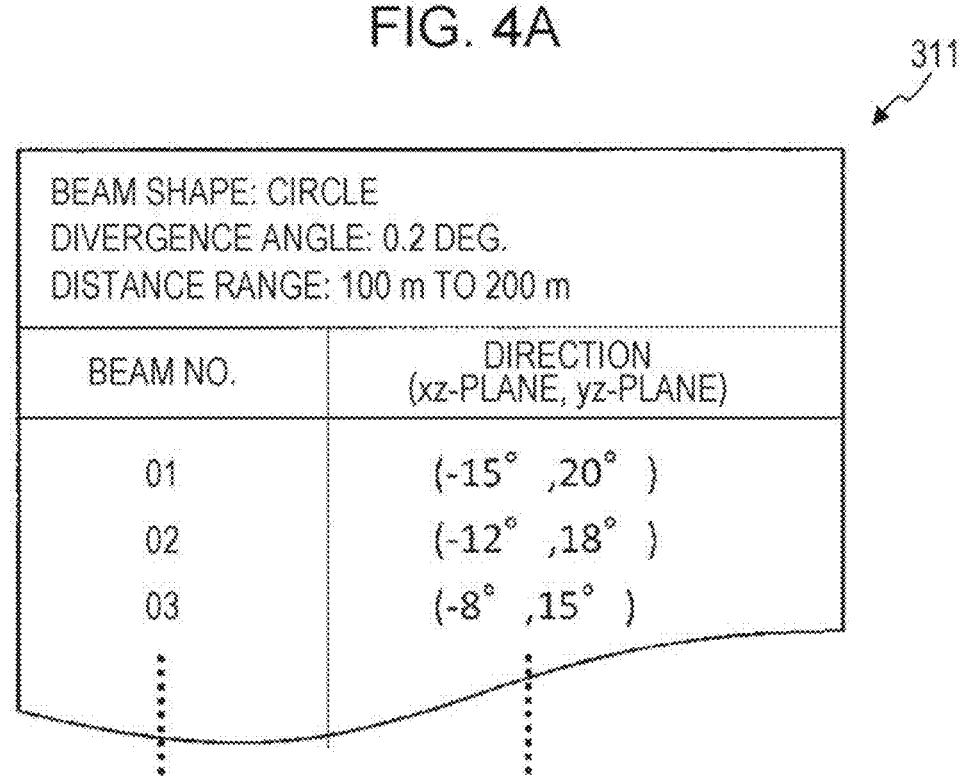
FIG. 4A illustrates exemplary long-range beam information.
Figure 4B:
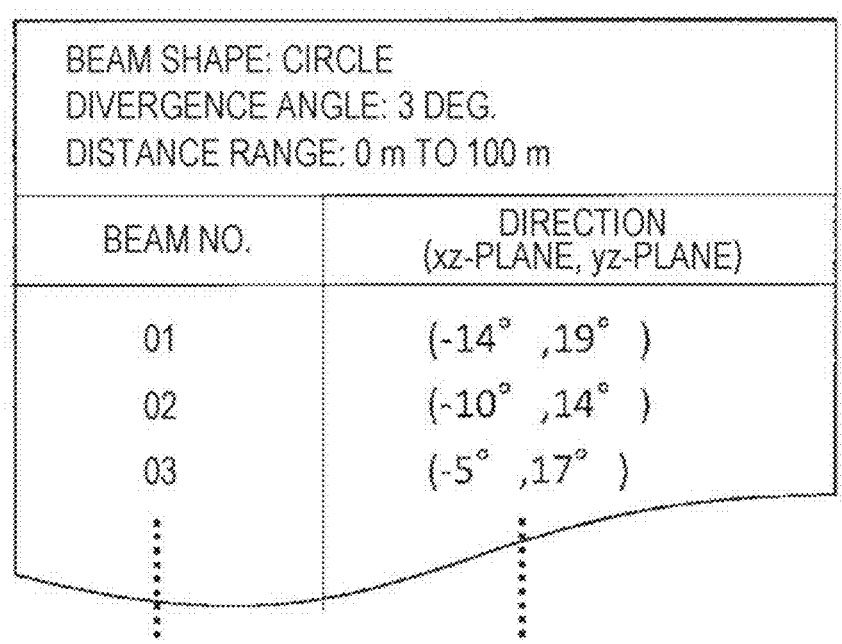
FIG. 4B illustrates exemplary short-range beam information.

FIG. 4A illustrates an example of the long-range beam information 311. FIG. 4B illustrates an example of the short-range beam information 312. In the present example, each of the long-range beam information 311 and the short-range beam information 312 includes the following pieces of information common to each light beam: beam shape, beam divergence angle, and distance range. The distance range refers to the range of distances measured with the beam. Each of the long-range beam information 311 and the short-range beam information 312 further includes, for each light beam, information representing beam No. and direction of emission. In the example illustrated in each of FIGS. 4A and 4B, mutually orthogonal x- and y-axes are set in parallel to the photodetection surface of the image sensor 200, and a z-axis is set in a direction perpendicular to the photodetection surface of the image sensor 200 and toward a scene. The direction of emission of each light beam is specified by its angle from the z-axis when projected on the xz-plane, and by its angle from the z-axis when projected on the yz-plane.

In the example illustrated in each of FIGS. 4A and 4B, the directions of the short-range beams and the directions of the long-range beams are determined randomly. Further, the number of short-range beams and the number of long-range beams are both less than the number of light beams required to cover the entire scene to be ranged.

The long-range beam information 311 and the short-range beam information 312 in FIGS. 4A and 4B are illustrative only and may include information other than those mentioned above. In the example illustrated in each of FIGS. 4A and 4B, the direction of projection of a beam is described by its angle when projected on the xz-plane and its angle when projected on the yz-plane. Alternatively, however, the direction of projection may be described by other methods.

Figure 5:
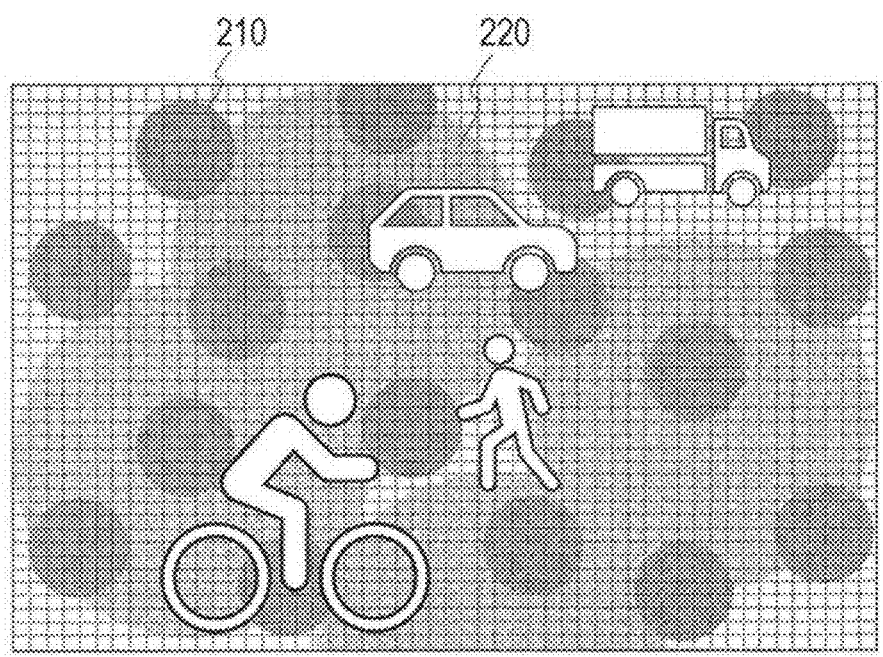
FIG. 5 schematically illustrates projection of plural long-range beams and plural short-range beams.

FIG. 5 schematically illustrates projection of the long-range beams 210 and the short-range beams 220 in accordance with Embodiment 1. In the example illustrated in FIG. 5, a bicycle is located closest to the light source 100, followed by a human being, a passenger car, and a truck in decreasing order of proximity to the light source 100. Small circles each represent a region to which the long-range beam 210 is projected, and large circles each represent a region to which the short-range beam 220 is projected. Cells drawn in FIG. 5 represent the pixels of the image sensor 200. Although in actuality the pixels of the image sensor 200 are very fine, for ease of viewing, these pixels are depicted in FIG. 5 to be coarser than their actual size. In the present case, the short-range beams 220 have a radiant intensity lower than the radiant intensity of the long-range beams 210.

In the example illustrated in FIG. 5, the long-range beams 210 and the short-range beams 220 are each projected in random directions. Regions to which these beams are projected do not cover all pixels on the image sensor 200. The directions of beam projection include the following directions: a direction in which neither the long-range beam 210 nor the short-range beam 220 is radiated; a direction in which only the long-range beam 210 is radiated; a direction in which only the short-range beam 220 is radiated; and a direction in which both the long-range beam 210 and the short-range beam 220 are radiated. The photodetection surface of the image sensor 200 that receives reflected light also has four kinds of pixel regions corresponding one-to-one to the four kinds of directions mentioned above.

The distance between the light source 100 and the image sensor 200 can be on the order of, for example, several millimeters. By contrast, distances measured by ranging are in the range of, for example, about 0 m to 200 m, and in many cases greater than or equal to several meters. With the above in mind, the light source 100 and the image sensor 200 can be regarded as being located at the same point in space coordinates. Accordingly, a light beam emitted from the light source 100 is reflected by an object existing in the direction in which the light beam is emitted, and its reflection is received by the image sensor 200 located at substantially the same position as the light source 100. If an object at a long distance and an object at a short distance exist in the direction in which the light beam is emitted, the light beam is reflected by the object at a short distance and does not reach the object at a long distance.

In Embodiment 1, the period of time in which the long-range beam 210 is reflected by an object located at a first distance range, which is relatively long, and then arrives at the image sensor 200, and the period of time in which the short-range beam 220 is reflected by an object located at a second distance range, which is relatively short, and then arrives at the image sensor 200 overlap each other at least partially. The timing of emission of each light beam and the timing of exposure are adjusted to satisfy the above-mentioned condition. The first distance range may be set to, for example, 100 m to 200 m, and the second distance range mat be set to, for example, 0 m to 100 m. The long-range beam 210 reflected by an object located at a distance outside the first distance range, and the short-range beam 220 reflected by an object located at a distance outside the second distance range are not detected by the image sensor 200. In other words, even if an object exists in the direction of radiation of each of the long-range beam 210 and the short-range beam 220, only one of the two beams is detected by the image sensor 200.

If the pixel pitch is sufficiently small, and there is no pixel that is divided by the contour of an object into parts lying inside and outside the object, the photodetection surface of the image sensor 200 has no pixel that receives both the long-range beam 210 and the short-range beam 220. In this case, there may exist only the following three kinds of pixels: pixels that receive neither the long-range beam 210 nor the short-range beam 220; pixels that receive only the long-range beam 210; and pixels that receive only the short-range beam 220. If, however, there is any pixel that is divided by the contour of an object into parts lying inside and outside the object, such a pixel may receive both the long-range beam 210 and the short-range beam 220. In that case, there may exist the following four kinds of pixels: pixels that receive neither the first light beam nor the second light beam; pixels that receive only the first light beam; pixels that receive only the second light beam; and pixels that receive both the first light beam and the second light beam.

The projection/exposure timing determiner 322 illustrated in FIG. 3 determines the following timings: the timing when the long-range beams 210 are emitted by the light source 100; the timing when the short-range beams 220 are emitted by the light source 100; and the timing when exposure of the image sensor 200 is performed.

The timing unit 324 measures time.

The projection-control-signal output unit 326 outputs a projection control signal that controls the light source 100. The projection control signal includes a first control signal for projecting long-range beams, and a second control signal for projecting short-range beams. The first control signal is generated based on the long-range beam information 311, which specifies the direction, shape, and intensity of each long-range beam. The second control signal is generated based on the short-range beam information 312, which specifies the direction, shape, and intensity of each short-range beam.

The exposure-control-signal output unit 328 outputs an exposure control signal that controls exposure of the image sensor 200. Exposure of the image sensor 200 is performed in accordance with the output exposure control signal.

The respective functions of the projection/exposure timing determiner 322, the timing unit 324, the projection-control-signal output unit 326, and the exposure-control-signal output unit 328 may be implemented by, for example, execution of the program 314 by the processor 320. In this case, the processor 320 functions as the projection/exposure timing determiner 322, the timing unit 324, the projection-control-signal output unit 326, and the exposure-control-signal output unit 328. Alternatively, these functional units may be implemented by dedicated hardware.

Reference is now made to an exemplary ranging method based on the general indirect ToF method. The ToF method measures the distance from the object recognition apparatus to an object by measuring the time of flight, which is the time it takes for light emitted from a light source to be reflected by an object and return to a photodetector located near the light source. A method that directly measures the time of flight is referred to as direct ToF. A method that provides plural exposure periods, and calculates the time of flight from the energy distribution of reflected light for each exposure period is referred to as indirect ToF.

Figure 6A:
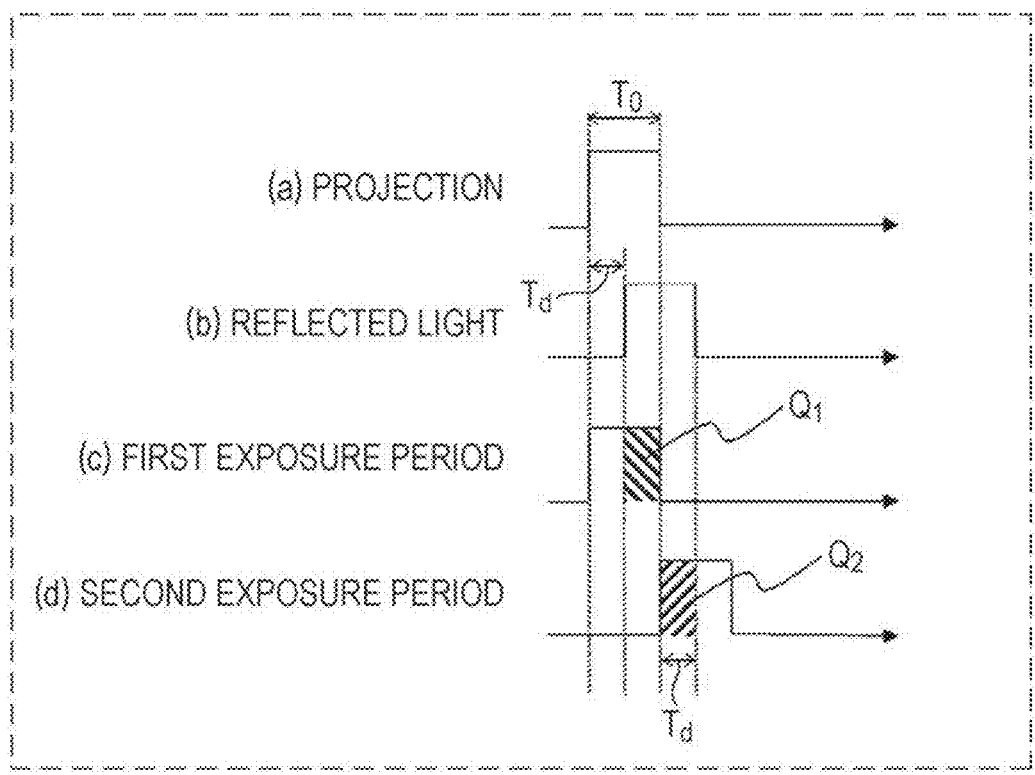
FIG. 6A illustrates an example of the timings of projection and exposure based on an indirect ToF method.

FIG. 6A illustrates an example of the timing of projection, the timing of arrival of reflected light, and two timings of exposure in accordance with the indirect ToF method. The horizontal axis represents time. The rectangular parts represent the period of projection, the period of arrival of reflected light, and the respective periods of two exposures. FIG. 6A(a) illustrates the timing when light is emitted from the light source. $T_0$ denotes the pulse width of a light beam used for ranging. FIG. 6A(b) illustrates the period of time in which the light beam emitted from the light source and reflected by an object returns to the image sensor. $T_d$ denotes the time of flight of the light beam. In the example illustrated in FIG. 6A, the reflected light returns to the image sensor in an amount of time $T_d$ shorter than the duration $T_0$ of the light pulse. FIG. 6A(c) illustrates a first exposure period of the image sensor. In this example, exposure starts simultaneously with the start of projection, and exposure ends simultaneously with the end of projection. In the first exposure period, a portion of reflected light that has returned early is subjected to photoelectric conversion, and the resulting electric charge is accumulated. $Q_1$ denotes the energy of light that has undergone photoelectric conversion during the first exposure period. The energy $Q_1$ is proportional to the amount of charge accumulated during the first exposure period.

FIG. 6A(d) illustrates a second exposure period for the image sensor. In this example, the second exposure period starts with the end of projection, and ends with the elapse of time equal to the pulse width $T_0$ of the light beam, that is, with the elapse of time equal to the first exposure period. $Q_2$ denotes the energy of light that has undergone photoelectric conversion during the second exposure period. The energy $Q_2$ is proportional to the amount of charge accumulated during the second exposure period. In the second exposure period, a portion of reflected light that has arrived at the image sensor after the end of the first exposure period is received. Since the length of the first exposure period is equal to the pulse width $T_0$ of the light beam, the duration of the reflected light received in the second exposure period is equal to the time of flight $T_d$.

In the following description, $C_{fd1}$ denotes the integral capacitance of the charge accumulated in each pixel during the first exposure period, $C_{fd2}$ denotes the integral capacitance of the charge accumulated in each pixel during the second exposure period, $I_{ph}$ denotes photocurrent, and N denotes charge transfer clock count. The output voltage of each pixel in the first exposure period is represented by $V_{out1}$ below:

$$V_{out1}=Q_1/C_{fd1}=N\times I_{ph}\times(T_0-T_d)/C_{fd1}$$

The output voltage of each pixel in the second exposure period is represented by $V_{out2}$ below:

$$V_{out2}=Q_2/C_{fd2}=N\times I_{ph}\times T_d/C_{fd2}.$$

In the example illustrated in FIG. 6A, the duration of the first exposure period and the duration of the second exposure period are equal, and hence $C_{fd1}=C_{fd2}$. Accordingly, $T_d$ can be represented as follows:

$$T_d=\{V_{out2}/(V_{out1}+V_{out2})\}\times T_0.$$

If the velocity of light is $C(\cong 3\times 10^8$ m/s), the distance L between the object recognition apparatus and the object is represented as follows:

$$L=C\times T_d/2=C\times\{V_{out2}/(V_{out1}+V_{out2})\}\times T_0/2.$$

Figure 6B:
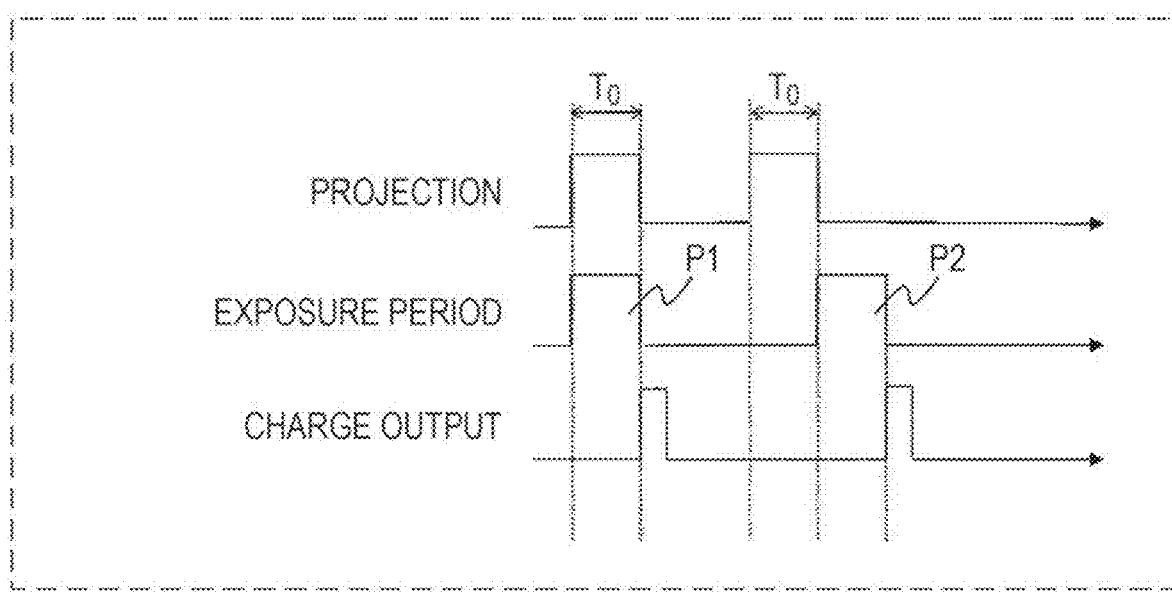
FIG. 6B illustrates another example of the timings of projection and exposure based on an indirect ToF method.

In actuality, the image sensor 200 outputs charge accumulated in each exposure period, and thus may, in some cases, be unable to perform two exposures in succession. FIG. 6B schematically illustrates the respective timings of projection, exposure, and charge output for a case where it is not possible to provide two exposure periods in succession. FIG. 6B depicts an exemplary case where, first, simultaneously with the light source 100 starting projection of light, the image sensor 200 starts exposure, and simultaneously with the light source 100 ending the projection of light, the image sensor 200 ends the exposure. This exposure period, P1, corresponds to the first exposure period illustrated in FIG. 6A. The image sensor 200 outputs, immediately after the exposure, the charge accumulated in the exposure period P1. The light source 100 then starts projection of light again, and ends the projection with the elapse of the same amount of time $T_0$ as that of the first projection. The image sensor 200 starts exposure simultaneously with the light source 100 ending the projection of light, and ends the exposure with the elapse of the same duration of time as that of the first exposure period P1. This exposure period, P2, corresponds to the second exposure period illustrated in FIG. 6A. The image sensor 200 outputs, immediately after the exposure, the charge accumulated in the exposure period P2.

As described above, in the example illustrated in FIG. 6B, to acquire a voltage required for the distance calculation mentioned above, the light source 100 projects light twice, and the timing of exposure of the image sensor 200 is varied for each projection of light. In this way, even if it is not possible to provide two exposure periods in succession, a voltage can be obtained for each exposure period. As described above, with the image sensor 200 that outputs charge for each exposure period, information representing charge accumulated during each of plural preset exposure periods is obtained by projecting light under the same conditions for a number of times equal to the number of preset exposure periods.

In actual ranging, the image sensor 200 may receive not only light emitted from the light source 100 and reflected by an object, but also background light, that is, light from an external source such as sunlight or ambient illumination. Accordingly, it is common to provide an exposure period for measuring charge accumulated due to background light that is incident on the image sensor 200 with no light beam being emitted from the image sensor 200. By subtracting the amount of charge measured during the exposure period provided for background light, from the amount of charge measured at the time when the reflection of a light beam is received, the amount of charge due to the received reflection of the light beam alone can be obtained. In Embodiment 1, for simplicity, reference is not made to an operation for background light.

1-1-2. Configuration of Light Source 100

An exemplary configuration of the light source 100 is now described. The light source 100 may be, for example, a light source as disclosed in U.S. Patent Application Publication No. 2013/0088726 that emits light in any given spatial pattern by use of a coded mask. Alternatively, the light source 100 may include, for example, an optical phased array as disclosed in Japanese Unexamined Patent Application Publication (Translation of PCT Application) No. 2016-508235 that is capable of emitting light in any given spatial pattern. Further, the light-emitting device disclosed in U.S. Patent Application Publication No. 2018/224709 may be used for the light source 100. An exemplary configuration of the light source 100 is described below.

Figure 7:
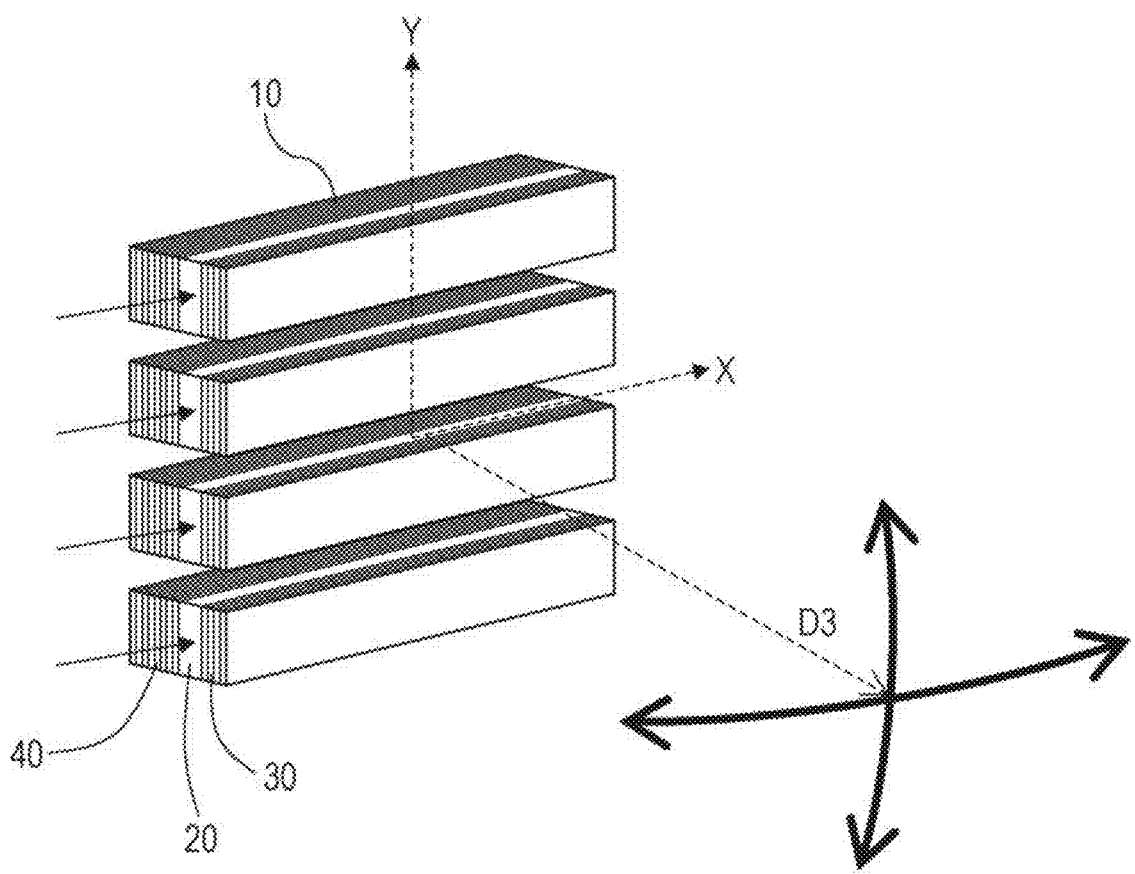
FIG. 7 is a schematic perspective view of an exemplary light-emitting device.

FIG. 7 is a schematic perspective view of an exemplary light-emitting device that may be used for the light source 100. The light source 100 may include a combination of plural light-emitting devices that each emit light in a different direction. FIG. 7 is a simplified illustration of the configuration of one of these light-emitting devices.

The light-emitting device includes an optical waveguide array with plural optical waveguide elements 10. The optical waveguide elements 10 each extend in a first direction (X-direction in FIG. 7). The optical waveguide elements 10 are arranged regularly in a second direction (Y-direction in FIG. 7) transverse to the first direction. The optical waveguide elements 10 allow light to propagate in the first direction while causing light to be emitted in a third direction D3, which is transverse to an imaginary plane parallel to the first and second directions.

The optical waveguide elements 10 each include a first mirror 30 and a second mirror 40 that face each other, and an optical waveguide layer 20 located between the mirror 30 and the mirror 40. Each of the mirror 30 and the mirror 40 has, at its interface with the optical waveguide layer 20, a reflecting surface transverse to the third direction D3. The mirror 30 and the mirror 40, and the optical waveguide layer 20 extend in the first direction.

The reflecting surface of the first mirror 30, and the reflecting surface of the second the mirror 40 face each other substantially in parallel. Of the two mirrors 30 and 40, at least the first mirror 30 has a characteristic that allows the first mirror 30 to transmit a portion of light propagating in the optical waveguide layer 20. In other words, the first mirror 30 has a higher light transmittance than the second mirror 40 with respect to the above-mentioned light. As a result, a portion of the light propagating in the optical waveguide layer 20 is emitted to the outside through the first mirror 30. Each of the mirrors 30 and 40 may be, for example, a multilayer mirror formed by a dielectric multilayer coating (also sometimes referred to as "multilayer reflective coating").

By adjusting the phase of light input to each optical waveguide element 10, and by further adjusting the refractive index or thickness of the optical waveguide layer 20 of each optical waveguide element 10, or the wavelength of light input to the optical waveguide layer 20, light can be emitted in any given direction.

Figure 8:
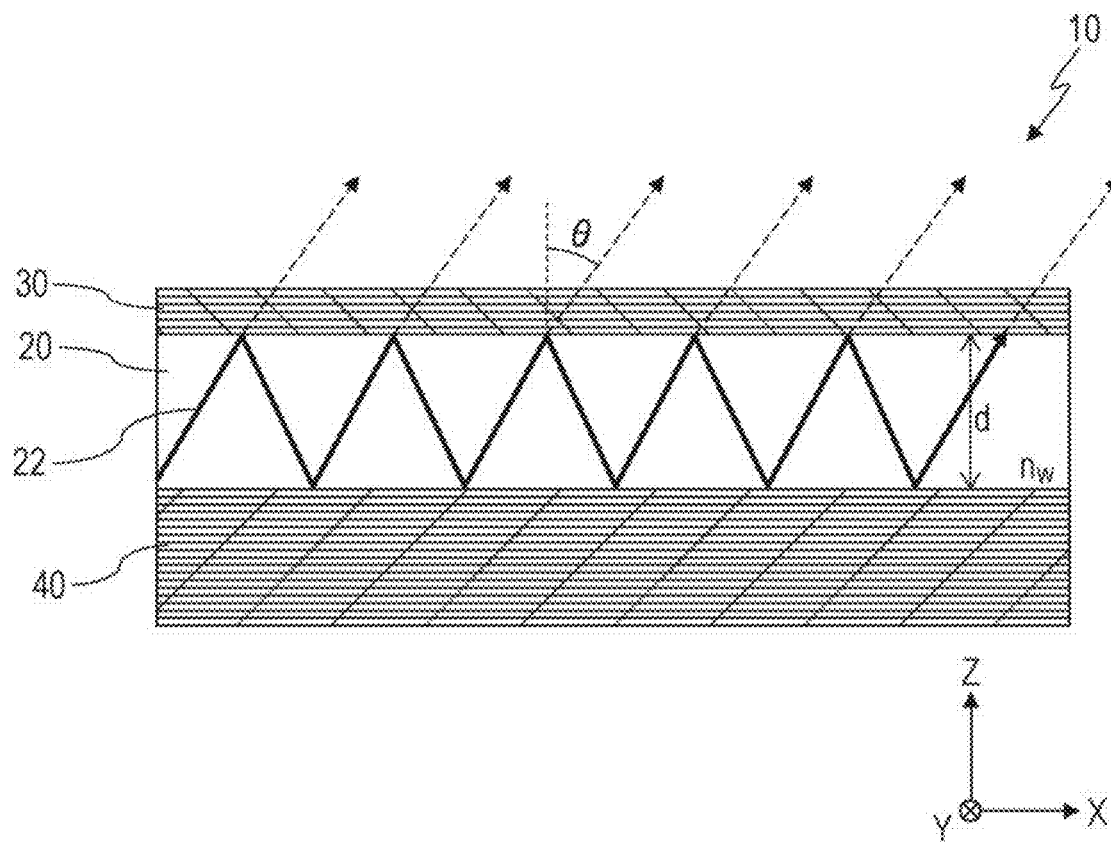
FIG. 8 schematically illustrates an exemplary cross-sectional structure of an optical waveguide element and exemplary light propagating in the optical waveguide element.

FIG. 8 schematically illustrates an exemplary cross-sectional structure of one optical waveguide element 10, and exemplary light propagating in the optical waveguide element 10. FIG. 8 schematically illustrates, with a direction perpendicular to the X- and Y-directions in FIG. 7 being defined as a Z-direction, a cross-section of the optical waveguide element 10 parallel to the XZ-plane of the optical waveguide element 10. The optical waveguide element 10 includes a pair of mirrors 30 and 40 disposed so as to sandwich the optical waveguide layer 20. Light 22 introduced from one end of the optical waveguide layer 20 in the X-direction propagates in the optical waveguide layer 20 while being repeatedly reflected by the first mirror 30 disposed on the upper surface of the optical waveguide layer 20 and by the second mirror 40 disposed on the lower surface of the optical waveguide layer 20. The first the mirror 30 has a light transmittance higher than the light transmittance of the second the mirror 40. This allows a portion of light to be output from the first mirror 30.

In a typical optical waveguide such as an optical fiber, light propagates along the optical waveguide while repeating total internal reflections. By contrast, in the optical waveguide element 10 according to Embodiment 1, light propagates while being reflected back and forth by the mirrors 30 and 40 disposed on the top and bottom of the optical waveguide layer 20. This means that there is no constraint on the angle of light propagation. As used herein, the term "angle of light propagation" means the angle of incidence at the interface between the mirror 30 or 40 and the optical waveguide layer 20. The optical waveguide element 10 allows propagation of light that is incident on the mirror 30 or the mirror 40 at an angle closer to the perpendicular. In other words, the optical waveguide element 10 allows propagation of light that is incident at an angle smaller than the critical angle for total internal reflection. Consequently, the group velocity of light in the direction of light propagation decreases significantly in comparison to the velocity of light in free space. The optical waveguide element 10 thus has a property such that the light propagation conditions change greatly with changes in the wavelength of light, the thickness of the optical waveguide layer 20, and the refractive index of the optical waveguide layer 20. Such an optical waveguide is referred to as "reflective optical waveguide" or "slow-light optical waveguide".

The emission angle θ at which light is emitted into air from the optical waveguide element 10 is represented by Formula 1 below.

$$\sin\theta = \sqrt{n_w^2 - \left(\frac{m\lambda}{2d}\right)^2} \tag{1}$$

As can be appreciated from Formula 1, the direction of light emission can be changed by changing one of the following values: the wavelength λ of light in air; the refractive index $n_w$ of the optical waveguide layer 20; and the thickness d of the optical waveguide layer 20.

For example, if $n_w$=2, d=387 nm, λ=1550 nm, and m=1, the emission angle is 0 degrees. If the refractive index $n_w$ is changed to 2.2 in this state, the emission angle changes to approximately 66 degrees. If the thickness d is changed to 420 nm without changing the refractive index, the emission angle changes to approximately 51 degrees. If the wavelength λ is changed to 1500 nm without changing neither the refractive index nor the thickness, the emission angle changes to approximately 30 degrees. In this way, the direction of light emission can be changed by changing one of the wavelength λ of light, the refractive index $n_w$ of the optical waveguide layer 20, and the thickness d of the optical waveguide layer 20.

The wavelength λ of light may, for example, fall within the wavelength region of 400 nm to 1100 nm (visible to near-infrared regions) for which high detection sensitivity is obtained with common image sensors that detect light through absorption of light in silicon (Si). In another example, the wavelength λ may fall within the near-infrared wavelength region of 1260 nm to 1625 nm that allows for relatively small transfer loss in optical fibers or Si optical waveguides. These wavelength ranges are intended to be illustrative only. The wavelength region of light to be used may not necessarily be the visible or infrared wavelength region but may be, for example, the ultraviolet wavelength region.

The light-emitting device may include a first adjustment element for changing at least one of the refractive index, thickness, or wavelength of the optical waveguide layer 20 in each optical waveguide element 10. This makes it possible to adjust the direction of emitted light.

The optical waveguide layer 20 may include a liquid crystal material or electro-optical material to adjust the refractive index of at least a portion of the optical waveguide layer 20. The optical waveguide layer 20 may be sandwiched by a pair of electrodes. By applying a voltage across the pair of electrodes, the refractive index of the optical waveguide layer 20 can be changed.

To adjust the thickness of the optical waveguide layer 20, for example, at least one actuator may be connected to at least one of the first mirror 30 or the second mirror 40. By using the at least one actuator to change the distance between the first mirror 30 and the second mirror 40, the thickness of the optical waveguide layer 20 can be changed. If the optical waveguide layer 20 is made of liquid, the thickness of the optical waveguide layer 20 can be easily changed.

For an optical waveguide array with the optical waveguide elements 10 arranged in one direction, the direction of light emission changes due to the interference of light emitted from each optical waveguide element 10. The direction of light emission can be changed by adjusting the phase of light supplied to each optical waveguide element 10. The principle of this operation is described below.

Figure 9A:
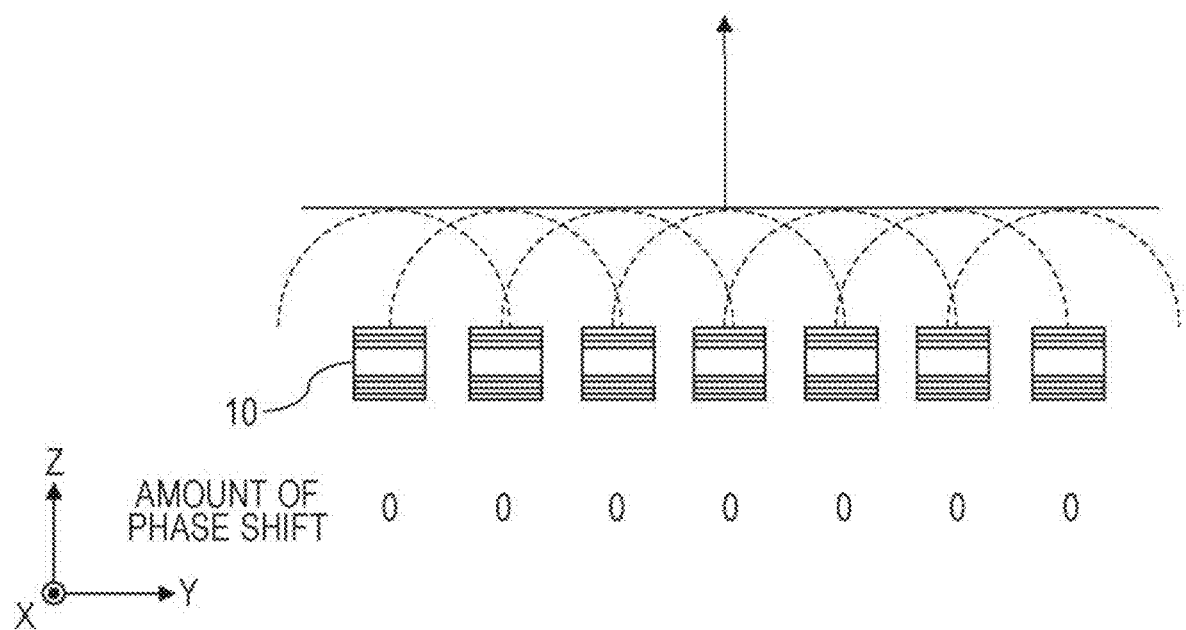
FIG. 9A schematically illustrates light being emitted in a direction perpendicular to the emitting surface of an optical waveguide array.

FIG. 9A illustrates a cross-section of an optical waveguide array that emits light in a direction perpendicular to the emitting surface of the optical waveguide array. FIG. 9A also illustrates the amount of phase shift of light propagating in each optical waveguide element 10. The amount of phase shift in this case is a value referenced to the phase of light propagating in the leftmost optical waveguide element 10. The optical waveguide array according to Embodiment 1 includes the optical waveguide elements 10 arranged at equal intervals. In FIG. 9A, the dashed arcs each represent the wavefront of light emitted from each optical waveguide element 10. The straight line represents the wavefront formed by interference of light. The arrow represents the direction of light emitted from the optical waveguide array (i.e., the direction of the wave vector). In the example illustrated in FIG. 9A, the rays of light propagating in the respective optical waveguide layers 20 of the optical waveguide elements 10 are all in phase with each other. In this case, light is emitted in a direction (Z-direction) perpendicular to both the direction in which the optical waveguide elements 10 are arranged (Y-direction) and the direction in which the optical waveguide layer 20 extends (X-direction).

Figure 9B:
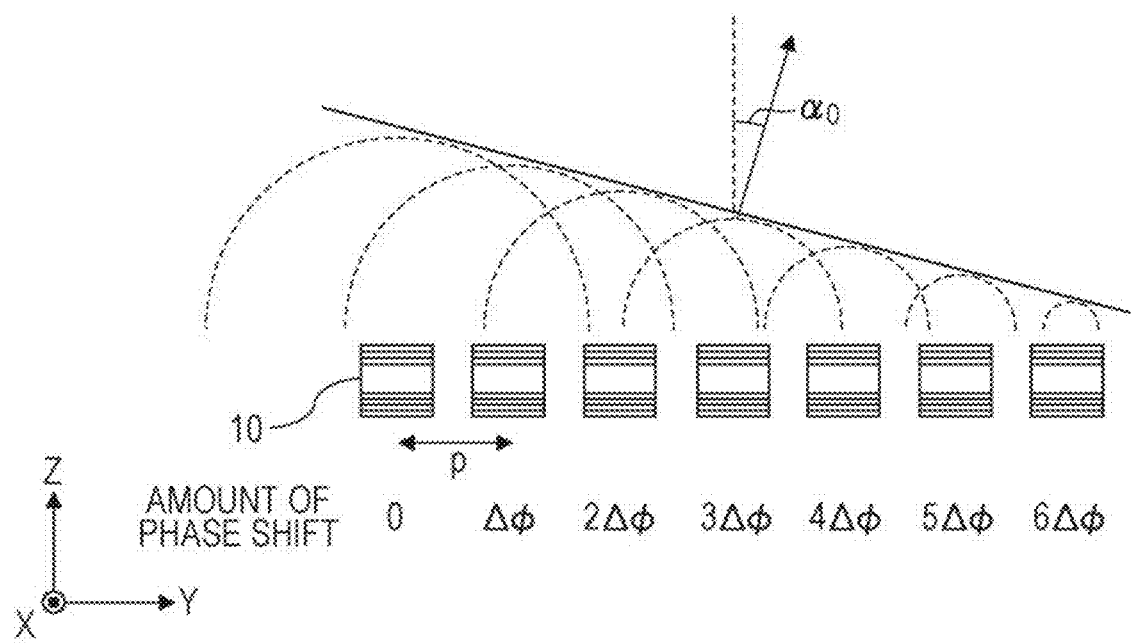
FIG. 9B schematically illustrates light being emitted in a direction different from the direction perpendicular to the emitting surface of an optical waveguide array.

FIG. 9B illustrates a cross-section of an optical waveguide array that emits light in a direction different from a direction perpendicular to the emitting surface of the optical waveguide array. In the example illustrated in FIG. 9B, light propagating in the optical waveguide layer 20 of each optical waveguide element 10 differs in phase by a fixed amount (Δφ) in the direction of arrangement of the optical waveguide elements 10. In this case, light is emitted in a direction different from the Z-direction. By changing the value of Δφ, the Y-direction component of the wave vector of light can be changed. If the distance between the centers of two adjacent optical waveguide elements 10 is p, then the emission angle $\alpha_0$ of light is represented by Formula 2 below.

$$\sin \alpha_0 = \frac{\Delta \phi \lambda}{2 \pi p} \qquad (2)$$

If the number of optical waveguide elements 10 is N, then the divergence angle Δα of the emission of light is represented by Formula 3 below.

$$\Delta \alpha = \frac{2\lambda}{Np \cos \alpha_0} \qquad (3)$$

Therefore, the greater the number of optical waveguide elements 10, the smaller the divergence angle Δα can be made.

Figure 10:
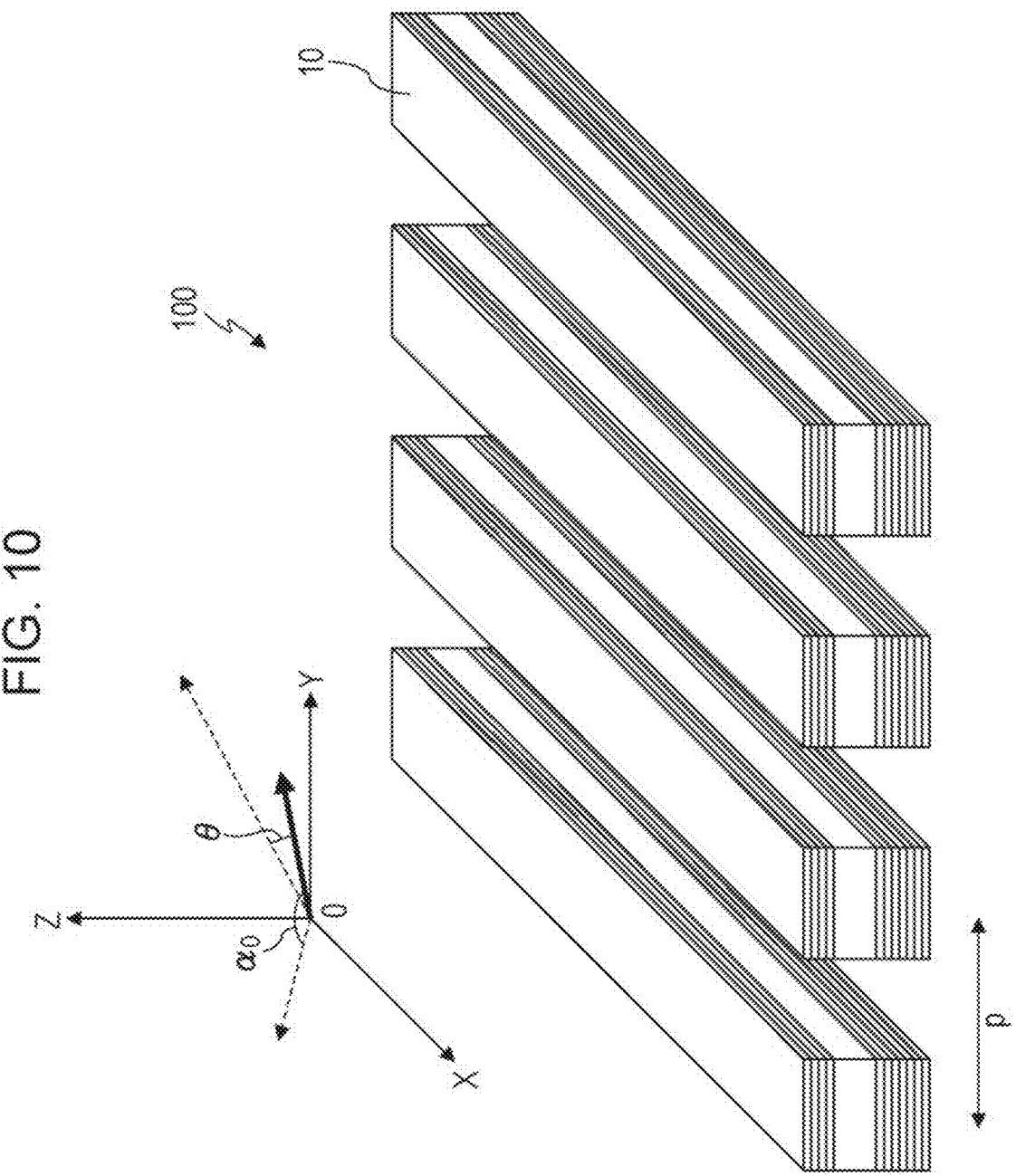
FIG. 10 is a schematic perspective view of an optical waveguide array in a three-dimensional space.

FIG. 10 is a schematic perspective view of an optical waveguide array in a three-dimensional space. The thick arrow in FIG. 10 represents the direction of light emitted from the light-emitting device. The symbol θ represents an angle formed by the direction of light emission and the YZ-plane. The angle θ satisfies Formula 1. The symbol $\alpha_0$ represents the angle formed by the direction of light emission and the XZ-plane. The angle $\alpha_0$ satisfies Formula 2.

To control the phase of light emitted from each optical waveguide element 10, for example, a phase shifter for changing the phase of light may be disposed at a location upstream of where light is introduced into the optical waveguide element 10. The light-emitting device may include plural phase shifters each connected to the corresponding one of the optical waveguide elements 10, and a second adjustment element for adjusting the phase of light propagating in each phase shifter. Each phase shifter includes an optical waveguide coupled to the optical waveguide layer 20 of the corresponding one of the optical waveguide elements 10 directly or via another optical waveguide. The second adjustment element changes the difference between the phases of light rays propagating from the phase shifters to the corresponding optical waveguide elements 10 to thereby change the direction of each of light rays emitted from the optical waveguide elements 10 (i.e., the third direction D3). In the following description, as with the optical waveguide array, an arrangement of plural phase shifters will be sometimes referred to as "phase shifter array".

Figure 11:
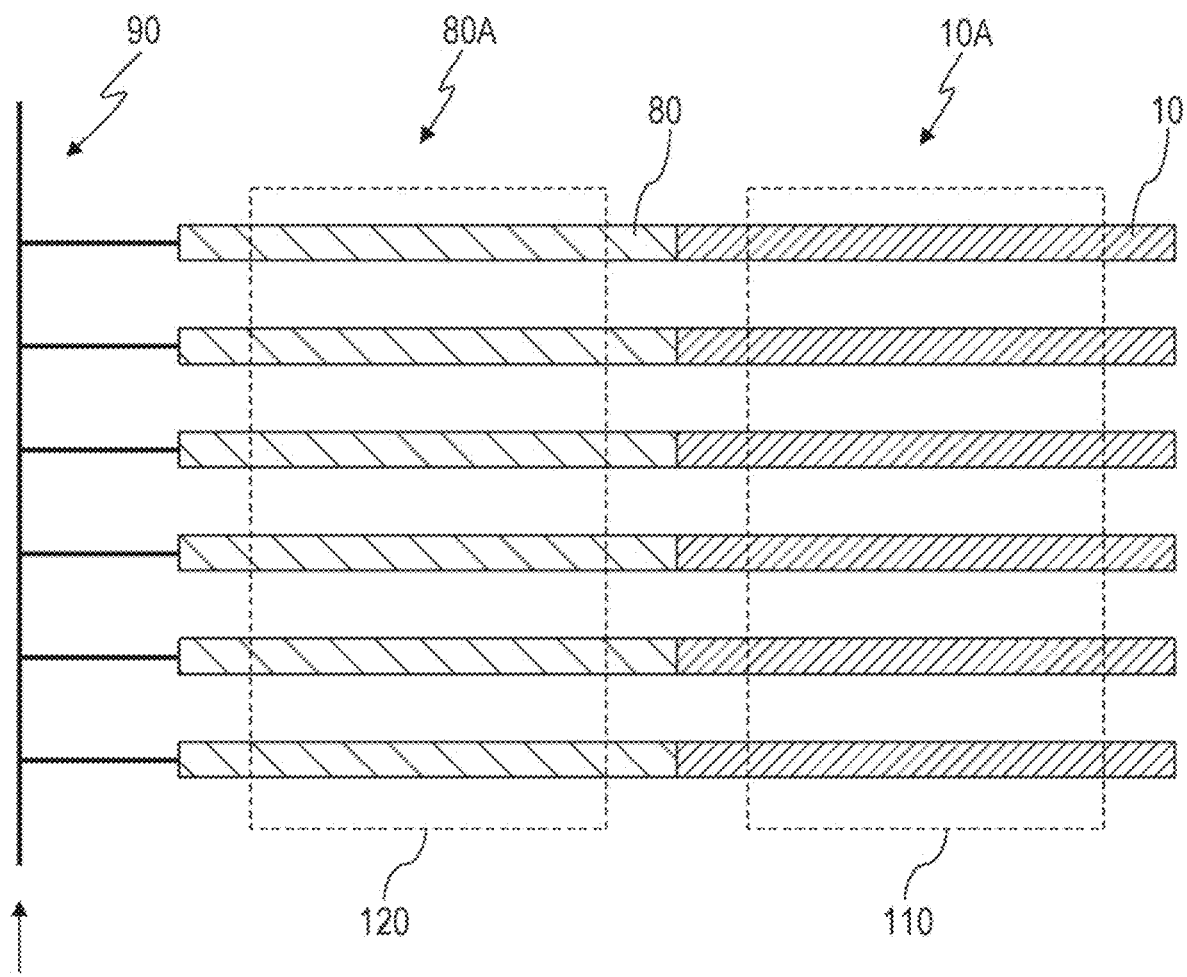
FIG. 11 illustrates an exemplary optical waveguide array and an exemplary phase shifter array.

FIG. 11 schematically illustrates an optical waveguide array 10A and a phase shifter array 80A as viewed in a direction normal to the light-emitting surface (Z-direction). In the example illustrated in FIG. 11, phase shifters 80 all have the same propagation characteristics, and the optical waveguide elements 10 all have the same propagation characteristics. Each phase shifter 80 and each optical waveguide element 10 may have the same length or may have a different length. If each phase shifter 80 has the same length, for example, the amount of phase shift of each phase shifter 80 can be adjusted by the drive voltage.

By employing a structure in which the respective lengths of the phase shifters 80 are varied in equal steps, it is possible to give phase shifts in equal steps with the same drive voltage. The light-emitting device further includes an optical divider 90 that divides light into branches each supplied to the corresponding phase shifter 80, a first driving circuit 110 that drives each optical waveguide element 10, and a second driving circuit 120 that drives each phase shifter 80. The straight arrow in FIG. 11 represents input of light. By independently controlling the first driving circuit 110 and the second driving circuit 120 that are provided separately, the direction of light emission can be varied two-dimensionally. In the present example, the first driving circuit 110 serves as one component of the first adjustment element, and the second driving circuit 120 serves as one component of the second adjustment element.

The first driving circuit 110 changes at least one of the refractive index or thickness of the optical waveguide layer 20 in each optical waveguide element 10 to thereby change the angle at which light is emitted from the optical waveguide layer 20. The second driving circuit 120 changes the refractive index of an optical waveguide 20 in each phase shifter 80 to thereby change the phase of light propagating in the optical waveguide 20. The optical divider 90 may be implemented by an optical waveguide in which light propagates through total internal reflection, or may be implemented by a reflective optical waveguide similar to the optical waveguide element 10.

The branches of light divided by the optical divider 90 may be introduced to the corresponding phase shifters 80 after having their phases controlled. This phase control may be performed by use of, for example, a passive phase control structure based on adjustment of the length of an optical waveguide up to the phase shifter 80. Alternatively, the phase control may be performed by using a phase shifter that has a function similar to the phase shifter 80 and can be controlled by an electrical signal. Through such methods, for example, the phase of light may be adjusted before the light is introduced into each phase shifter 80 such that all of the phase shifters 80 receive supply of light of equal phase. Through such an adjustment, the control of each phase shifter 80 by the second driving circuit 120 can be simplified.

Details of the operating principle and operation method of the light-emitting device mentioned above are disclosed in U.S. Patent Application Publication No. 2018/224709, the entire disclosure of which is incorporated herein by reference.

The light source 100 according to Embodiment 1 may be implemented by a combination of plural waveguide arrays that each emit light in a different direction. An exemplary configuration of such a light source 100 is described below.

Figure 12:
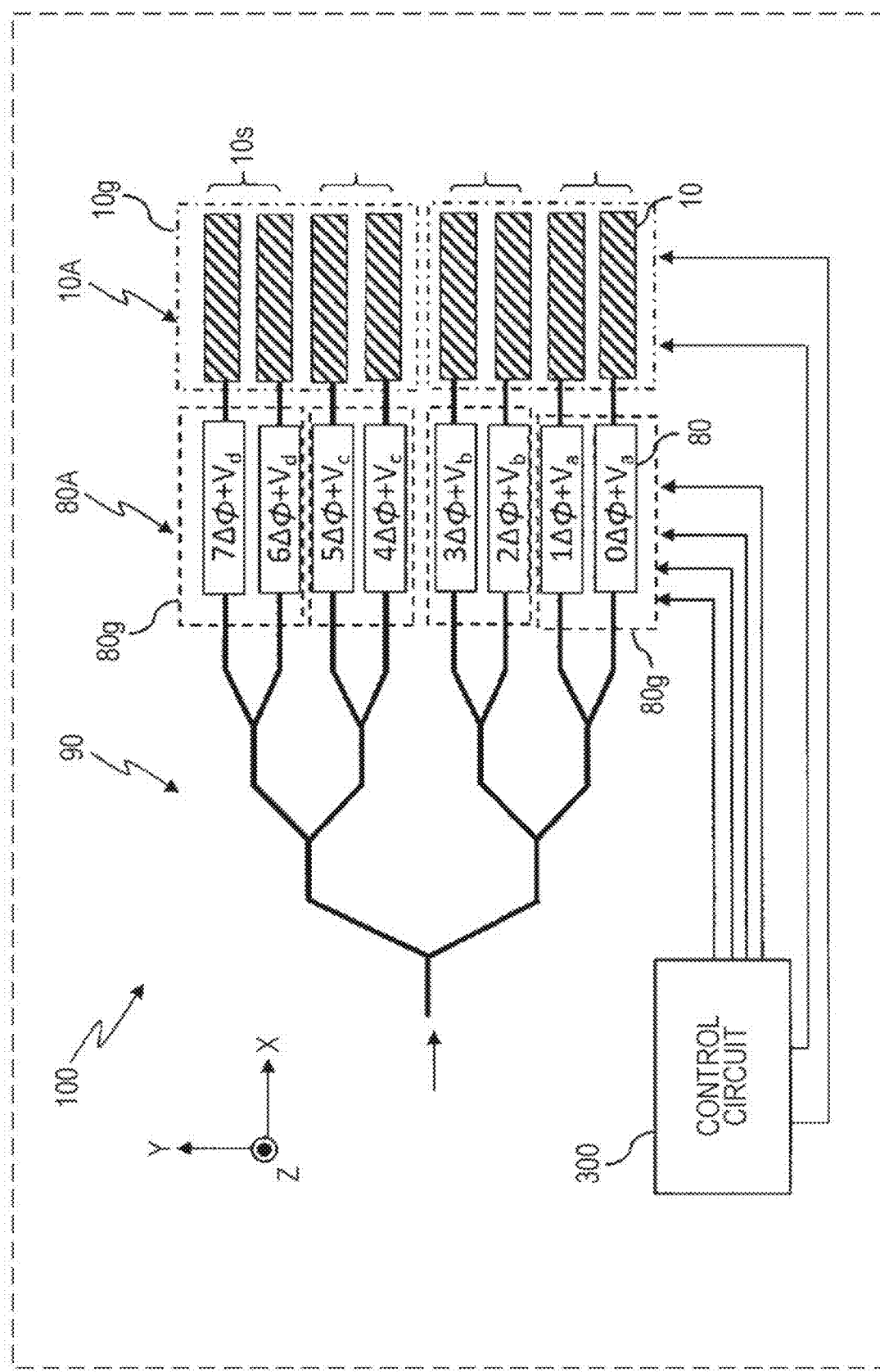
FIG. 12 illustrates an exemplary light source.

FIG. 12 illustrates an example of the light source 100. The light source 100 in this example includes the optical waveguide array 10A, and the phase shifter array 80A connected to the optical waveguide array 10A. The optical waveguide array 10A includes plural optical waveguide groups 10g arranged in the Y-direction. Each optical waveguide group 10g includes one or more optical waveguide elements 10. The phase shifter array 80A includes plural phase shifter groups 80g arranged in the Y-direction. Each phase shifter group 80g includes one or more phase shifters 80. In this example, a collection of phase shifter groups 80g differs from a collection of optical waveguide groups 10g. More specifically, two phase shifter groups 80g are connected to each one optical waveguide group 10g.

The amount of phase shift of each phase shifter 80 is individually controlled by the control circuit 300. The phase shifters 80 each provide an amount of phase shift that is controlled to be the sum of a first amount of phase shift (an integer multiple of $\Delta\varphi$) based on the order of the arrangement of the phase shifters 80, and a second amount of phase shift ($V_a$, $V_b$, $V_c$, or $V_d$) that differs for each phase shifter group 80g. By varying the second amount of phase shift for each phase shifter group 80g, the Y-component in the direction of light beam emission, and the divergence angle in the Y-direction of the spot size are controlled.

The control circuit 300 determines the value of applied voltage individually for each optical waveguide group 10g. By controlling the voltage applied to each optical waveguide group 10g, the X-component in the direction of light beam emission is controlled. The direction of light emission is determined dependent on how the phase shifter groups 80g and the optical waveguide groups 10g are combined. In the example illustrated in FIG. 12, light is emitted in the same direction from two adjacent optical waveguide groups 10s each connected to a single shifter group 80g. If the radiant flux of light emitted from a single optical waveguide group 10g is defined as a single light beam, two light beams can be emitted simultaneously in the example illustrated in FIG. 12. Increasing the number of optical waveguide elements 10 and the number of phase shifters 80 makes it possible to further increase the number of beams.

Figure 13:
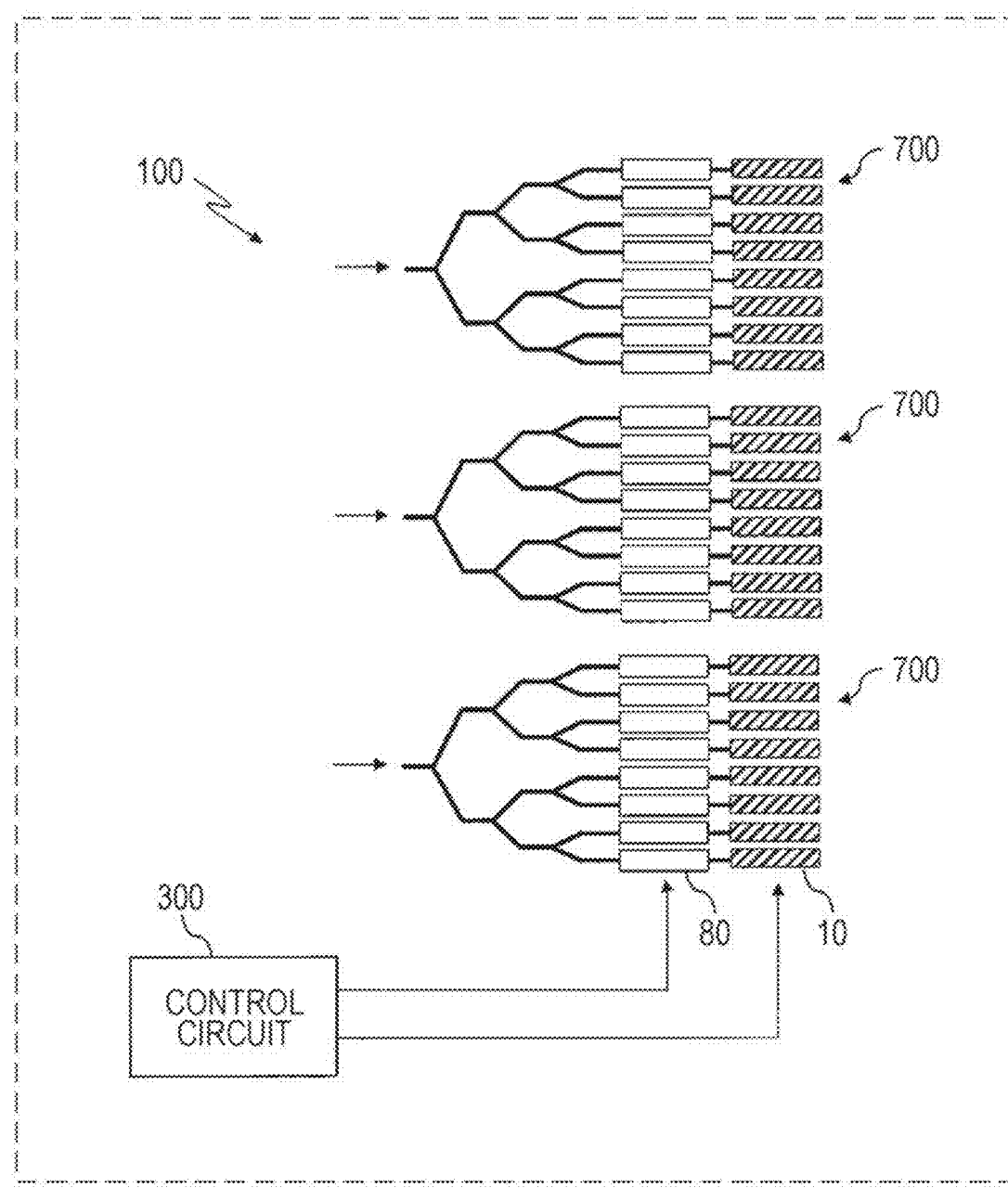
FIG. 13 illustrates another exemplary light source.

FIG. 13 illustrates another exemplary configuration of the light source 100. The light source 100 in this example includes plural light-emitting devices 700 that each emit a light beam in a different direction. In this example, plural phase shifters 80 and plural optical waveguide elements 10 are mounted on a single chip. The control circuit 300 controls the voltage applied to each phase shifter 80 and each optical waveguide element 10 in each light-emitting device 700. The control circuit 300 thus controls the direction of a light beam emitted from each light-emitting device 700. Although the light source 100 includes three light-emitting devices 700 in this example, the light source 100 may include more light-emitting devices 700. Each of a short-range beam and a long-range beam may be made up of a collection of light beams emitted from the light-emitting devices 700.

Figure 14:
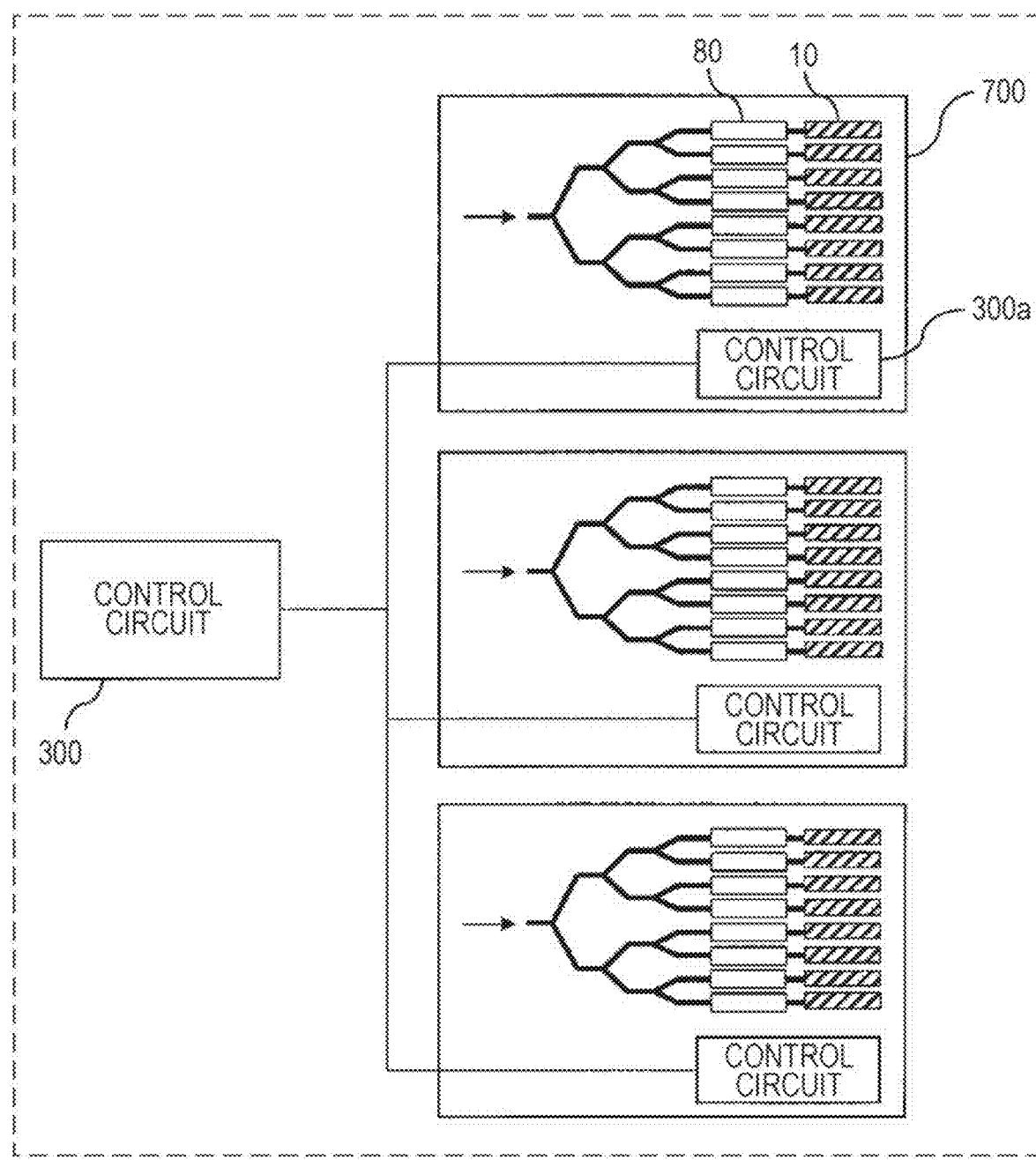
FIG. 14 illustrates still another exemplary light source.

FIG. 14 illustrates still another exemplary configuration of the light source 100. The light source 100 in this example includes plural light-emitting devices 700 each mounted on a different chip. The light-emitting devices 700 emit light beams in different directions. Each light-emitting device 700 includes a control circuit 300a that determines a voltage applied to each phase shifter 80 and each optical waveguide element 10. The control circuit 300a of each light-emitting device 700 is controlled by the control circuit 300 external to the light-emitting device 700. Although the light source 100 includes three light-emitting devices 700 in this example as well, the light source 100 may include more light-emitting devices 700. Each of a short-range beam and a long-range beam may be made up of a collection of light beams emitted from the light-emitting devices 700.

1-1-3. Configuration of Image Sensor 200

Reference is now made to the configuration of the image sensor 200 illustrated in FIG. 3.

The image sensor 200 includes plural photodetector elements arranged two-dimensionally on its photodetection surface. The image sensor 200 may be, for example, a charge-coupled device (CCD) sensor, a complementary metal oxide semiconductor (CMOS) sensor, or an infrared array sensor. Each photodetector element includes, for example, a photoelectric conversion element such as a photodiode, and one or more charge accumulators. Charge produced by photoelectric conversion is accumulated in the charge accumulator during an exposure period. The charge accumulated in the charge accumulator is output after the end of the exposure period.

In this way, each photodetector element outputs an electrical signal responsive to the amount of light received during the exposure period. This electrical signal is referred to as "photodetection data". The image sensor 200 may be a monochrome imaging element, or may be a color imaging element. For example, the image sensor 200 may be a color imaging element having an R/G/B, R/G/B/IR, or R/G/B/W filter. The image sensor 200 may have detection sensitivity not only for the visible wavelength range but also for, for example, ultraviolet, near-infrared, mid-infrared, far-infrared, or other wavelength ranges. The image sensor 200 may be a sensor using a single photon avalanche diode (SPAD). The image sensor 200 may include an electronic shutter mechanism capable of exposing signals of all pixels at once, that is, a global shutter mechanism.

Although Embodiment 1 uses the image sensor 200, a photodetector device different from the image sensor 200 may be used. For example, a photodetector device including plural one-dimensionally arranged photodetector elements may be used.

1-1-4. Configuration of Signal Processing Circuit 400

The signal processing circuit 400 may include one or more processors such as a CPU and/or a GPU to process a signal output from the image sensor 200. The signal processing circuit 400 illustrated in FIG. 3 includes a recognition processing unit 410, and an object-distance calculator 430. The recognition processing unit 410 recognizes one or more objects in a scene based on a signal output from the image sensor 200. The object-distance calculator 430 calculates the distance to each recognized object. The function of the recognition processing unit 410 and the function of the object-distance calculator 430 may be implemented by, for example, execution of a computer program by a processor of the signal processing circuit 400. In that case, the processor functions as the recognition processing unit 410 and the object-distance calculator 430. Alternatively, these functional units may be implemented by dedicated hardware.

1-2. Operation of Object Recognition Apparatus

Figure 15:
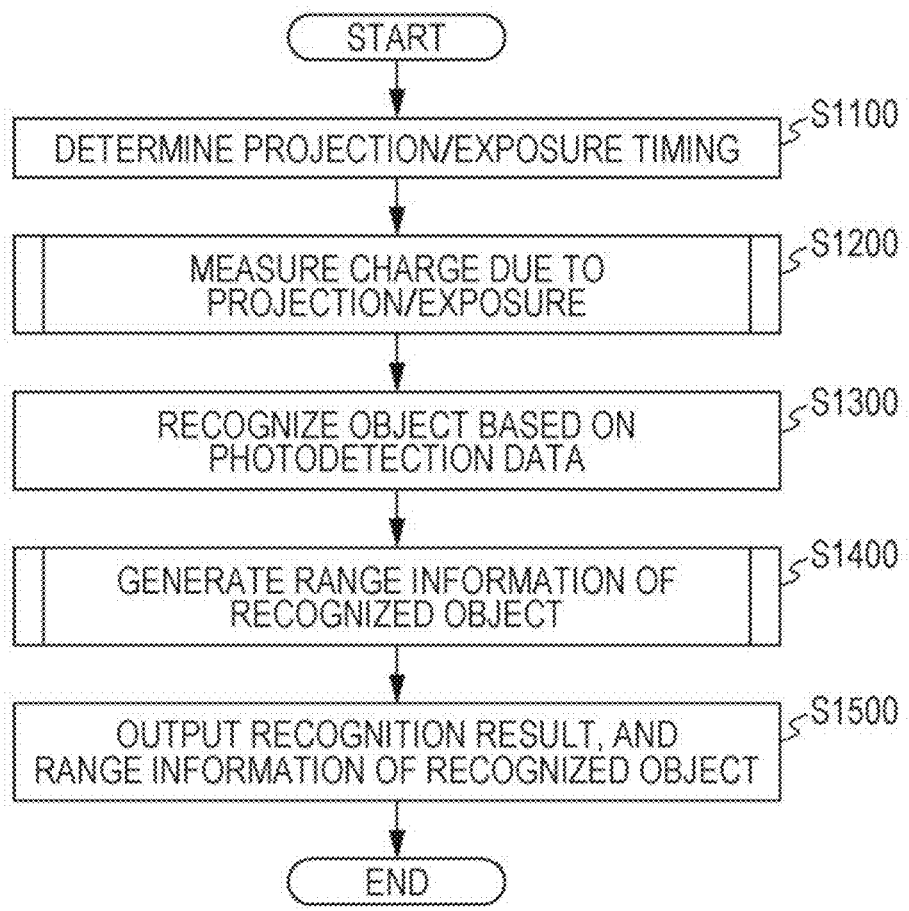
FIG. 15 is a flowchart illustrating an overview of operation of the object recognition apparatus according to Embodiment 1.

Operation of the object recognition apparatus according to Embodiment 1 is described below. FIG. 15 is a flowchart illustrating an overview of operation of the object recognition apparatus according to Embodiment 1. The object recognition apparatus executes steps S1100 to S1500 illustrated in FIG. 15. Each of these steps is described below.

Step S1100

First, the control circuit 300 determines the timing of projection of each of short-range beams and long-range beams by the light source 100, and the timing of exposure of the image sensor 200. The projection and exposure timings will be described in detail later.

Step S1200

Subsequently, in accordance with the determined projection timing, the control circuit 300 transmits a control signal to the light source 100 that instructs the light source 100 to project light. Further, in accordance with the determined exposure timing, the control circuit 300 transmits a control signal to the image sensor 200 that instructs the image sensor 200 to start and end exposure. As a result, plural long-range beams and plural short-range beams are emitted from the light source 100, and charge is accumulated in each photodetector element of the image sensor 200. In Embodiment 1, two exposure periods are set as mentioned above. The image sensor 200 outputs photodetection data responsive to the amount of charge accumulated in each photodetector element during each exposure period.

Step S1300

Subsequently, the signal processing circuit 400 acquires the photodetection data output at step S1200. The recognition processing unit 410 of the signal processing circuit 400 recognizes an object in a scene based on the acquired photodetection data. The recognition process is performed in accordance with an object recognition model, which is a learned model pre-trained in accordance with a machine learning algorithm. The object recognition model is generated by a learning apparatus of an object recognition system described later, and pre-stored on a storage medium included in the signal processing circuit 400 or on a storage medium electrically connected to the signal processing circuit 400. The recognition processing unit 410 applies the object recognition model to the photodetection data output from the image sensor 200 to thereby recognize one or more objects present in a scene. Examples of objects to be recognized include a human being, a bicycle, and an automobile. The recognition processing unit 410 outputs, together with the result of object recognition, for example, a label such as "human being", "automobile", or "bicycle", information for identifying the location of the object on the image, for example, the pixel region of the object.

Step S1400

The object-distance calculator 430 of the signal processing circuit 400 calculates, for each object recognized at step S1300, the distance to the object based on photodetection data corresponding to plural pixels where the object is located. The method for calculating the distance will be described in detail later.

Step S1500

The signal processing circuit 400 outputs information representing the object recognized at step S1300, and the distance to the object calculated at step S1400. The output results may be, for example, stored in the storage device 500, and displayed on the display 600.

1-2-1. Projection/Reception Timing

Reference is now made to an example of the timing of projection of each light beam and the timing of exposure in accordance with Embodiment 1.

Figure 16:
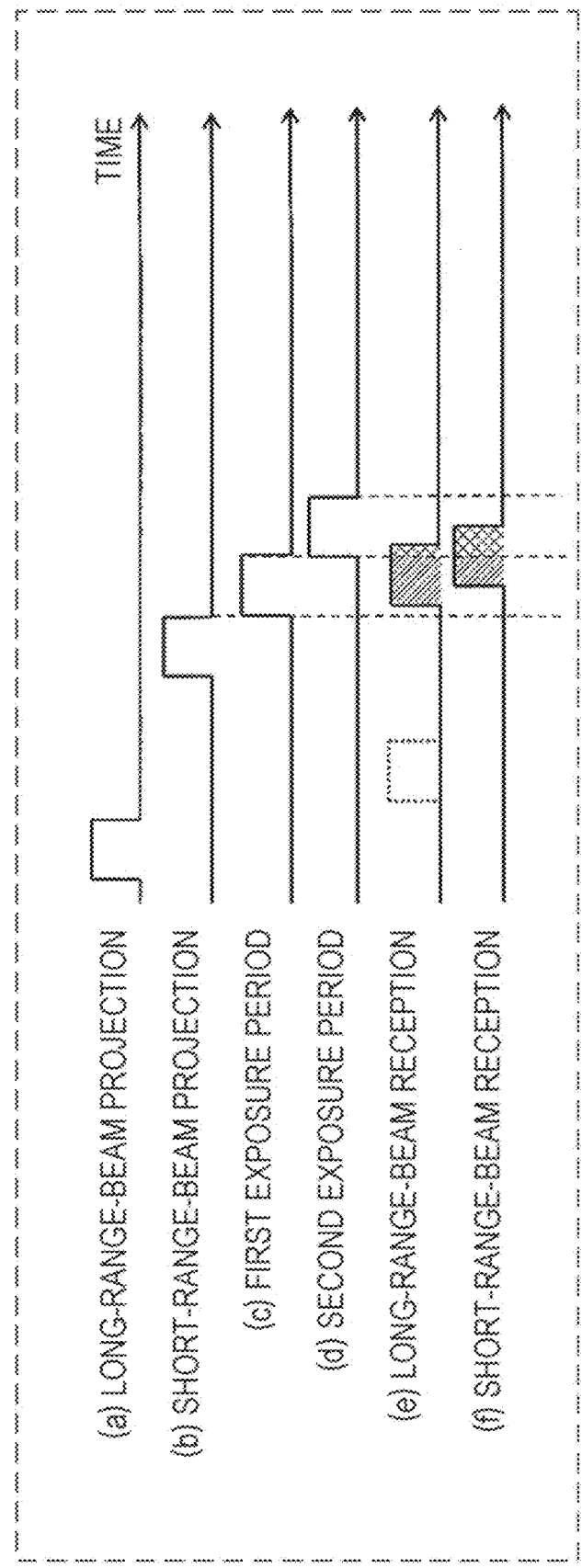
FIG. 16 illustrates an example of the timing of projection of each light beam and the timing of exposure in accordance with Embodiment 1.

FIG. 16 schematically illustrates an example of the timing of projection of each light beam and the timing of exposure in accordance with Embodiment 1. FIG. 16(a) illustrates the timing of long-range-beam projection. FIG. 16(b) illustrates the timing of short-range beam projection. FIG. 16(c) illustrates a first exposure period. FIG. 16(d) illustrates a second exposure period.

The first exposure period starts simultaneously with the end of short-range beam projection, and ends with the elapse of time equal to the pulse width of each beam. The second exposure period starts with the end of the first exposure period, and ends with the elapse of time equal to the first exposure period.

The solid pulse in FIG. 16(e) represents the timing when the reflected light of the long-range beam reflected by a distant object (e.g., located in the range of 100 m to 200 m from the object recognition apparatus) returns to the object recognition apparatus. The dashed pulse in FIG. 16(e) represents the timing when the reflected light of the long-range beam reflected by a near object (e.g., located in the range of less than 100 m from the object recognition apparatus) returns to the object recognition apparatus. FIG. 16(*f*) represents the timing when the reflected light of the short-range beam reflected by a near object (e.g., located in the range of less than 100 m from the object recognition apparatus) returns to the object recognition apparatus.

The projection of long-range beams precedes the projection of short-range beams. Each exposure period is set such that both a long-range beam reflected at a long distance and a short-range beam reflected at a short distance are received in at least one of the two exposure periods.

The dashed pulse in FIG. 16(*e*) represents the reflected light of the long-range beam that has returned after being reflected by a near object. This reflected light returns to the object recognition apparatus at a time that falls outside all exposure periods. The image sensor 200 thus does not detect this light. The image sensor 200 does not detect the long-range light beam reflected by an object located at a distance of, for example, less than 100 m. The short-range light beam has a smaller energy per unit area on the irradiated surface than the long-range light beam, and thus has a shorter maximum range than the long-range light beam. Therefore, if the short-range beam is reflected by an object located at a distance of, for example, greater than or equal to 100 m from the object recognition apparatus, the short-range beam is undetectable due to attenuation of its intensity. Thus, the short-range light beam will not be detected in the exposure periods corresponding to the next and subsequent projections of light. The short-range light beam and the long-range light beam may have the same maximum range. In that case as well, providing a sufficient interval of time before the next projection of light helps to ensure that the short-range light beam reflected by a distant object will not be detected in the next and subsequent exposure periods.

In the example illustrated in FIG. 16, the second exposure period starts immediately with the end of the first exposure period. The image sensor 200 includes two charge accumulators per pixel, and is thus able to switch, for each exposure period, which charge accumulator is used to accumulate charge. In the present example, after the first exposure period and the second exposure period end, a period for outputting charge accumulated in each charge accumulator may be provided.

By contrast, if the image sensor 200 includes one charge accumulator per pixel, a period for outputting accumulated charge is provided after the end of each exposure period. In such a case, as illustrated in FIG. 17, exposure is performed only once for each single long-range-beam projection and short-range-beam projection, and when each beam is projected next time, exposure may be performed at a timing different from the previous one.

Figure 17:
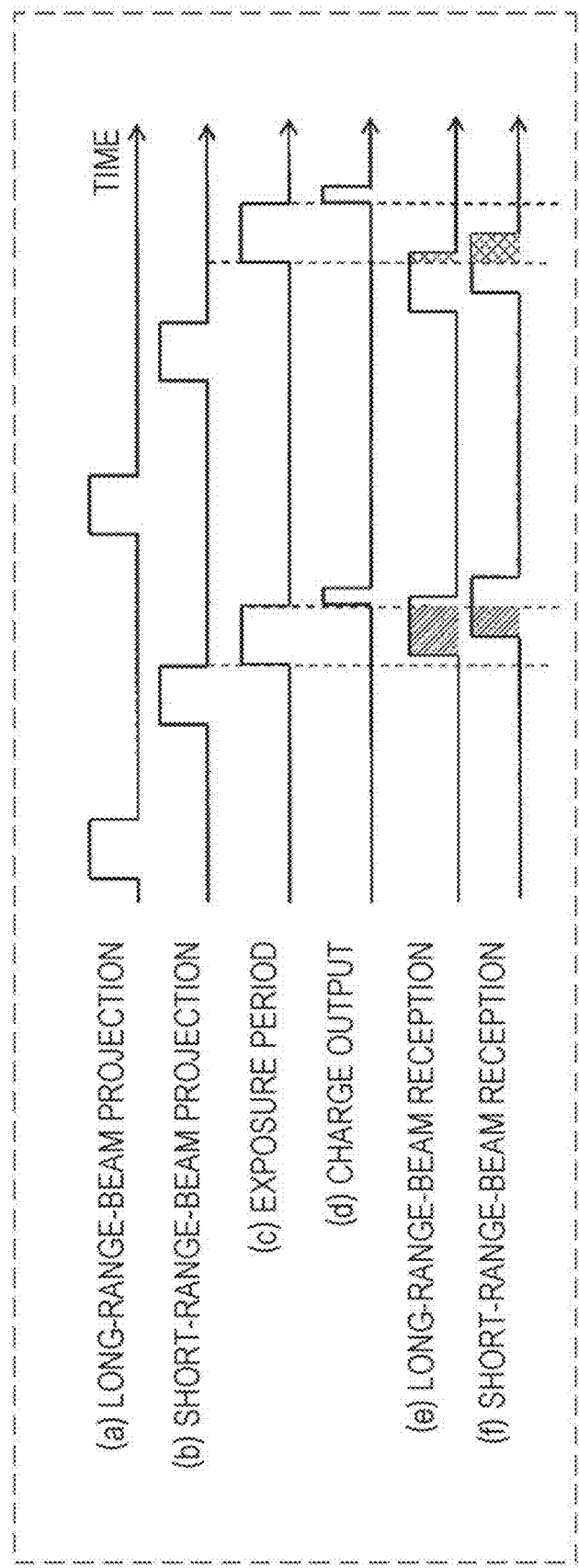
FIG. 17 schematically illustrates another example of the timing of projection of each light beam and the timing of exposure in accordance with Embodiment 1.

FIG. 17 illustrates an example of the timings of projection and exposure for a case where a period for charge output is provided after each exposure period. In this example, in the first exposure period subsequent to the projection of the long-range and short-range beams, the image sensor 200 accumulates and outputs the charge due to the reflected light of each beam. Then, after the elapse of a predetermined time, long-range and short-range beams are projected under the same conditions as the previous time. When, after the end of this second short-range-beam projection, an amount of time corresponding to the first exposure period elapses, the second exposure period is started. In the second exposure period, the image sensor 200 accumulates and outputs the charge due to the reflected light of each beam. As described above, in the example illustrated in FIG. 17, the image sensor 200 outputs charge every time exposure ends. Accordingly, the light source 100 performs projection of light plural times in succession by using a combination of long-range and short-range beams under the same conditions. Exposure of the image sensor 200 is performed at a different timing for each projection. This makes it possible to acquire a voltage due to the charge accumulated in each exposure period.

The number of exposure periods is not limited to two. Three or more consecutive exposure periods may be provided. The timings of projection and exposure may differ from the timings mentioned above. The timings of projection and reception may be adjusted in accordance with various conditions including the distance range setting for each light beam.

For the case illustrated in FIG. 17 as well, that is, for a case where exposure is performed only once after each projection of long-range and short-range beams, the image sensor 200 may include two charge accumulators per pixel, and switch, for each exposure period, which charge accumulator is used to accumulate charge. In this case, the image sensor 200 may, after repeating projection and exposure plural times, output charge accumulated in each charge accumulator.

1-2-2. Measurement of Charge Due to Projection/Exposure

Detailed reference is now made to the charge measurement at step S1200.

Figure 18:
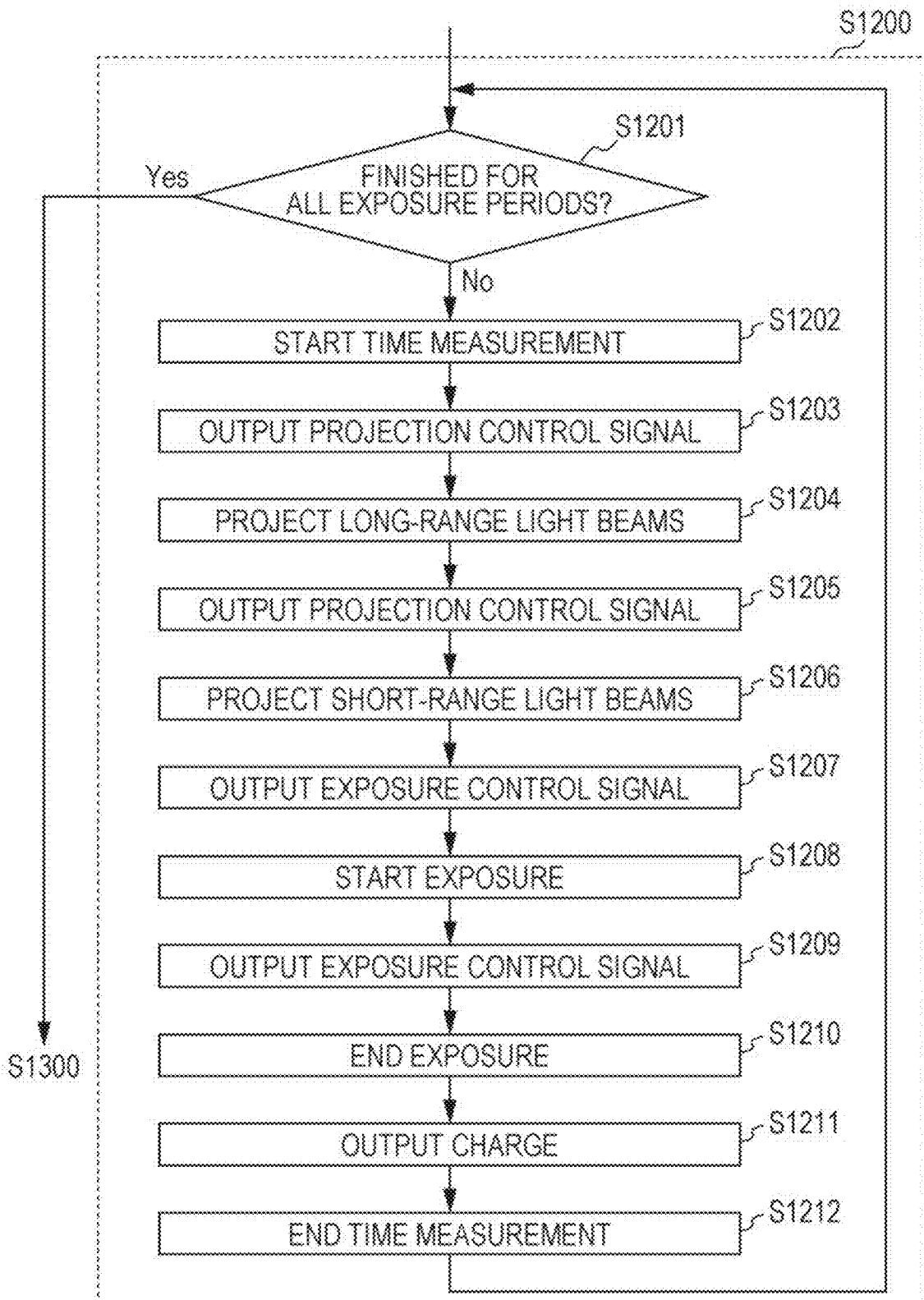
FIG. 18 is a flowchart illustrating exemplary charge measurement.

FIG. 18 is a flowchart of the charge measurement illustrated in the example of FIG. 17. The object recognition apparatus executes steps S1201 to S1212 illustrated in FIG. 18. Each of these steps is described below.

Step S1201

The control circuit 300 determines whether charge measurement has been finished for all exposure periods determined at step S1100. If charge measurement has been finished for all exposure periods, the flowchart proceeds to step S1300. If charge measurement has not been finished yet for all exposure periods, the flowchart proceeds to step S1202.

Step S1202

The control circuit 300 starts measurement of time in order to control projection and exposure.

Step S1203

The control circuit 300 outputs a projection control signal to the light source 100 at the timing of projection of long-range beams determined at step S1100. The projection control signal includes information about the shape, divergence angle, and direction of each light beam represented by the long-range beam information 311, and information about the projected pulse duration determined at step S1100.

Step S1204

The light source 100 generates and projects long-range beams in accordance with the projection control signal output at step S1203.

Step S1205

The control circuit 300 outputs a projection control signal to the light source 100 at the timing of projection of short-range beams determined at step S1100. The projection control signal includes information about the shape, divergence angle, and direction of each light beam represented by the short-range beam information 312, and information about the projected pulse duration determined at step S1100.

Step S1206

The light source 100 generates and projects short-range beams in accordance with the projection control signal output at step S1203.

Step S1207

The control circuit 300 selects, from among plural exposure periods determined at step S1100, one exposure period for which exposure has not been performed yet. The control circuit 300 outputs an exposure start signal to the image sensor 200 at the timing when the selected exposure period starts.

Step S1208

The image sensor 200 starts exposure in accordance with the exposure start signal output at step S1207.

Step S1209

The control circuit 300 outputs an exposure end signal to the image sensor 200 at the timing when the exposure period selected at step S1207 ends.

Step S1210

The image sensor 200 ends exposure in accordance with the exposure end signal output at step S1209.

Step S1211

The image sensor 200 outputs photodetection data responsive to the amount of charge accumulated in each pixel during the period of time from the start of exposure to the end of exposure.

Step S1212

The control circuit 300 ends measurement of time. After step S1212, the flowchart returns to step S1201.

Through the series of steps S1201 to S1212, projection of light by the light source 100, and exposure of the image sensor 200 are performed. For each exposure period, photodetection data responsive to the amount of charge accumulated in each pixel of the image sensor 200 is output.

1-2-3. Generation of Range Information for Recognized Object

Figure 19:
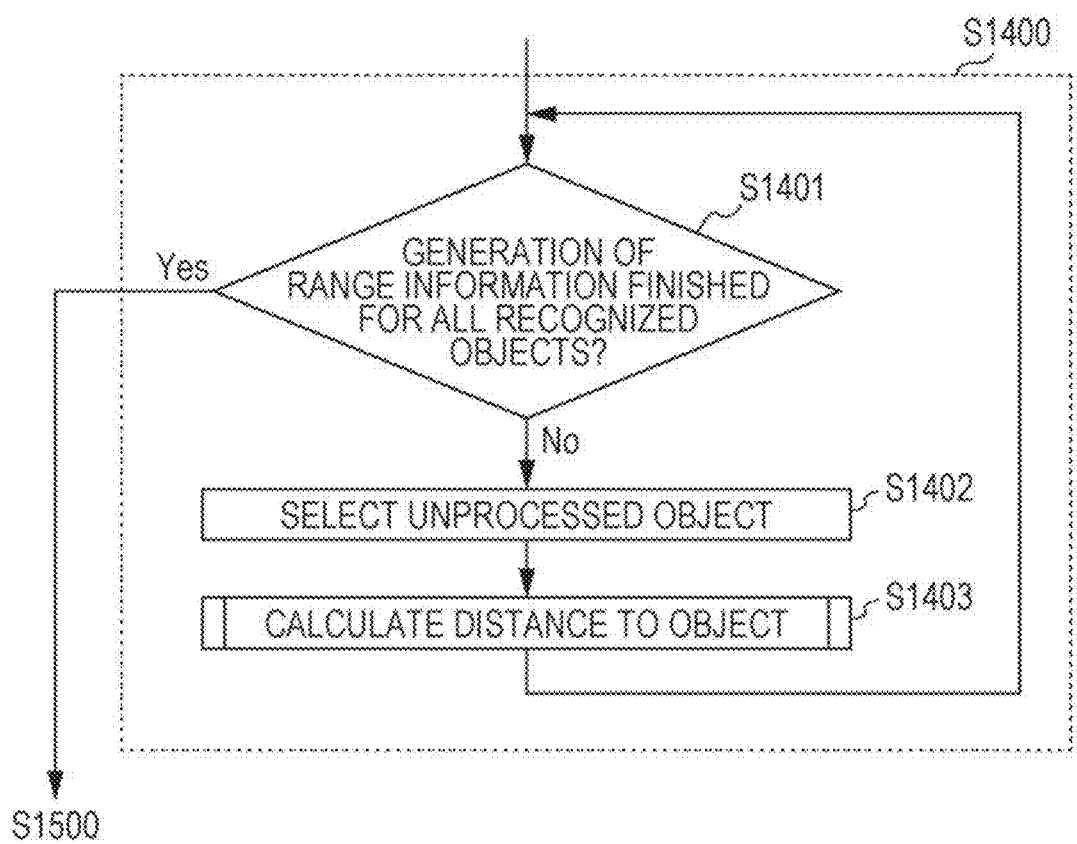
FIG. 19 is a flowchart illustrating exemplary range-information generation.

Detailed reference is now made to the generation of range information at step S1400 illustrated in FIG. 15. FIG. 19 is a flowchart illustrating exemplary range-information generation performed at step S1400.

The signal processing circuit 400 generates, through execution of steps S1401 to S1403, range information for one or more objects recognized at step S1300. These steps are executed by the object-distance calculator 430 of the signal processing circuit 400. Each of these steps is described below.

Step S1401

First, the signal processing circuit 400 determines whether generation of range information has been finished for all of the one or more objects recognized at step S1300. If generation of range information has been finished for all of the objects, the flowchart proceeds to step S1500. If generation of range information has not been finished yet for all of the objects, the flowchart proceeds to step S1402.

Step S1402

The signal processing circuit 400 selects, from among the objects recognized at step S1300, an object whose distance has not been calculated yet.

Step S1403

The signal processing circuit 400 calculates the distance between the object selected at step S1402, and the object recognition apparatus. Once the distance is calculated, the flowchart returns to step S1401. Details of this distance calculation will be given later.

By repeating steps S1401 to S1403, range information can be generated for all of the one or more objects recognized at step S1300.

Figure 20:
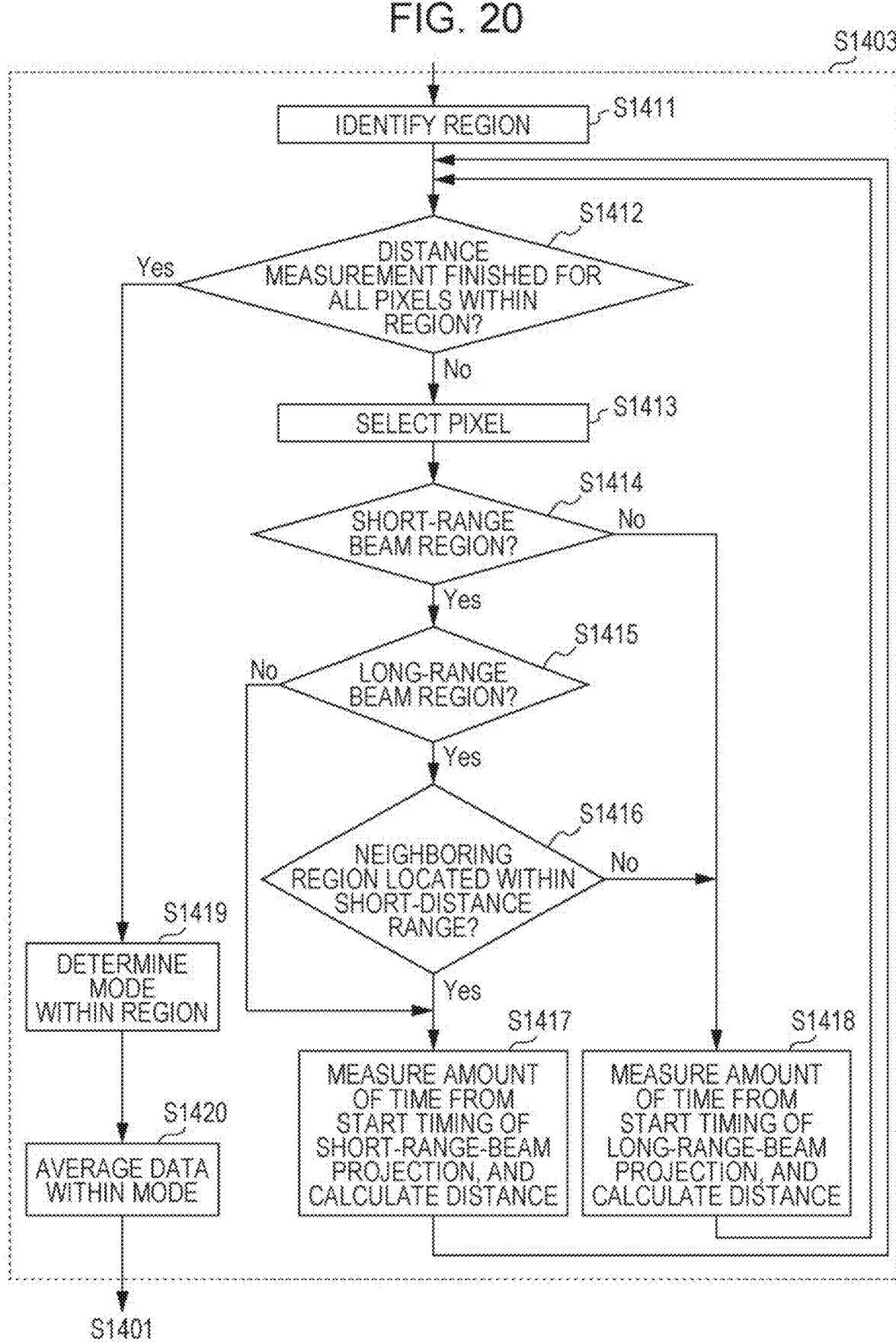
FIG. 20 is a flowchart illustrating a specific example of step S1403 illustrated in FIG. 19.

Reference is now made to FIG. 20 to describe a specific example of the distance calculation performed at step S1403. FIG. 20 is a flowchart illustrating a specific example of step S1403 illustrated in FIG. 19.

Step S1411

The signal processing circuit 400 identifies a pixel region where the object selected at step S1402 is located on an image. In Embodiment 1, at step S1300, the recognition processing unit 410 outputs, together with the result of object recognition, for example, a label such as "human being" or "automobile", information representing where the object is located on the image. Based on the information, the object-distance calculator 430 determines a pixel region corresponding to the object.

Step S1412

The signal processing circuit 400 determines whether calculation of distance has been finished for all of those pixels located within the pixel region identified at step S1411 and for which measurement results exist. If the determination is "Yes", the flowchart proceeds to step S1419. If the determination is "No", the flowchart proceeds to step S1413.

Step S1413

The signal processing circuit 400 selects, from among those pixels within each pixel region for which measurement results exist, any pixel for which calculation of distance has not been finished yet.

Step S1414

The signal processing circuit 400 determines whether the pixel selected at step S1413 is a pixel that has received the reflected light of a short-range beam during each exposure period. The signal processing circuit 400 is able to determine, based on information about the direction of projection included in the short-range beam information 312, whether the pixel is a pixel that receives the reflected light of a short-range beam during each exposure period. If the pixel is a pixel that has received the reflected light of a short-range beam during each exposure period, the flowchart proceeds to step S1415. If the pixel is not a pixel that has received the reflected light of a short-range beam during each exposure period, the flowchart proceeds to step S1418.

Step S1415

The signal processing circuit 400 determines whether the pixel selected at step S1413 is a pixel that has received the reflected light of a long-range beam during each exposure period. The signal processing circuit 400 is able to determine, based on information about the direction of projection included in the long-range beam information 311, whether the pixel is a pixel that has received the reflected light of a long-range beam during each exposure period. If the pixel is a pixel that has received the reflected light of a long-range beam during each exposure period, the flowchart proceeds to step S1416. If the pixel is not a pixel that has received the reflected light of a long-range beam during each exposure period, the flowchart proceeds to step S1417.

Step S1416

The signal processing circuit 400 determines whether, within the pixel region corresponding to the object, a neighboring region of the pixel selected at step S1413 corresponds to a short-distance range. For example, it is determined whether a predetermined number of (e.g., five) pixels closest to the above-mentioned pixel and each having a measurement value corresponds to the distance range of short-range beams or corresponds to the distance range of long-range beams. If the number of pixels corresponding to the distance range of short-range beams is greater than or equal to the number of pixels corresponding to the distance range of long-range beams, the flowchart proceeds to step S1417. If the number of pixels corresponding to the distance range of short-range beams is less than the number of pixels corresponding to the distance range of long-range beams, the flowchart proceeds to step S1418. The determination of whether each pixel corresponds to the distance range of short-range beams or corresponds to the distance range of long-range beams can be made based on information about the direction of projection included in each of the long-range beam information 311 and the short-range beam information 312.

Step S1417

The signal processing circuit 400 calculates distance by the indirect ToF method, from the signal value of the above-mentioned pixel in the first exposure period and the signal value of the above-mentioned pixel in the second exposure period that are output by the image sensor 200. The distance is calculated by, for example, a method similar to the method described above with reference to FIG. 6A. It is to be noted, however, that the example in FIG. 16 and the example in FIG. 17 differ from the example in FIG. 6A in how each exposure period is set. Accordingly, a calculation method that takes this difference into consideration is used. After step S1417, the flowchart returns to step S1412.

Step S1418

The signal processing circuit 400 calculates distance by the indirect ToF method, from the signal value of the above-mentioned pixel in the first exposure period and the signal value of the above-mentioned pixel in the second exposure period that are output by the image sensor 200. The signal processing circuit 400 adds the calculated distance to the minimum distance for which the reflected light of a long-range beam is detected (e.g., 100 m) to thereby obtain the distance between the object and the object recognition apparatus. After step S1418, the flowchart returns to step S1412.

By repeating steps S1412 to S1418, range information can be generated for all pixels having measurement values within the pixel region corresponding to the object.

Step S1419

The signal processing circuit 400 creates a frequency distribution for the distances of all pixels having measurement values within the pixel region corresponding to the object. The classes in the frequency distribution may be obtained by, for example, dividing a measured distance range linearly into 20 parts with respect to the logarithm of the distance. The signal processing circuit 400 identifies the mode in the created frequency distribution.

Step S1420

The signal processing circuit 400 calculates the mean of the distance values of pixels belonging to the modal class identified at step S1419, and determines the mean as the value representing the distance of the object.

1-3. Configuration of Object Recognition System

Reference is now made to an exemplary configuration of an object recognition system including the object recognition apparatus according to Embodiment 1.

Figure 21:
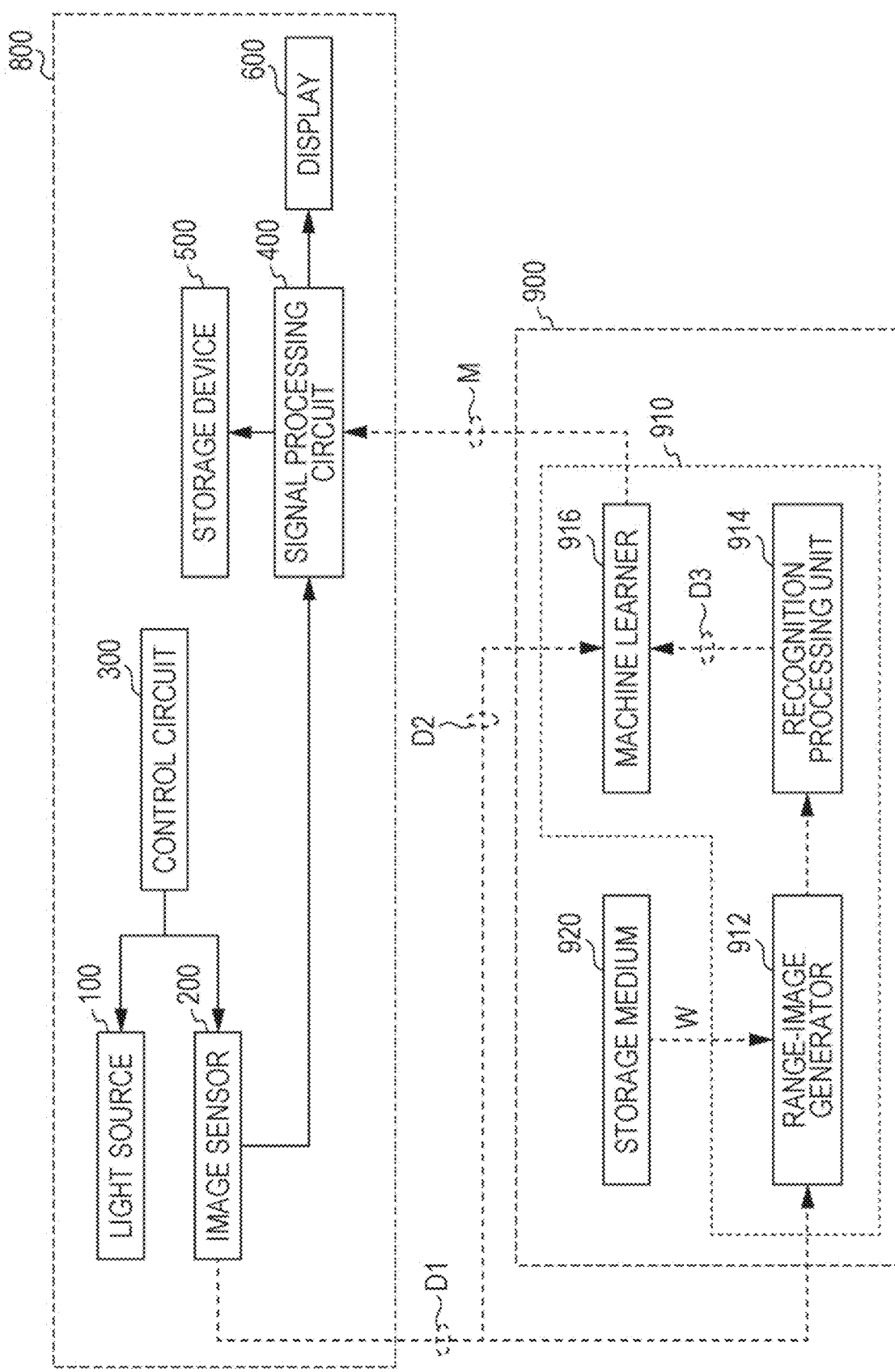
FIG. 21 illustrates an exemplary object recognition system.

FIG. 21 illustrates an exemplary configuration of an object recognition system. The object recognition system includes an object recognition apparatus 800, and a learning apparatus 900 that creates and trains an object recognition model through machine learning. The object recognition apparatus 800 has the configuration described above with reference to FIG. 3. The learning apparatus 900 includes a processor 910, and a storage medium 920. The processor 910 includes a range-image generator 912, a recognition processing unit 914, and a machine learner 916. The range-image generator 912, the recognition processing unit 914, and the machine learner 916 may be implemented by the processor 910 executing a computer program stored on the storage medium 920. The storage medium 920 stores weight information based on the spatial distribution of short-range beams emitted from the light source 100 and the spatial distribution of long-range beams emitted from the light source 100. The weight information is used to calculate or estimate the distance for each pixel from photodetection data output from the image sensor 200.

The learning apparatus 900 acquires, from the image sensor 200 of the object recognition apparatus 800, photodetection data representing the observed value of each pixel, and generates a range image based on the photodetection data and the weight information. The learning apparatus 900 analyzes the generated range image to recognize one or more objects present in a scene. Meanwhile, the learning apparatus 900 performs machine learning by using learning data and teacher data. The learning data is the photodetection data output from the image sensor 200. The teacher data is the recognition result of the object in the scene recognized based on the range image. The learning apparatus 900 is thus able to create an object recognition model from the photodetection data.

The image sensor 200 outputs, for each exposure period, photodetection data D1 representing the observed value of each pixel. The photodetection data D1 is used for the compressed sensing process described later.

The range-image generator 912 acquires the photodetection data D1 output from the image sensor 200, and weight information W stored on the storage medium 920. The range-image generator 912 generates and outputs a range image having distance values for individual pixels, by using the photodetection data D1 and the weight information W. A method for generating the range image will be described later in detail.

The recognition processing unit 914 acquires the range image output from the range-image generator 912, recognizes one or more objects in a scene represented by the range image, and outputs the recognition result. The recognition may be performed by using, for example, a known recognition algorithm. For example, from the range image, one or more regions each including a group of neighboring adjacent pixels are extracted, and an object can be identified based on the shape and distance distribution of each extracted region. If the image sensor 200 is capable of acquiring a color image, the accuracy of object recognition may be improved by also using acquired color information. The recognition result may be, for example, a label representing the object and data representing the coordinates or groups of coordinates of the object. Alternatively, the recognition processing unit 914 may recognize an object from the range image by using a learned model pre-trained by machine learning. In that case, the learned model is created separately, and pre-stored on the storage medium 920.

The machine learner 916 acquires learning data D2 and teacher data D3. The learned data D2 is the photodetection data output from the image sensor 200. The teacher data D3 is data representing the recognition result output from the recognition processing unit 914. The machine learner 916 uses the learning data D2 and the teacher data D3 to further train the object recognition model. A learned object recognition model M thus obtained is provided to the signal processing circuit 400, and used for the object recognition process described above.

As described above, the object recognition model used by the signal processing circuit 400 to recognize an object is pre-trained with plural training data sets. Each training data set includes learning photodetection data used for learning, and label data that identifies an object in a scene represented by the learning photodetection data. The learning photodetection data is identical to the photodetection data of each pixel sent from the image sensor 200 to the signal processing circuit 400. In other words, photodetection data previously output from the image sensor 200 is used as the learning photodetection data. This configuration makes it possible to continue learning while implementing and actually using both the object recognition apparatus 800 and the learning apparatus 900.

The learning photodetection data may be photodetection data obtained by another image sensor that is equivalent in performance to the image sensor 200. That is, the learning photodetection data according to Embodiment 1 is compressed sensing data, in other words, photodetection data with loss of information of some pixels.

In Embodiment 1, the respective spatial patterns of short-range and long-range beams emitted by the light source 100 are uniform irrespective of the exposure period. Alternatively, however, the respective spatial patterns of short-range and long-range beams may vary for the exposure period. In that case, a number of pieces of weight information corresponding to the number of patterns may be prepared, and an object recognition model may be learned for each piece of weight information. In that case, the recognition processing unit 410 of the signal processing circuit 400 may, when performing recognition, acquire projection pattern information from the control circuit 300 in addition to photodetection data, and use an object recognition model corresponding to the acquired projection pattern information. Label data may be generated based on projection pattern information and photodetection data. More specifically, label data may be generated by recognizing a range image that is generated based on the following pieces of information: weight information based on projection pattern information; and photodetection data.

A learned model that may be used by the recognition processing unit 914 of the learning apparatus 900 to detect an object within a range image is created by using a non-compressed range image acquired with a ToF camera, or by using a non-compressed range image that is reconstructed based on compressed sensing data and the weight information W. The weight information W used at this time corresponds to the projection pattern information used in acquiring compressed sensing data, and is acquired from the control circuit 300. The recognition processing unit 914 can, based on such a non-compressed range image, generate the teacher data D3 and learn an object recognition model.

Although the recognition processing unit 914 generates the teacher data D3 in the example depicted in FIG. 21, this is not intended to limit the present disclosure. Alternatively, for example, the teacher data D3 may be provided from an external source.

Figure 22:
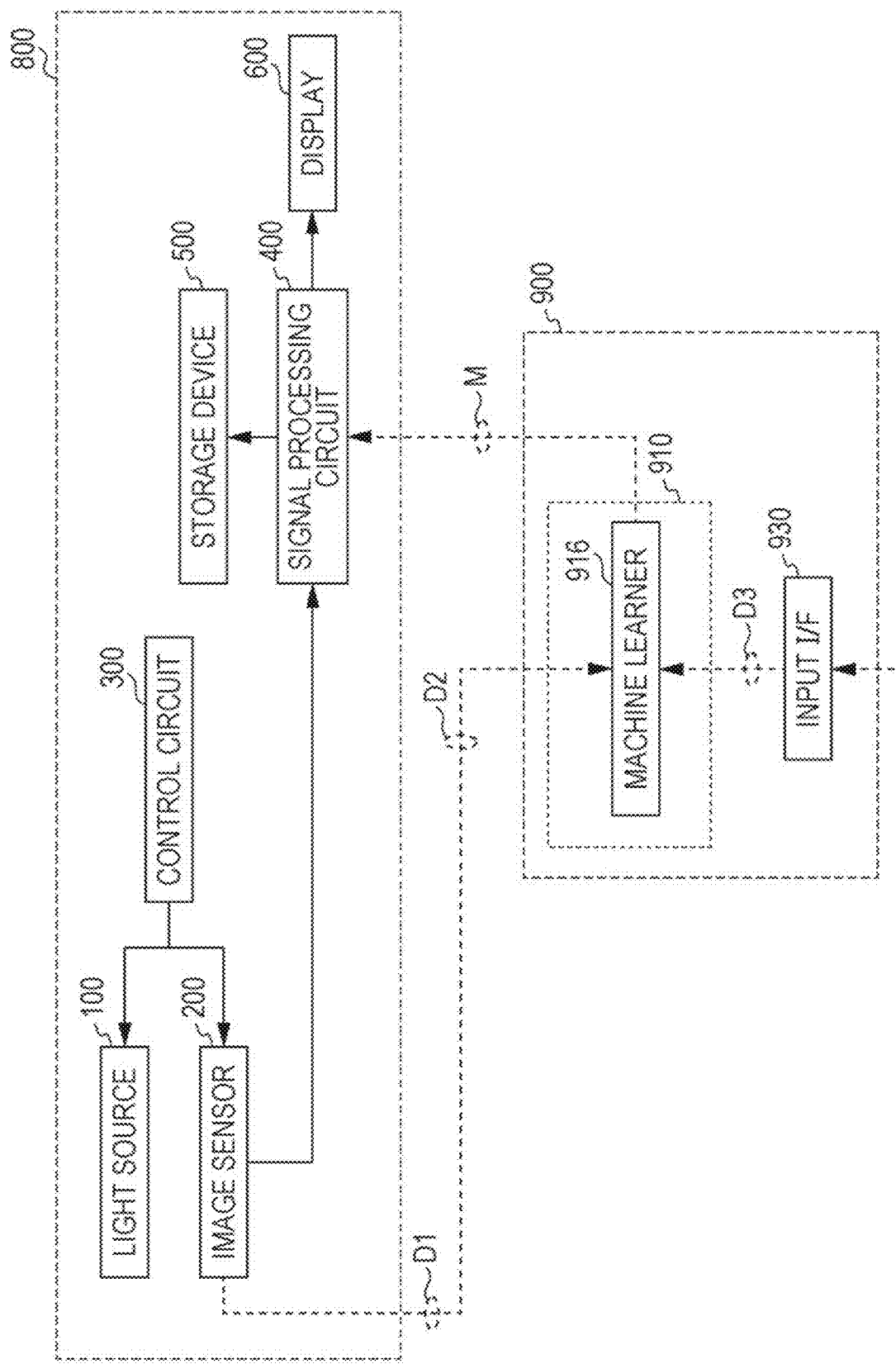
FIG. 22 illustrates another exemplary object recognition system.

FIG. 22 illustrates another exemplary configuration of the object recognition system. In this example, the learning apparatus 900 does not include the range-image generator 912 and the recognition processing unit 914 illustrated in FIG. 21. The learning apparatus 900 includes an input interface (IF) 930 electrically connected to an external apparatus. The machine learner 916 of the processor 910 acquires the teacher data D3 from the external apparatus via the input IF 930. In this case, information about an object in a scene represented by the teacher data D3 is generated in advance by using data of the observed value of each pixel reconstructed in advance through compressed sensing.

Teacher data may be created by the user. For example, teacher data may be generated by a human being checking a range image generated by the range-image generator 912 illustrated in FIG. 21, and then specifying a region corresponding to an object within the range image and labelling the region. In that case, the recognition processing unit 914 is not required.

The learning apparatus 900 of the object recognition system illustrated in each of FIGS. 21 and 22 performs learning by acquiring, online, the photodetection data output from the image sensor 200 of the object recognition apparatus 800. This, however, is not intended to be limiting. Alternatively, for example, the photodetection data output from the image sensor 200 may be pre-stored in a storage device, and an object recognition model may be learned offline by using the stored photodetection data.

1-4. Exemplary Range-Image Generation Process

Reference is now made to an exemplary range-image generation process performed by the range-image generator 912 of the learning apparatus 900 illustrated in FIG. 21. The range-image generator 912 generates a range image through compressed sensing, based on the observed value of each pixel and weight information.

The object recognition system according to Embodiment 1 performs ranging based on the indirect ToF method. The range-image generator 912 generates a range image used for creating the teacher data D3, by use of a method described below. The range image is generated by using the following pieces of information: the signal of each individual pixel output from the image sensor 200 for each exposure period; and weight information reflecting the distribution of short-range beams and the distribution of long-range beams.

The weight information according to Embodiment 1 represents a weight matrix based on the projection pattern of short-range beams and the projection pattern of long-range beams. The weight matrix has a number of rows equal to twice the pixel count L of the image sensor 200, and a number of columns equal to the pixel count L multiplied by the number of distance analyses N. The number of distance analyses N is the number of divisions of a distance measurement range, which represents the resolution of ranging.

Let $x_i$ be the distance vector of a pixel i (i=1, 2, ..., L) of the image sensor 200. The distance vector $x_i$ is a vector with a number of elements N, and represents the distance range of an object located at the pixel i. For example, $x_i=[1, 0, 0, 0, ..., 0]^T$ represents a distance range of less than 16.7 meters, $x_i=[0, 1, 0, 0, ..., 0]^T$ represents a distance range of greater than or equal to 16.7 meters and less than 33.3 meters, and $x_i=[0, 0, 0, 0, ..., 1]^T$ represents a distance range of greater than or equal to (N−1)×16.7 meters and less than N×16.7 meters. For simplicity, the following describes an exemplary case where N=12. It is assumed in this case that short-range beams are used to detect an object located in the range of 0 meters to 100 meters, and long-range beams are used to detect an object located in the range of 100 meters to 200 meters.

For the pixel i, let $y_{1i}$ be a voltage corresponding to the amount of charge accumulated in the first exposure period, and $y_{2i}$ be a voltage corresponding to the amount of charge accumulated in the second exposure period. It is to be noted that these voltages are normalized to satisfy Formula 4 below.

$$\sqrt{(y_{1i})^2+(y_{2i})^2}=1 \quad (4)$$

For a pixel irradiated with only a short-range beam, $y_{1i}$ and $y_{2i}$ are represented as, for example, Formula 5 below.

$$\begin{pmatrix} y_{1i} \\ y_{2i} \end{pmatrix} = \begin{pmatrix} a1 & a2 & a3 & a4 & a5 & a6 & 0 & 0 & 0 & 0 & 0 & 0 \\ b1 & b2 & b3 & b4 & b5 & b6 & 0 & 0 & 0 & 0 & 0 & 0 \end{pmatrix} x_i \quad (5)$$

In Formula 5, a1 to a6, and b1 to b6 are real numbers that are greater than or equal to 0 and less than or equal to 1, and satisfy Formula 4. In the present example, the reflected light of a short-range beam reflected from an object located at a distance of greater than 100 meters from the object recognition apparatus is not detected due to the attenuation of its intensity. Thus, the values in the seventh to twelfth columns of the matrix in Formula 5 are set to 0.

For a pixel irradiated with only a long-range beam, $y_{1i}$ and $y_{2i}$ are represented as, for example, Formula 6 below.

$$\begin{pmatrix} y_{1i} \\ y_{2i} \end{pmatrix} = \begin{pmatrix} 0 & 0 & 0 & 0 & 0 & 0 & a7 & a8 & a9 & a10 & a11 & a12 \\ 0 & 0 & 0 & 0 & 0 & 0 & b7 & b8 & b9 & b10 & b11 & b12 \end{pmatrix} x_i \quad (6)$$

In Formula 6, a7 to a12, and b7 to b12 are real numbers that are greater than or equal to 0 and less than or equal to 1, and satisfy Formula 4. In the present example, each exposure period is set such that the reflected light of a long-range beam reflected from an object located at a distance of less than 100 meters from the object recognition apparatus is not detected. Thus, the values in the first to sixth columns of the matrix in Formula 6 are set to 0.

For a pixel simultaneously irradiated with a short-range beam and a long-range beam, $y_{1i}$ and $y_{2i}$ are represented as, for example, Formula 7 below.

$$\begin{pmatrix} y_{1i} \\ y_{2i} \end{pmatrix} = \begin{pmatrix} a1 & a2 & a3 & a4 & a5 & a6 & a7 & a8 & a9 & a10 & a11 & a12 \\ b1 & b2 & b3 & b4 & b5 & b6 & b7 & b8 & b9 & b10 & b11 & b12 \end{pmatrix} x_i \quad (7)$$

For a pixel irradiated with neither of these beams, $y_{1i}$ and $y_{2i}$ are zero, and thus represented by Formula 8 below.

$$\begin{pmatrix} y_{1i} \\ y_{2i} \end{pmatrix} = \begin{pmatrix} 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \end{pmatrix} x_i \quad (8)$$

The numeral values of individual elements of the matrices in Formula 5 to Formula 8 are dependent on the forms of $x_i$, $y_{1i}$, and $y_{2i}$. The numeral values of individual elements of the above-mentioned matrices are illustrative only, and vary with the actual implementation.

A combination of Formula 5 to Formula 8 can be represented by Formula 9 as follows:

$$Y = WX \quad (9),$$

where, with the pixel count being L, Y is represented by Formula 10 below, and X is represented by Formula 11 below.

$$Y = [y_{11}, y_{21}, y_{12}, y_{22}, \ldots, y_{1L}, y_{2L}]^T \quad (10)$$

$$X = [x_1^T, x_2^T, \ldots, x_L^T]^T \quad (11)$$

Y is a vector in which normalized amounts of charge or normalized voltage values detected in each of the first exposure period and the second exposure period are arranged. X is a vector in which L above-mentioned vectors $x_i$ each having the number of elements N are arranged, and the vector X has a number of elements equal to L×N. The vector X represents the distance for each individual pixel. More specifically, the vector X indicates in what number distance range an object located at a position corresponding to each pixel is, among plural distance ranges obtained by dividing a distance measurement range by the number of analyses N. For each individual pixel, distance is expressed by a value of 0 or 1 given to the element representing each of the above-mentioned distance ranges. In the case of a pixel for which the corresponding object is located at a position less than 200 meters from the object recognition apparatus, $x_i$ is a vector for which only one of its N elements is 1 and the other elements are 0. In the case of a pixel for which no corresponding object is located at a position less than 200 meters from the object recognition apparatus, $x_i$ is a vector whose N elements are all 0.

W is a matrix with a number of rows 2L and a number of columns L×N. According to the definitions of $[y_{1i}, y_{2i}]$ and $x_i$ mentioned above, the matrix W is represented by Formula 12 below.

$$W = \begin{vmatrix} w & 0 & \cdots & 0 & 0 \\ 0 & w & \cdots & 0 & 0 \\ \vdots & \vdots & \ddots & \vdots & \vdots \\ 0 & 0 & \cdots & \ddots & 0 \\ 0 & 0 & \cdots & 0 & w \end{vmatrix} \quad (12)$$

Each element w of the matrix W in Formula 12 represents one of the matrices in Formulae 5 to 8. Which one of the matrices in Formulae 5 to 8 each element w corresponds to may be determined by, for example, performing calibration in advance. In Embodiment 1, the weight matrix W represented in Formula 12 is used as weight information.

By solving Formula 9 above with respect to the vector X under the condition that the vector Y and the matrix W are known, the value of distance for each pixel can be obtained. However, it is not possible to solve Formula 9 uniquely due to the greater number of elements of the vector Y than the number of elements of the vector X. Accordingly, a constraint is introduced to transform Formula 9 as below.

$$\min_{X}\left\{\frac{1}{2}\|WX - Y\|_2^2 + \alpha\|X\|_1 + \beta TV(MX)\right\} \quad (13)$$

The matrix M is an L×(L×N) matrix represented by Formula 14 below.

$$M = \begin{bmatrix} 1, 2, 3, 4, \ldots, N, 0, 0, \ldots, 0 \\ \ldots \\ 0, 0, \ldots, 0, 1, 2, 3, 4, \ldots, N \end{bmatrix} \quad (14)$$

That is, the vector MX is a vector with a number of elements L representing the distance for each pixel.

The first term of Formula 13 is obtained by relaxing Formula 9 to the squared error. The second term represents the L1 norm of the vector X, and is a constraint term because many elements of the vector X are 0. TV(MX) in the third term is a total variation representing the absolute sum of brightness variations among neighboring pixels in the vector MX representing a range image. α and β represent weighting factors. Details of total variation are disclosed in, for example, Rudin L. I., Osher S. J., and Fatemi E., "Nonlinear total variation based noise removal algorithms", Physica D, vol. 60, pp. 259-268, 1992. The entire disclosure of the document is incorporated herein by reference.

Formula 13 represents a computation for determining the vector X that minimizes the value in the curly brackets.

Formula 13 can be solved by, for example, using the alternating direction method of multipliers (ADMM). Details of ADMM are disclosed in, for example, D. Gabay and B. Mercier, "A dual algorithm for the solution of nonlinear variational problems via finite-element approximations", Computers & Mathematics with Applications, vol. 2, pp. 17-40, 1976. The entire disclosure of the document is incorporated herein by reference.

1-5. Advantages

As described above, the object recognition apparatus according to Embodiment 1 includes the light source 100, the image sensor 200, the control circuit 300, and the signal processing circuit 400. The light source 100 is capable of simultaneously emitting plural light beams in different directions. The image sensor 200 has plural photodetector elements, and outputs photodetection data responsive to the amount of light received by each photodetector element during a specified exposure period. The control circuit 300 causes the light source 100 to emit first light toward a scene, the first light including plural long-range beams and having a first spatial distribution. Then, the control circuit 300 causes the light source 100 to emit second light toward the scene, the second light including plural short-range beams and having a second spatial distribution.

The second spatial distribution differs from the first spatial distribution. Each short-range beam has an energy per unit area on an irradiated surface lower than the energy of each long-range beam per unit area on the irradiated surface, the irradiated surface being located at a predetermined distance from the light source. The control circuit 300 causes the photodetector elements of the image sensor 200 to detect first reflected light and second reflected light in the same exposure period, the first reflected light being caused by reflection of the first light from the scene, the second reflected light being caused by reflection of the second light from the scene. The signal processing circuit 400 applies an object recognition model pre-trained through machine learning to the photodetection data output from the image sensor 200 to thereby recognize an object present in the scene. The signal processing circuit 400 is also capable of, based on the photodetection data, estimating the distance to the recognized object.

The above-mentioned configuration makes it possible to, even with use of sparse light beams, recognize an object in a scene, and estimate the distance to the object. The light beams do not need to cover the entire scene. This makes it possible to reduce the energy of emitted light.

By appropriately adjusting the timing of projection of long-range light beams and the timing of projection of short-range light beams so that their reflections are received in the same exposure period, ranging at long distance range and ranging at short distance range can be performed simultaneously. This makes it possible to reduce the time required for ranging in comparison to performing ranging at long range and ranging at short range individually. As a result, the time required for ranging can be reduced even for ranging performed over greater distance ranges. If a range image is to be generated as a moving image, a label for recognizing an object and information about distance can be generated at an increased frame rate.

Modification of Embodiment 1

Embodiment 1 uses two kinds of light beams with different maximum ranges. This configuration, however, is not limiting. Alternatively, for example, two sets of light beams may be used that have an equal maximum range and differ in their distribution on a plane parallel to the photodetection surface of the image sensor 200. Each set of light beams may include plural light beams.

Figure 30:
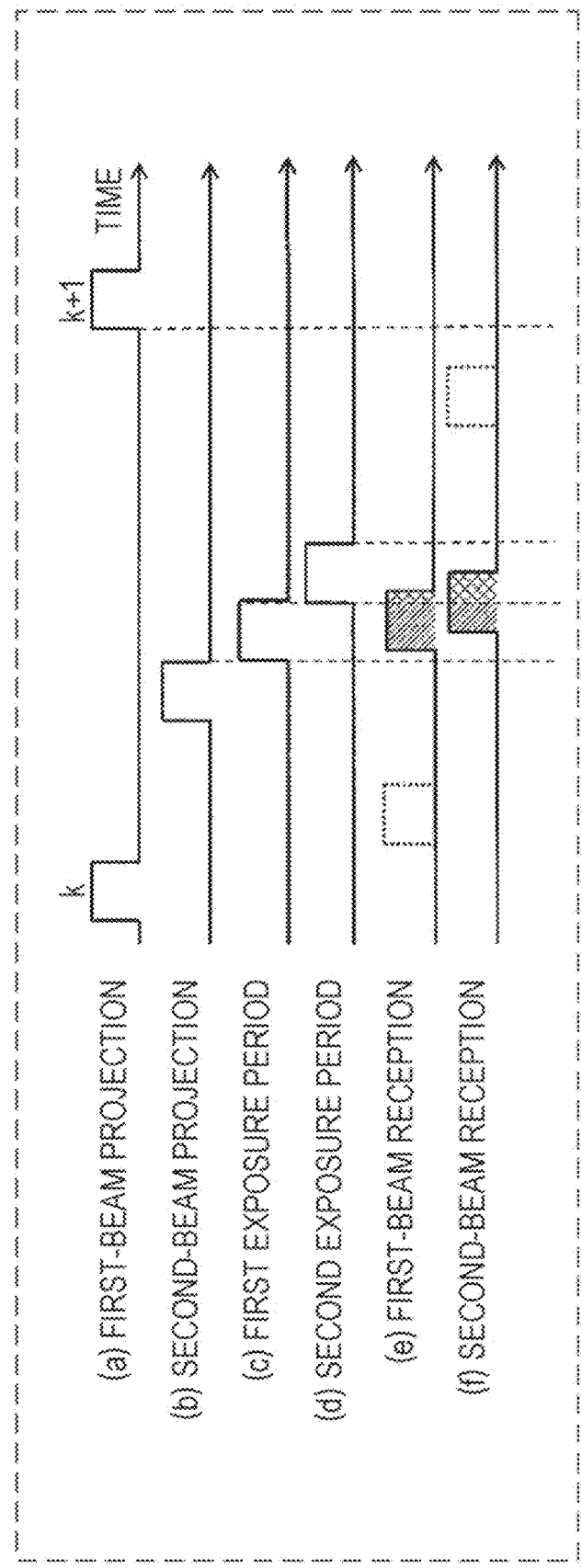
FIG. 30 illustrates operation according to a modification of Embodiment 1.

FIG. 30 schematically illustrates an example of the timing of projection of each light beam and the timing of exposure in accordance with Embodiment 1. FIG. 30(*a*) illustrates the timing of projection of each first light beam. The pulse at the left-hand side represents the k-th projection, and the pulse at the right-hand side represents the (k+1)-th projection. FIG. 30(*b*) illustrates the timing of projection of each second light beam. FIG. 30(*c*) illustrates a first exposure period. FIG. 30(*d*) illustrates a second exposure period.

The first exposure period starts simultaneously with the end of projection of the second light beam, and ends with the elapse of time equal to the pulse width of each beam. The second exposure period starts with the end of the first exposure period, and ends with the elapse of time equal to the first exposure period.

The solid pulse in FIG. 30(*e*) represents the timing when the reflected light of the first light beam reflected by a distant object (e.g., located in the range of 100 m to 200 m from the object recognition apparatus) returns to the object recognition apparatus. The dashed pulse in FIG. 30(*e*) represents the timing when the reflected light of the first light beam reflected by a near object (e.g., located in the range of less than 100 m from the object recognition apparatus) returns to the object recognition apparatus. The solid pulse in FIG. 30(*f*) represents the timing when the reflected light of the second light beam reflected by a near object (e.g., located in the range of less than 100 m from the object recognition apparatus) returns to the object recognition apparatus. The dashed pulse in FIG. 30(*f*) represents the timing when the reflected light of the second light beam reflected by a distant object returns to the object recognition apparatus.

The projection of the first light beam precedes the projection of the second light beam. Each exposure period is set such that both the first light beam reflected at a long distance and the second light beam reflected at a short distance are received in at least one of the two exposure periods.

Th reflected light of the first light beam reflected at a short distance, which is represented by the dashed line in FIG. 30(*e*), returns to the object recognition apparatus at a time that falls outside all exposure periods. Accordingly, the image sensor 200 does not detect such light. The image sensor 200 does not detect the first light beam reflected by an object located at a distance of, for example, less than 100 m. That is, exposure of the image sensor 200 is not performed during an interval of time in which the first light beam reflected by an object located at a distance of, for example, less than 100 m arrives at the object recognition apparatus. Likewise, the reflected light of the second light beam reflected at a long distance, which is represented by the dashed line in FIG. 30(*f*), returns to the object recognition apparatus at a time that falls outside all exposure periods. Accordingly, the image sensor 200 does not detect such light. The image sensor 200 does not detect the second light beam reflected by an object located at a distance of, for example, greater than or equal to 100 m from the object recognition apparatus.

Further, the timing of the (k+1)-th pulse depicted at the right-hand side of FIG. 30(*a*) is set at a sufficient interval of time from the k-th pulse depicted at the left-hand side. This interval of time may be set to be longer than the time it takes from the k-th projection of the second light beam to the return of the second light beam after being reflected by a distant object. This helps to ensure that the second light beam reflected by a distant object is not detected in the next and subsequent exposure periods. More specifically, the time until the next projection of light may be set such that the exposure period that occurs first with respect to the next projection starts after the elapse of the longest time it takes from the projection of the second light beam to the arrival of the reflection of the second light beam at the object recognition apparatus.

This modification uses two kinds of light beams with the same maximum range to achieve ranging at plural distance ranges through the control of projection and exposure timings. This makes it possible to attain the same effect as the use of two kinds of light beams with different maximum ranges.

In each of the examples mentioned above, the two kinds of light beams may be exactly identical in two-dimensional spatial distribution, or exactly identical in three-dimensional spatial distribution. If the two kinds of light beams are identical in spatial distribution, weight information includes only the following two kinds of information representing the state of each pixel; information representing a pixel to be irradiated with both the first light beam and the second light beam; and information representing a pixel to be irradiated with neither the first light beam nor the second light beam. The range-image generator 912 is able to calculate the distance of every pixel based on the weight information that specifies, for each pixel, in which one of the two kinds of states the pixel is. Depending on the condition of a scene or the position of a pixel, there may not be sufficient information for determining which one of two distance ranges, that is, the long and short distance ranges, is to be selected. Accordingly, for example, a constraint such as "give priority to a candidate located at a shorter distance" may be added in estimating distance.

Although two distance ranges are assigned to two kinds of light beams in the foregoing description of Embodiment 1, the technique according to the present disclosure is not limited to such a particular arrangement. Three or more distance ranges may be assigned to three or more kinds of light beams.

Figure 23:
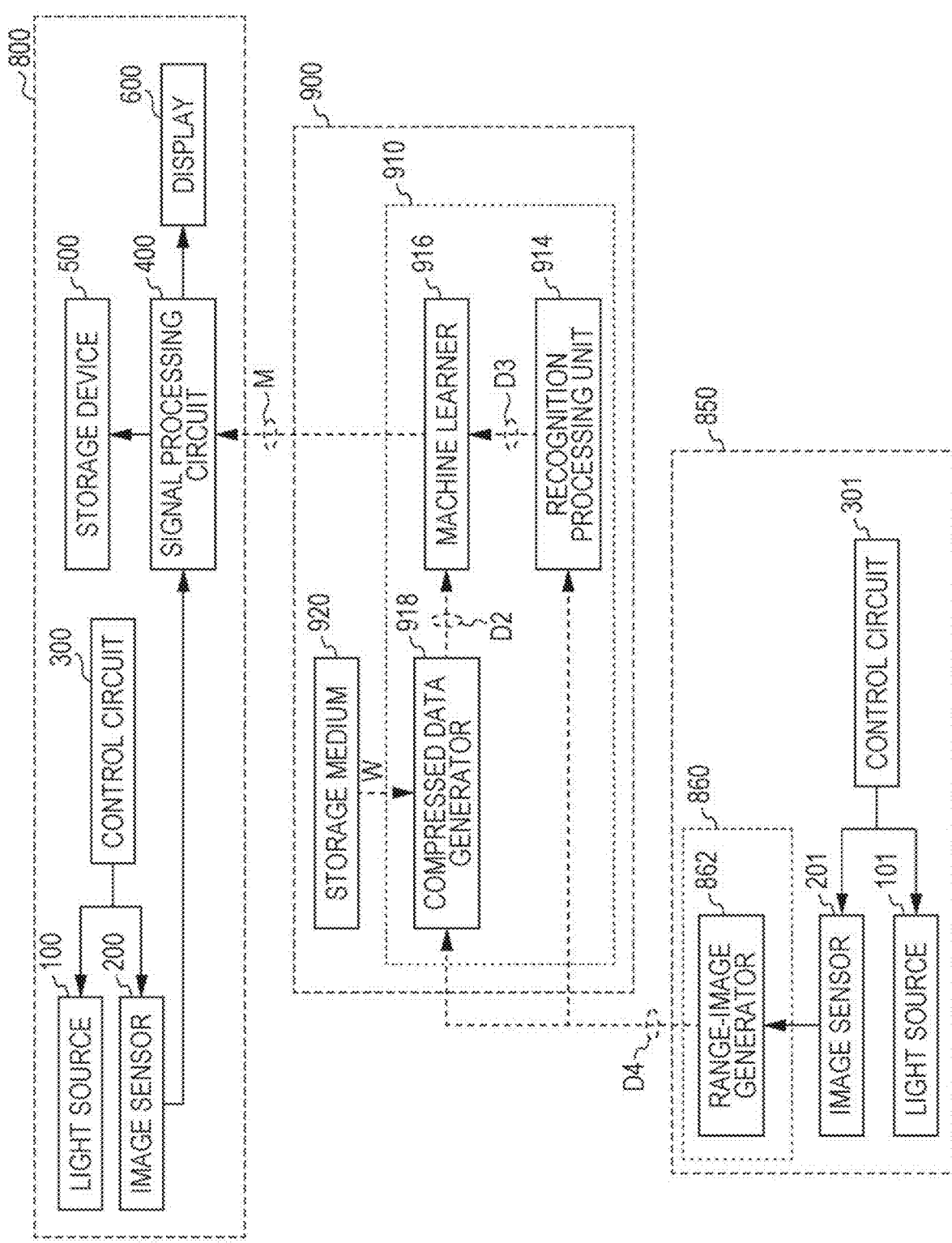
FIG. 23 illustrates still another exemplary object recognition system.

FIG. 23 illustrates another exemplary object recognition system. In the example in FIG. 23, a ToF camera 850 that acquires range information for each pixel is used to acquire a range image D4, and the range image D4 is used as input data for the learning apparatus 900. The learning apparatus 900 performs learning based on the range image D4.

The ToF camera 850 includes a light source 101, an image sensor 201, a control circuit 301, and a processor 860. The processor 860 include a range-image generator 862. The range-image generator 862 generates and outputs a range image based on a signal output from the image sensor 201. The ToF camera 850 generates a range image by using either the direct ToF method or the indirect ToF method.

The processor 910 of the learning apparatus 900 includes the recognition processing unit 914, the machine learner 916, and a compressed data generator 918. The storage medium 920 stores weight information Was in the example illustrated in FIG. 21. The recognition processing unit 914 recognizes an object in a scene from the range image D4 in accordance with a previously learned recognition model. The compressed data generator 918 transforms the range image D4 output from the ToF camera 850 to the form of the vector X in Formula 9, and generates compressed data Y by using a matrix represented by the weight information W. The machine learner 916 performs learning by using learning data D2 and teacher data D3, the learning data D2 being the compressed data Y generated by the compressed data generator 918, the teacher data D3 being the recognition result output by the recognition processing unit 914. An object recognition model M is thus generated. The object recognition model M generated by the machine learner 916 is set for the signal processing circuit 400 of the object recognition apparatus 800. This allows the object recognition apparatus 800 to recognize an object with high accuracy from the compressed data.

As described above, according to this modification, the learning photodetection data D2 is generated based on the following pieces of information: the weight information W based on projection pattern information; and the range image data D4 prepared in advance.

In the present example, the recognition processing unit 914 recognizes an object from a range image to thereby generate teacher data. This, however, is not intended to be limiting. Alternatively, as illustrated in FIG. 22, for example, information about an object corresponding to a range image may be acquired from an external source to thereby obtain teacher data.

At step S1500 in FIG. 15, the recognition result may be displayed on, for example, a display device such as the display 600. The display 600 may acquire the following pieces of information: information representing the object recognized at step S1300; positional information representing the position of the object on the two-dimensional coordinates of the image sensor 200; the range information of the object generated at step S1400; and a brightness image or range image of the scene, and may display an image related to each of these pieces of information.

Figure 24:
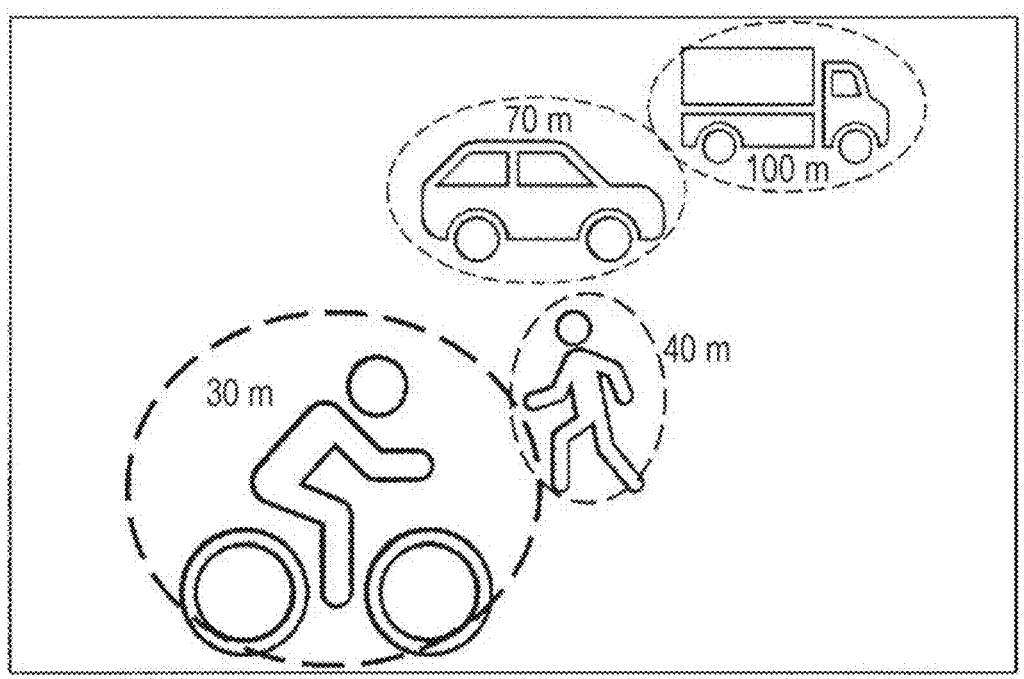
FIG. 24 illustrates an exemplary screen that can be displayed on a display device.

FIG. 24 illustrates an exemplary screen that can be displayed on the display 600. As illustrated in FIG. 24, on the display 600, the acquired brightness image or range image, and the position of one or more recognized objects on the image may be each displayed as a frame or point. The distance to each object may be displayed inside or in the vicinity of a displayed indication indicating where the object is located on the image. In this way, the display 600 may display a composite image that combines an image highlighting the recognized object with an image representing range information.

Figure 25:
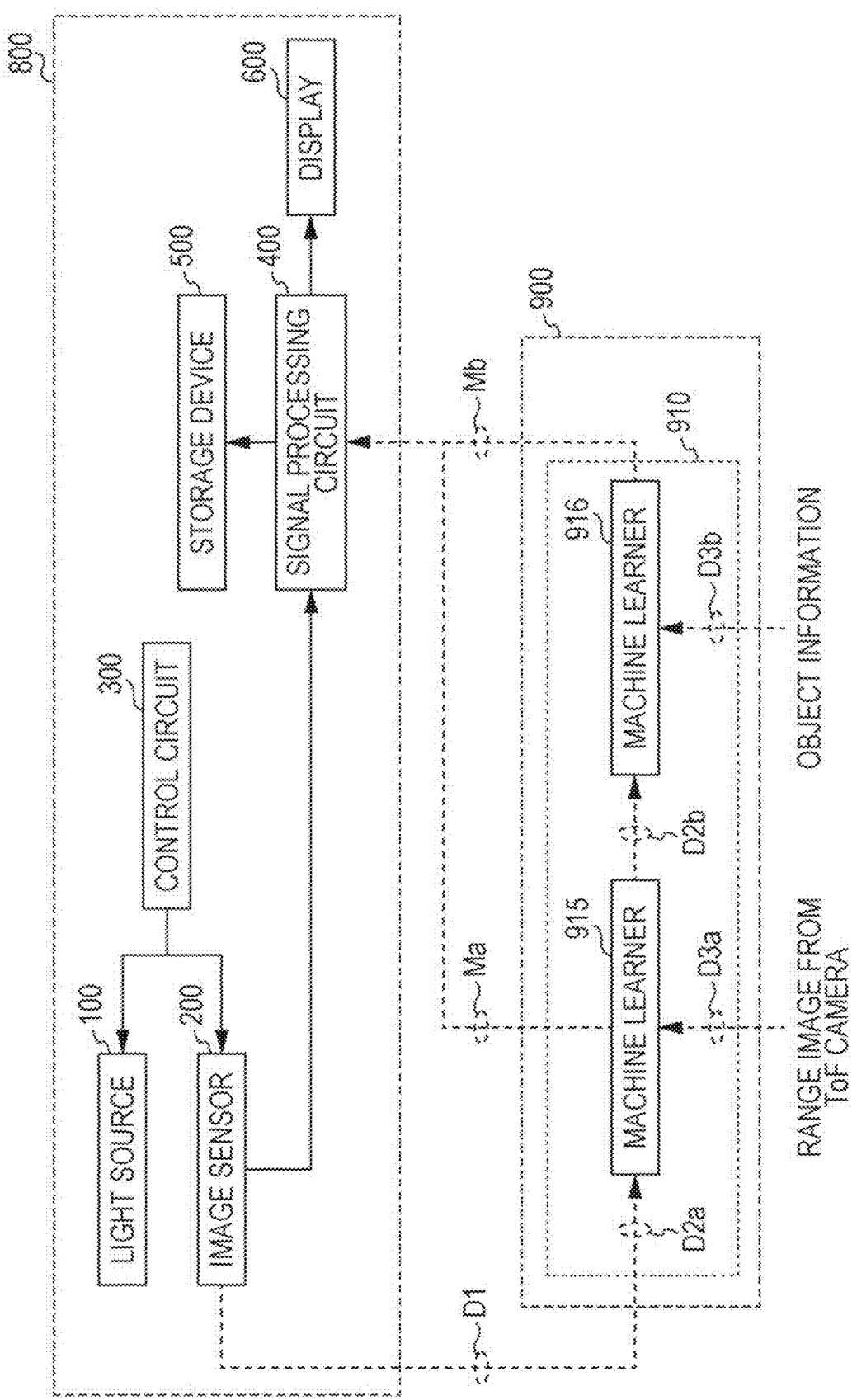
FIG. 25 illustrates another modification of Embodiment 1.

FIG. 25 illustrates another modification of Embodiment 1. According to this modification, learning is performed in two steps. The first step involves learning a range-image generation model, which is used to generate a range image with an input of photodetection data output from the image sensor 200 and obtained through compressed sensing. The second step involves learning an object recognition model, which is used to recognize an object with an input of a range image reconstructed from photodetection data obtained through compressed sensing.

In the example illustrated in FIG. 25, the processor 910 of the learning apparatus 900 includes two machine learners 915 and 916. The machine learner 915 acquires photodetection data D1 from the image sensor 200 of the object recognition apparatus 800. The machine learner 915 also acquires range image data generated by ranging, by use of a ToF camera, a scene identical to the scene imaged by the image sensor 200. The machine learner 915 learns a range-image generation model used to reconstruct a range image from photodetection data, by using the photodetection data D1 as learning data D2a and by using the range image data as teacher data D3a.

Unlike in the example illustrated in FIG. 21, a range image is not reconstructed through calculation by using Formula 13. Rather, a range image is reconstructed from photodetection data output from the image sensor 200, in accordance with a learned model trained by a machine learning algorithm. The generated range image is input from the machine learner 915 to the other machine learner 916. The machine learner 916 acquires, from an external apparatus, information about an object included in the scene imaged by the image sensor 200. The machine learner 916 learns an object recognition model by using learning data D2b and teacher data D3b, the learning data D2b being the range image generated by the machine learner 915, the teacher data D3b being the acquired information about the object.

The recognition processing unit of the signal processing circuit 400 of the object recognition apparatus 800 acquires a range-image generation model Ma learned by the machine learner 915, and an object recognition model Mb learned by the machine learner 916. The signal processing circuit 400 uses these two learned models to perform serial processing. That is, the signal processing circuit 400 first applies the range-image generation model Ma to photodetection data output from the image sensor 200 to thereby generate a range image containing range information of every pixel. Subsequently, the signal processing circuit 400 applies the object recognition model Mb to the generated range image to thereby recognize an object. As a result, the signal processing circuit 400 is able to recognize the object from the photodetection data output from the image sensor 200, and generate range information representing the distance to the object. According to this modification, the signal processing circuit 400 thus generates range information without performing ToF-based distance measurement.

In this way, according to this modification, the signal processing circuit 400 derives the distance to an object based on a range-information generation model pre-trained by a machine learning algorithm.

The learning apparatus 900 of the object recognition system illustrated in FIG. 25 performs learning by acquiring, online, photodetection data output from the image sensor 200 of the object recognition apparatus 800. This, however, is not intended to be limiting. Alternatively, for example, photodetection data output from the image sensor 200 may be stored in a storage device in advance in association with a range image obtained by the corresponding ToF camera and with object information representing information about an object. A range-image generation model and an object recognition model can be learned offline by using the stored photodetection data, and the range image and the object information.

In the example illustrated in FIG. 25, object information serving as teacher data for use by the machine learner 916 is acquired from an external source. This, however, is not intended to be limiting. Alternatively, for example, as in the example in FIG. 21, the processor 910 may generate teacher data by performing recognition processing by itself.

The object recognition system illustrated in FIG. 25 may include, in addition to the object recognition apparatus 800 and the learning apparatus 900, a ToF camera as with the example illustrated in FIG. 23. Alternatively, a learning system including a ToF camera and a learning apparatus may be constructed. The learning apparatus of such a learning system may, as illustrated in FIG. 23, acquire a range image generated by the ToF camera, and weight information, and use the acquired range image and the acquired weight information to thereby generate a sparse range image used for compressed sensing. The learning apparatus can learn a range-image generation model by using learning data and teacher data, the learning data being the sparse range image used for compressed sensing, the teacher data being the range image acquired from the ToF camera.

Embodiment 2

Reference is now made to a learning system according to Embodiment 2 as an exemplary embodiment of the present disclosure.

A learning system according to Embodiment 2 not only learns a model used to recognize an object by use of photodetection data output from an image sensor, but also determines, through learning, a projection pattern that allows for more accurate object recognition. The control circuit 300 of an object recognition apparatus determines the direction of emission of first light, and the direction of emission of second light, based on projection pattern information stored on the storage medium 310 and representing the spatial distribution of the first light and the spatial distribution of the second light. The projection pattern information is learned in advance by a machine learning algorithm using plural training data sets.

The object recognition apparatus according to Embodiment 2 is configured in the same manner as the object recognition apparatus according to Embodiment 1 (see FIG. 3). Thus, detailed reference will not be made to the object recognition apparatus according to Embodiment 2.

2-1. Configuration of Learning System

Figure 26:
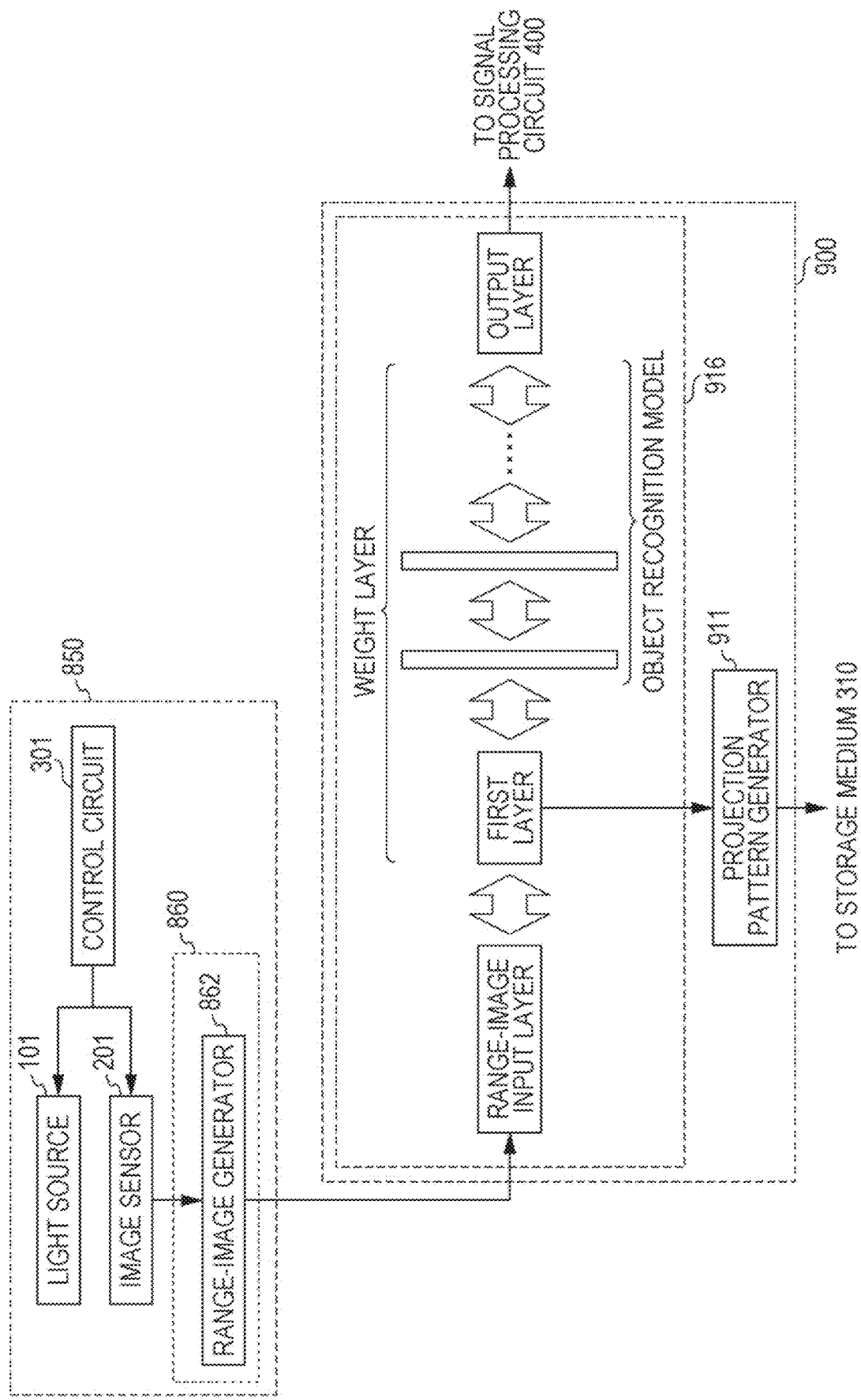
FIG. 26 is a block diagram illustrating an exemplary configuration of a learning system according to Embodiment 2.

Reference is now made to the configuration of the learning system according to Embodiment 2. FIG. 26 is a block diagram illustrating an exemplary functional configuration of the learning system according to Embodiment 2. The learning system according to Embodiment 2 includes the ToF camera 850, and the learning apparatus 900. The learning apparatus 900 includes the machine learner 916, and a projection pattern generator 911. Each of the machine learner 916 and the projection pattern generator 911 may be implemented by a processor that executes a program stored on a storage medium. The ToF camera 850 includes the light source 101, the image sensor 201, the control circuit 301, and the processor 860. The processor 860 includes the range-image generator 862. The machine learner 916 include a range-image input layer, a weight layer including plural layers, and an output layer.

The light source 101 projects one or more light beams. The reflected light of each light beam covers all the pixels of the image sensor 201.

The image sensor 201 receives light projected from the light source 101 and reflected by a target object. The image sensor 201 measures, by use of the direct ToF method or indirect ToF method, the time taken from the projection of light by the light source 101 to the reception of light by the image sensor 201. The distance from the ToF camera 850 to the target object is thus measured.

The control circuit 301 controls the maximum range, shape, direction, and projection timing of each light beam emitted from the light source 101. The control circuit 301 also controls the timing of exposure of the image sensor 201.

The range-image generator 862 of the processor 860 generates a range image by converting information representing the distance at each pixel measured by the image sensor 201 into one or plural kinds of (e.g., RGB) brightness information.

The machine learner 916 performs learning in accordance with, for example, an algorithm that performs machine learning through a network of plural layers, such as a deep neural network (DNN). Of these layers, the beginning layer is an input layer, which acquires a range image as learning data. Of the next set of layers, the first layer corresponds to weight information for compressed sensing. That is, the first layer corresponds to "W" in Formula 9 mentioned above.

The first layer generates compressed data corresponding to photodetection data used for compressed sensing output from the image sensor 200 illustrated in FIG. 3, and outputs the compressed data to the next layer. In addition, the first layer learns weight information W used in generating compressed data. The weight information W from the first layer is output to the projection pattern generator 911. The projection pattern generator 911 generates projection pattern information based on the weight information W from the first layer optimized through learning, the projection pattern information representing the projection pattern of light beams used for compressed sensing projected by the light source 100 illustrated in FIG. 3. The projection pattern information is retained by the storage medium 310 within the control circuit 300 of the object recognition apparatus, and used to control the projection of light by the light source 100. That is, the first layer learns the pattern of projection by the light source 100.

The set of layers from the layer following the first layer to the output layer corresponds to an object recognition model. The object recognition model is retained by the signal processing circuit 400 of the object recognition apparatus, and used for recognition processing. Teacher data used in learning the object recognition model may be input from an external source as in, for example, the case illustrated in FIG. 22 or FIG. 25. Alternatively, as in the case illustrated in FIG. 21 or FIG. 23, the learning apparatus 900 may generate the teacher data through recognition processing.

Reference is now made to a specific example of learning and projection-pattern generation at the first layer.

The possibility that the reflection of a light beam projected from the light source 100 is received at a pixel i, which is the i-th pixel of plural pixels on the image sensor 200 illustrated in FIG. 3, is referred to as "projection pattern" for convenience. That is, a projection pattern represents whether the light source 100 is projecting light in the direction of an object located at a position that allows the pixel i to receive the reflection of the light from the object. Now, a two-element projection vector $L_i$ representing the projection pattern for the pixel i is defined. If $L_i^T=[1, 0]$, this indicates that the pixel i receives only the reflected light of a short-range beam. If $L_i^T=[0, 1]$, this indicates that the pixel i receives only the reflected light of a long-range beam. If $L_i^T=[1, 1]$, this indicates that the pixel i simultaneously receives the reflected light of a short-range beam and the reflected light of a long-range beam. If $L_i^T=[0, 0]$, this indicates that the pixel i receives neither the reflected light of a short-range beam nor the reflected light of a long-range beam.

As described above with reference to the operation of the range-image generator 912 illustrated in FIG. 21, let $x_i$ be the distance vector of the pixel i, $y_{1i}$ be a voltage corresponding to the amount of charge accumulated in the pixel i in the first exposure period, and $y_{2i}$ be a voltage corresponding to the amount of charge accumulated in the pixel i in the second exposure period. Further, $y_{1i}$ and $y_{2i}$ are normalized as in Formula 4.

The following formulae hold for the projection vector $L_i$:

$$y_{1i} = L_i^T \begin{pmatrix} a1 & a2 & a3 & a4 & a5 & a6 & 0 & 0 & 0 & 0 & 0 & 0 \\ 0 & 0 & 0 & 0 & 0 & 0 & a7 & a8 & a9 & a10 & a11 & a12 \end{pmatrix} x_i$$

$$= L_i^T z_{1i},$$

$$y_{2i} = L_i^T \begin{pmatrix} b1 & b2 & b3 & b4 & b5 & b6 & 0 & 0 & 0 & 0 & 0 & 0 \\ 0 & 0 & 0 & 0 & 0 & 0 & b7 & b8 & b9 & b10 & b11 & b12 \end{pmatrix} x_i$$

$$= L_i^T z_{2i},$$

where $z_{1i}$ and $z_{2i}$ are represented by formulae below.

$$z_{1i} = \begin{pmatrix} a1 & a2 & a3 & a4 & a5 & a6 & 0 & 0 & 0 & 0 & 0 & 0 \\ 0 & 0 & 0 & 0 & 0 & 0 & a7 & a8 & a9 & a10 & a11 & a12 \end{pmatrix} x_i,$$

$$z_{2i} = \begin{pmatrix} b1 & b2 & b3 & b4 & b5 & b6 & 0 & 0 & 0 & 0 & 0 & 0 \\ 0 & 0 & 0 & 0 & 0 & 0 & b7 & b8 & b9 & b10 & b11 & b12 \end{pmatrix} x_i,$$

In the matrices above, a1 to a12, and b1 to b12 are real numbers that are greater than or equal to 0 and less than or equal to 1, and satisfy Formula 4. These numerical values are set to appropriate values according to the actual implementation.

A weight layer corresponding to the projection vector L is introduced for the first layer (i.e., the layer following the input layer) of an identification network used for identification, and L is learned simultaneously with the identification network to thereby enable selection of an optimal projection pattern.

In actual learning, a numerical value other than those mentioned above may be selected for L. Accordingly, after learning, the matrix L may be modified as follows, and with L fixed, the identification network may be learned again.

With $L_i = [L_{1i}, L_{2i}]$,

If $|L_{1i}| < Th_1$ and $|L_{2i}| < Th_1$ then $L_i^T = [0, 0]$ else if $\dfrac{L_{2i}^2}{\sqrt{L_{1i}^2 + L_{2i}^2}} < Th$ then $L_i^T = [1, 0]$ else if $\dfrac{L_{1i}^2}{\sqrt{L_{1i}^2 + L_{2i}^2}} < Th$ then $L_i^T = [0, 1]$ else then $L_i^T = [1, 1]$.

For learning at the layer corresponding to L, an $L_1$ constraint for L and its weighting factor $\lambda_L$ may be introduced in such a way as to make the coefficients sparse, that is, to maximize the number of pixels i for which $L_i=[0, 0]$ to thereby adjust the number of projected beams. That is, if a loss function for identification is f(w, L), the function below may be used as a new loss function.

$$f(w,L)+\lambda_L \|L\|_1$$

For the loss function above, if it is desired to reduce the number of light beams, $\lambda_L$ is increased, and if it is desired to increase the number of light beams, $\lambda_L$ is decreased.

2-2. Advantages

With the learning system according to Embodiment 2, an object recognition model retained by the signal processing circuit 400 of the object recognition apparatus, and projection pattern information stored on the storage medium 310 are generated through machine learning. This enables compressed sensing by use of the best suited projection pattern for object recognition. This allows for more accurate object recognition with sparser data acquisition, that is, with fewer light beams.

Embodiment 3

In the embodiments above, there is a single kind of projection pattern for each of the short-range and long-range beams emitted from the light source 100, and W in Formula 9 above is a single matrix. The signal processing circuit 400 retains an object recognition model for such a single projection pattern, and recognizes an object in accordance with the model. By contrast, in Embodiment 3, an object recognition apparatus retains information representing plural projection patterns. The storage medium 310 stores plural kinds of projection pattern information. Each kind of projection pattern information represents the spatial distribution of first light and the spatial distribution of second light.

The control circuit 300 determines the direction of emission of the first light and the direction of emission of the second light, based on one of the plural kinds of projection pattern information stored on the storage medium 310. That is, the control circuit 300 selects a projection pattern, and controls the light source 100 and the image sensor 200 in accordance with the selected projection pattern. The control circuit 300 outputs information representing the selected projection pattern to the signal processing circuit 400. An object recognition model according to Embodiment 3 includes plural models corresponding one-to-one to the plural kinds of projection pattern information. The signal processing circuit 400 recognizes, in accordance with an object recognition model corresponding to the selected projection pattern, one or more objects from photodetection data output from the image sensor 200.

3-1. Configuration of Object Recognition Apparatus

Figure 27:
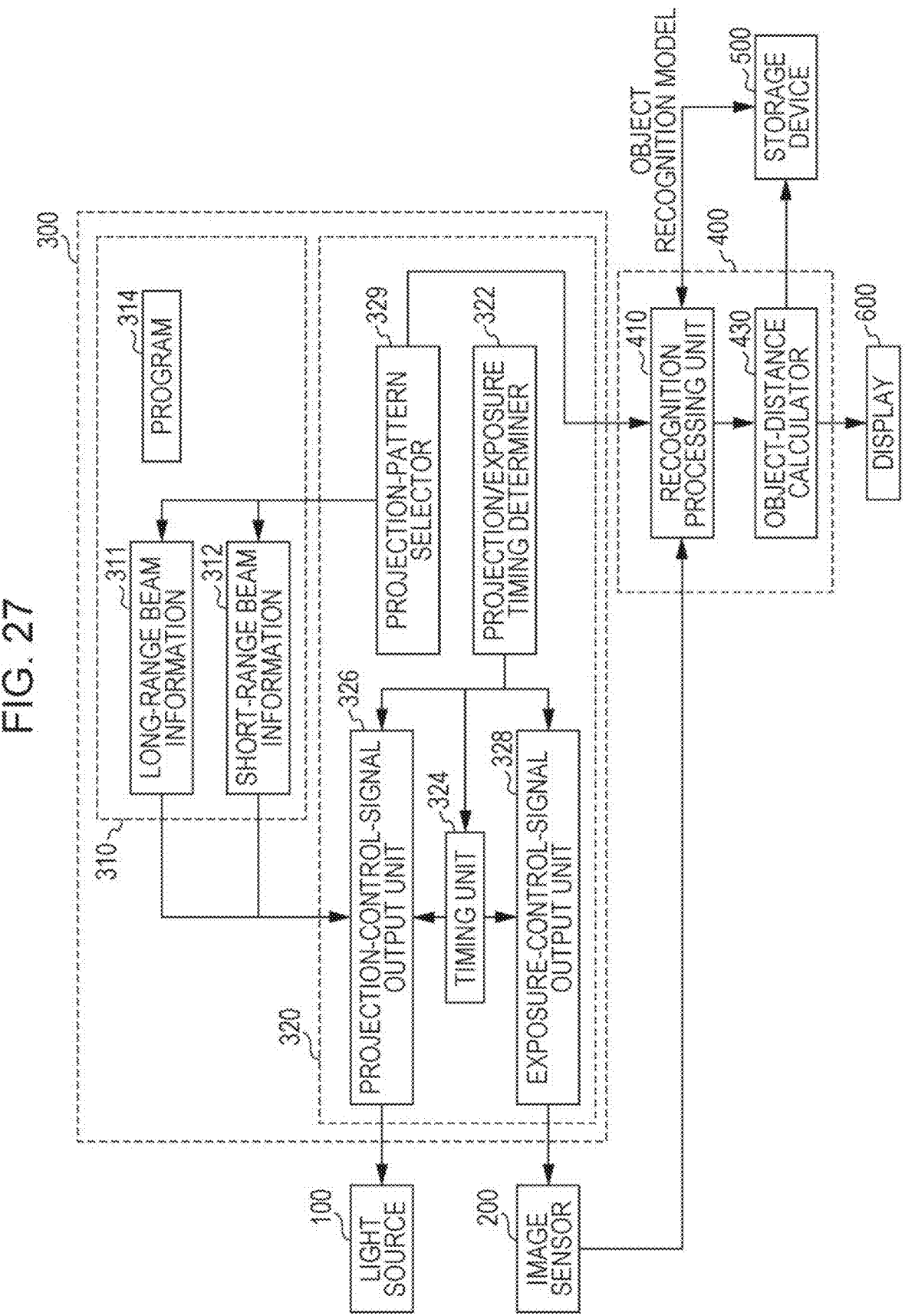
FIG. 27 is a block diagram illustrating an exemplary configuration of an object recognition apparatus according to Embodiment 3.

FIG. 27 is a block diagram illustrating an exemplary configuration of an object recognition apparatus according to Embodiment 3. The configuration in FIG. 27 differs from the configuration in FIG. 3 in that the processor 320 further includes a projection-pattern selector 329, and the recognition processing unit 410 acquires an object recognition model from the storage device 500. The following description will mainly focus on differences from the configuration illustrated in FIG. 3, and features overlapping those of the configuration in FIG. 3 will not be described in further detail.

The control circuit 300 according to Embodiment 3 determines the timing of light beam projection by the light source 100, and the timing of exposure of the image sensor 200. In accordance with the determined timings, the control circuit 300 outputs an exposure control signal and a projection control signal. The control circuit 300 selects one of plural projection patterns, and outputs a projection control signal in accordance with the selected projection pattern. Such a projection control signal is generated for each projection pattern in accordance with the long-range beam information 311 and the short-range beam information 312 that are determined in advance.

The storage device 500 stores an object recognition model learned in advance for each individual projection pattern. Each such object recognition model is learned in advance through machine learning.

The recognition processing unit 410 of the signal processing circuit 400 selects, based on a signal representing the amount of charge for each pixel output by the image sensor 200 for each exposure period, an object recognition model corresponding to a projection pattern output from the projection-pattern selector 329 of the control circuit 300. The recognition processing unit 410 recognizes an object in a scene in accordance with the selected object recognition model.

The object-distance calculator 430 of the signal processing circuit 400 extracts, from the photodetection data output by the image sensor 200 for each exposure period, data representing each pixel corresponding to the region of a recognized target object, and calculates distance based on the data.

The projection-pattern selector 329 of the control circuit 300 selects one of plural predetermined projection patterns. The projection pattern selected at this time determines the direction of projection of each of plural short-range beams and plural long-range beams.

In Embodiment 3, as with Embodiment 1, ranging is performed based on the ToF method by using the technique of compressed sensing. The ranging method used is similar to that in Embodiment 1.

Figure 28A:
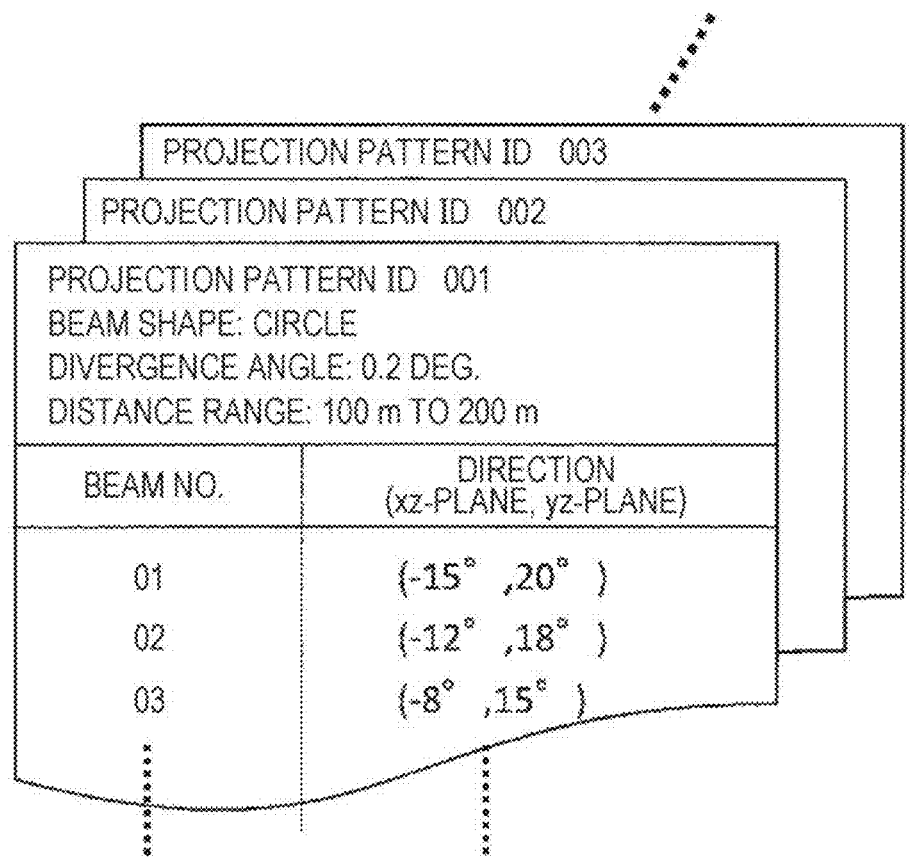
FIG. 28A illustrates exemplary long-range beam information according to Embodiment 3.
Figure 28B:
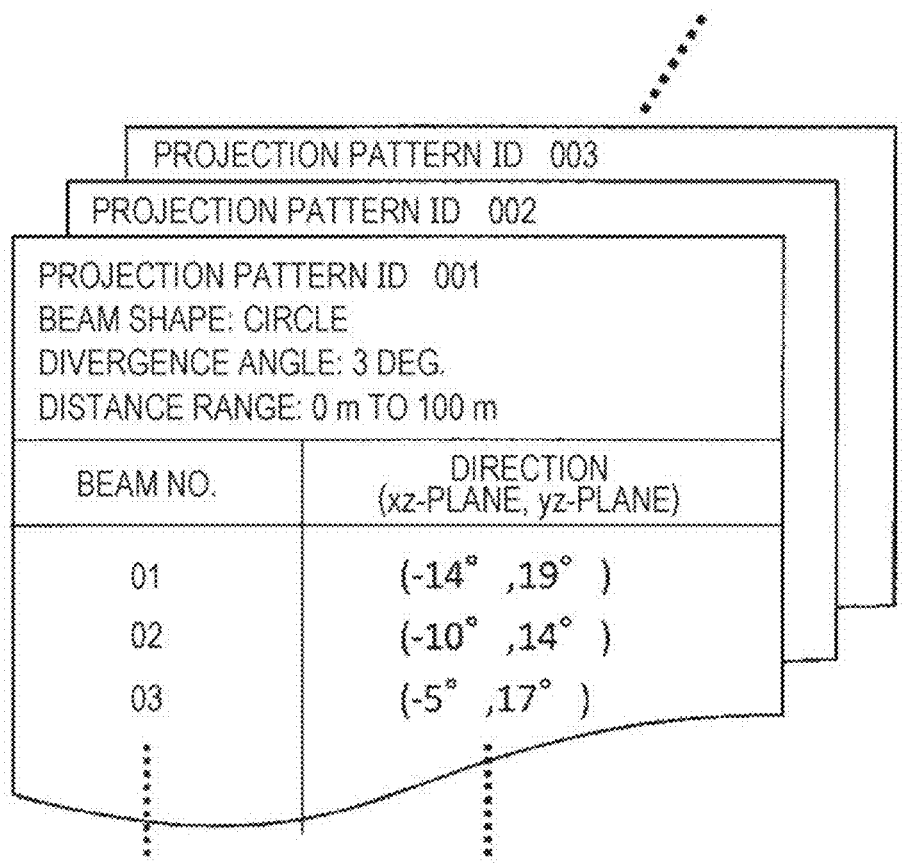
FIG. 28B illustrates exemplary short-range beam information according to Embodiment 3.

FIG. 28A illustrates exemplary long-range beam information according to Embodiment 3. FIG. 28B illustrates exemplary short-range beam information according to Embodiment 3. In Embodiment 3, the long-range beam information and the short-range beam information each specify plural projection patterns. Each projection pattern information is similar to that in Embodiment 1.

Of the projection patterns represented by each of the long-range beam information and the short-range beam information, the respective projection patterns of long-range and short-range beams received during the same exposure period are stored in association with each other. The association may be made by, for example, assigning the same ID to the corresponding patterns.

The long-range beam information and the short-range beam information may differ from those illustrated in FIGS. 28A and 28B. As described above with reference to FIGS. 4A and 4B, the long-range beam information and the short-range beam information may be represented in various forms.

3-2. Operation of Object Recognition Apparatus

Reference is now made to how the object recognition apparatus according to Embodiment 3 operates.

FIG. 29 is a flowchart illustrating an overview of operation of the object recognition apparatus according to Embodiment 3. Reference is made below to each operation step.

Step S1000

The projection-pattern selector 329 of the control circuit 300 selects a projection pattern used for ranging.

Step S1100

The projection/exposure timing determiner 322 of the control circuit 300 determines the timing of projection of each of short-range and long-range beams, and the timing of exposure of the image sensor 200. The projection and exposure timings are similar to those in Embodiment 1.

Step S1200

Subsequently, the timing unit 324 of the control circuit 300 instructs the projection-control-signal output unit 326 to project light, in accordance with the projection timing information output from the projection/exposure timing determiner 322. The projection-control-signal output unit 326 outputs, to the light source 100, a projection control signal for short-range and long-range beams output from the projection/exposure timing determiner 322. The timing unit 324 outputs, to the image sensor 200, a control signal for controlling the start and end of exposure, in accordance with the exposure timing information output from the projection/ exposure timing determiner 322. The image sensor 200 measures, for each pixel, the amount of charge accumulated due to reflected light.

Step S1250

The recognition processing unit 410 of the signal processing circuit 400 extracts, in accordance with ID information representing a projection pattern output from the projection-pattern selector 329 of the control circuit 300, an object recognition model corresponding to the projection pattern from the storage device 500.

Step S1300

The recognition processing unit 410 of the signal processing circuit 400 recognizes one or more objects included in a scene of interest based on the amount of charge at each pixel measured at step S1200. The recognition process is performed by the above-mentioned method in accordance with the object recognition model extracted at step S1250.

Step S1400

The object-distance calculator 430 of the signal processing circuit 400 calculates, for each object recognized at step S1300, the pixel position of the object, and the distance to the object. The distance is calculated by the same method as mentioned above.

Step S1500

The signal processing circuit 400 outputs information representing the object recognized at step S1300, and information representing the distance to the object, to the storage device 500 and/or the display 600.

The object recognition model stored in the storage device 500 in Embodiment 3 may be learned in advance by, for example, a system similar to the object recognition system or learning system according to Embodiment 1, the object recognition system according to the modification of Embodiment 1, or the learning system according to Embodiment 2.

As described above, according to Embodiment 3, the control circuit 300 determines the direction of emission of each short-range beam and the direction of emission of each long-range beam based on first distribution information and second distribution information that are stored on the storage medium 310, the first distribution information representing the spatial distribution of short-range beams, the second distribution information representing the spatial distribution of long-range beams. The signal processing circuit 400 recognizes an object in a scene of interest based on photodetection data, the first distribution information, the second distribution information, and an object recognition model. The object recognition model is pre-trained with plural training data sets, each training data set including learning photodetection data, and label data that identifies an object in a scene represented by the learning photodetection data.

In Embodiment 1 and its modification, and in Embodiments 2 and 3, the object recognition apparatus outputs information representing the recognition result of an object and the distance to the object. However, the present disclosure is not limited to such embodiments. Alternatively, for example, the object recognition apparatus may be included in a control system for a mobile object such as a mobile robot or an automobile. The control system for the mobile object may, based on an output of the object recognition apparatus, control the speed and direction of travel. For example, the mobile object may be controlled to decrease its speed in response to recognition of a human being or other object located at a relatively long distance in the direction of travel.

In the embodiments and the modification above, light beams with different spatial distributions are radiated sequentially. Alternatively, light beams with the same spatial distribution may be radiated sequentially. For example, light beams with the same two-dimensional spatial distribution may be radiated sequentially. Alternatively, light beams with the same three-dimensional spatial distribution may be radiated sequentially.

The technique according to the present disclosure is applicable to a wide variety of apparatuses that perform ranging. For example, the technique according to the present disclosure is applicable to object recognition systems that employ light detecting and ranging (LiDAR). The result of recognition may be used to, for example, control a mobile object or a robot.

What is claimed is:

1. An object recognition apparatus comprising:
    a light source;
    a photodetector device including a plurality of photodetector elements, the photodetector device outputting photodetection data responsive to an amount of light that is incident on each of the plurality of photodetector elements during a specified exposure period;
    a control circuit that controls the light source and the photodetector device,
        the control circuit causing the light source to emit first light toward a scene and subsequently emit second light toward the scene, the first light having a first spatial distribution, the second light having a second spatial distribution,
        the control circuit causing the photodetector device to detect first reflected light and second reflected light, the first reflected light being caused by reflection of the first light from the scene, the second reflected light being caused by reflection of the second light from the scene, and
        the control circuit determining emission timings of the first light and the second light and an exposure timing of the photodetector device such that at least a portion of the plurality of photodetector elements of the photodetector device detects only a part of, but not all of the first reflected light and only a part of, but not all of the second reflected light in a same exposure period; and
    a signal processing circuit that recognizes an object included in the scene based on the photodetection data output by the photodetector device and based on an object recognition model pre-trained by a machine learning algorithm, derives a distance to the object based on the photodetection data, and outputs information representing the object, and range information representing the distance.

2. The object recognition apparatus according to claim 1, wherein the at least portion of the plurality of photodetector elements of the photodetector device includes
    a plurality of first photodetector elements that receive the first reflected light and do not receive the second reflected light, and
    a plurality of second photodetector elements that receive the second reflected light and do not receive the first reflected light, and
    wherein the plurality of photodetector elements further include a plurality of third photodetector elements that receive neither the first reflected light nor the second reflected light.

3. The object recognition apparatus according to claim 1, wherein:
    the object recognition model is pre-trained with a plurality of training data sets, the plurality of training data sets each includes learning photodetection data and label data, the learning photodetection data are photodetection data used for learning, and the label data identify a target object included in scenes represented by the learning photodetection data.

4. The object recognition apparatus according to claim 3, wherein the learning photodetection data is photodetection data previously output from the photodetector device.

5. The object recognition apparatus according to claim 3,
wherein the control circuit determines a direction of emission of the first light and a direction of emission of the second light based on projection pattern information, the projection pattern information being stored on a storage medium and representing the first spatial distribution and the second spatial distribution, and
wherein the learning photodetection data is generated based on the projection pattern information, and based on range image data prepared in advance.

6. The object recognition apparatus according to claim 3,
wherein the control circuit determines a direction of emission of the first light and a direction of emission of the second light based on projection pattern information, the projection pattern information being stored on a storage medium and representing the first spatial distribution and the second spatial distribution, and
wherein the label data is generated based on the projection pattern information, and based on photodetection data previously output from the photodetector device.

7. The object recognition apparatus according to claim 3,
wherein the control circuit determines a direction of emission of the first light and a direction of emission of the second light based on projection pattern information, the projection pattern information being stored on a storage medium and representing the first spatial distribution and the second spatial distribution, and
wherein the projection pattern information is learned in advance by the machine learning algorithm using the plurality of training data sets.

8. The object recognition apparatus according to claim 1,
wherein the control circuit determines a direction of emission of the first light and a direction of emission of the second light based on one of a plurality of kinds of projection pattern information, the plurality of kinds of projection pattern information being stored on a storage medium and representing the first spatial distribution and the second spatial distribution, and
wherein the object recognition model includes a plurality of models corresponding one to-one to the plurality of kinds of projection pattern information.

9. The object recognition apparatus according to claim 1, further comprising a display device, the display device outputting a composite image, the composite image combining an image highlighting the recognized object with an image representing the range information.

10. The object recognition apparatus according to claim 1, wherein the distance is derived based on a range-information generation model, the range-information generation model being pre-trained by the machine learning algorithm or by another machine learning algorithm.

11. The object recognition apparatus according to claim 1, wherein the second spatial distribution differs from the first spatial distribution.

12. The object recognition apparatus according to claim 1, wherein the first light includes a plurality of first light beams each emitted in a different direction, and wherein the second light includes a plurality of second light beams each emitted in a different direction.

13. The object recognition apparatus according to claim 1, wherein the second light has a maximum range shorter than a maximum range of the first light.

14. The object recognition apparatus according to claim 1, wherein the second light has an energy per unit area on an irradiated surface lower than an energy of the first light per unit area on the irradiated surface, the irradiated surface being spaced apart from the light source.

15. The object recognition apparatus according to claim 1,
wherein the first light has a first wavelength,
wherein the second light has a second wavelength, and
wherein the second wavelength has an atmospheric absorption coefficient higher than an atmospheric absorption coefficient of the first wavelength.

16. The object recognition apparatus according to claim 1,
wherein the control circuit
causes the light source to emit third light toward the scene after emission of the second light, the third light having a third spatial distribution, and
causes the photodetector device to detect third reflected light in the same exposure period, the third reflected light being caused by reflection of the third light from the scene, and
wherein the third light has a maximum range shorter than a maximum range of the second light.

17. The object recognition apparatus according to claim 1, wherein
the same exposure period does not include a time at which a portion of the first reflected light arrives at the photodetector device, the portion of the first reflected light being caused by reflection at a position in the scene located at a first distance from the photodetector device,
includes a time at which another portion of the first reflected light arrives at the photodetector device, the other portion of the first reflected light being caused by reflection at a position located at a second distance from the photodetector device, the second distance being greater than the first distance, and
includes a time at which a portion of the second reflected light arrives at the photodetector device, the portion of the second reflected light being caused by reflection at a position located at the first distance from the photodetector device.

18. An object recognition method comprising:
causing a light source to emit first light toward a scene and subsequently emit second light toward the scene, the first light having a first spatial distribution, the second light having a second spatial distribution;
determining emission timings of the first light and the second light and an exposure timing of a photodetector device such that at least a portion of a plurality of photodetector elements of the photodetector device detects only a part of, but not all of first reflected light and only a part of, but not all of second reflected light in a same exposure period, the first reflected light being caused by reflection of the first light from the scene, the second reflected light being caused by reflection of the second light from the scene;
causing the at least the portion of the plurality of photodetector elements of the photodetector device to detect only the part of, but not all of the first reflected light and only the part of, but not all of the second reflected light in the same exposure period;

recognizing an object included in the scene based on photodetection data and an object recognition model, the photodetection data being output from the photodetector device, the object recognition model being pre-trained by a machine learning algorithm;

deriving a distance to the object based on the photodetection data; and outputting information representing the object, and range information representing the distance.

19. A non-transitory computer-readable medium having a program stored thereon, the program causing a computer to execute:

causing a light source to emit first light toward a scene and subsequently emit second light toward the scene, the first light having a first spatial distribution, the second light having a second spatial distribution;

determining emission timings of the first light and the second light and an exposure timing of a photodetector device such that at least a portion of a plurality of photodetector elements of the photodetector device detects only a part of, but not all of first reflected light and only a part of, but not all of second reflected light in a same exposure period, the first reflected light being caused by reflection of the first light from the scene, the second reflected light being caused by reflection of the second light from the scene;

causing the at least the portion of the plurality of photodetector elements of the photodetector device to detect only the part of, but not all of the first reflected light and only the part of, but not all of the second reflected light in the same exposure period;

recognizing an object included in the scene based on photodetection data and an object recognition model, the photodetection data being output from the photodetector device, the object recognition model being pre-trained by a machine learning algorithm;

deriving a distance to the object based on the photodetection data; and outputting information representing the object, and range information representing the distance.

\* \* \* \* \*